(12) United States Patent
Sunaga et al.

(10) Patent No.: US 10,418,737 B2
(45) Date of Patent: Sep. 17, 2019

(54) TERMINAL CONNECTION COMPONENT, AND TERMINAL CONNECTION STRUCTURE BETWEEN CONTROL UNIT USING THE SAME AND MOTOR

(71) Applicant: NSK Ltd., Tokyo (JP)

(72) Inventors: Takashi Sunaga, Tokyo (JP); Tadayoshi Osakabe, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/320,653

(22) PCT Filed: Aug. 23, 2017

(86) PCT No.: PCT/JP2017/030135
§ 371 (c)(1),
(2) Date: Jan. 25, 2019

(87) PCT Pub. No.: WO2018/038161
PCT Pub. Date: Mar. 1, 2018

(65) Prior Publication Data
US 2019/0173216 A1    Jun. 6, 2019

(30) Foreign Application Priority Data

Aug. 23, 2016  (JP) ................................ 2016-162749
Dec. 14, 2016  (JP) ................................ 2016-242243
Apr. 14, 2017  (JP) ................................ 2017-080598

(51) Int. Cl.
*H01R 13/11*       (2006.01)
*H01R 13/04*       (2006.01)
(Continued)

(52) U.S. Cl.
CPC ......... *H01R 13/113* (2013.01); *B62D 5/0403* (2013.01); *H01R 13/04* (2013.01);
(Continued)

(58) Field of Classification Search
CPC ...... H01R 13/113; H01R 13/11; H01R 13/04; H01R 13/05; H01R 13/052; H01R 13/057; H02K 5/225
See application file for complete search history.

(56) References Cited

U.S. PATENT DOCUMENTS 4,451,109 A * 5/1984 Inoue ................. H01H 85/2035
439/786
6,739,916 B2 * 5/2004 Geil ..................... H01R 13/113
439/682
(Continued)

FOREIGN PATENT DOCUMENTS

JP    53-138084 A    12/1978
JP    04-96801 U     8/1992
(Continued)

OTHER PUBLICATIONS

International Search Report of PCT/JP2017/030135 dated Nov. 14, 2017 [PCT/ISA/210].
(Continued)

*Primary Examiner* — Felix O Figueroa
(74) *Attorney, Agent, or Firm* — Sughrue Mion, PLLC

(57) ABSTRACT

A terminal connection component including press-fit terminals and terminal metal-fittings. The press-fit terminals have a plate shape in which a taper is disposed at one tip, and the terminal metal-fittings also have a plate shape in which a fitting section is disposed at one end side. The fitting sections of the terminal metal-fittings have a first hole part and a second hole part from the one end in parallel. The tips of the press-fit terminals are press-fitted and are connected to the fitting sections of the terminal metal-fittings, and a portion between the first hole part and the second hole part of the fitting section, which serves as an elastic deformation section, is elastically deformed in a thickness direction of the press-fit terminal and biases the press-fit terminal so that the press-fit terminals are surely press-fitted to the fitting sections of the terminal metal-fittings.

19 Claims, 37 Drawing Sheets

(51) Int. Cl.
*H01R 13/52* (2006.01)
*H02K 5/22* (2006.01)
*B62D 5/04* (2006.01)
*H02K 11/33* (2016.01)
*H01R 13/05* (2006.01)

(52) U.S. Cl.
CPC ......... *H01R 13/05* (2013.01); *H01R 13/5213* (2013.01); *H02K 5/225* (2013.01); *H02K 11/33* (2016.01); *B62D 5/0406* (2013.01)

(56) References Cited

U.S. PATENT DOCUMENTS 8,596,120 B2 * 12/2013 Ludwig ................ G01D 11/245
73/493
9,444,311 B2 * 9/2016 Ito .......................... H02K 5/225

FOREIGN PATENT DOCUMENTS

| JP | 10-012289 A | 1/1998 |
| JP | 2004-254359 A | 9/2004 |
| JP | 2008-022653 A | 1/2008 |
| JP | 2010-010024 A | 1/2010 |
| JP | 2013-225475 A | 10/2013 |
| JP | 2016-100097 A | 5/2016 |
| WO | 2014/033833 A1 | 3/2014 |

OTHER PUBLICATIONS

Written Opinion of PCT/JP2017/030135 dated Nov. 14, 2017 [PCT/ISA/237].

* cited by examiner

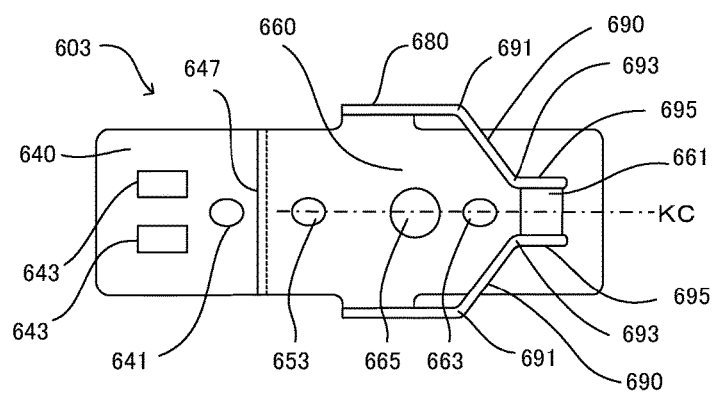
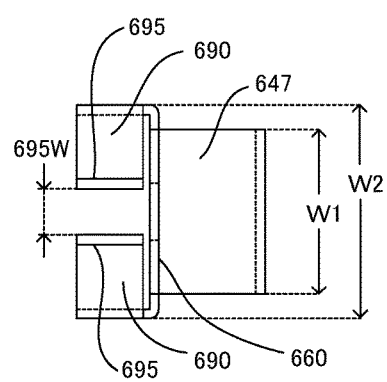
FIG.22A  FIG.22B
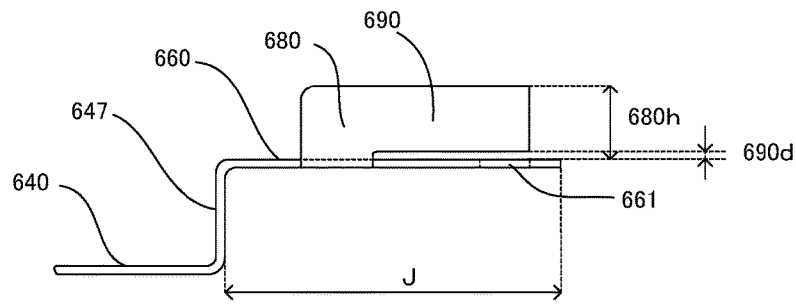
FIG.22C

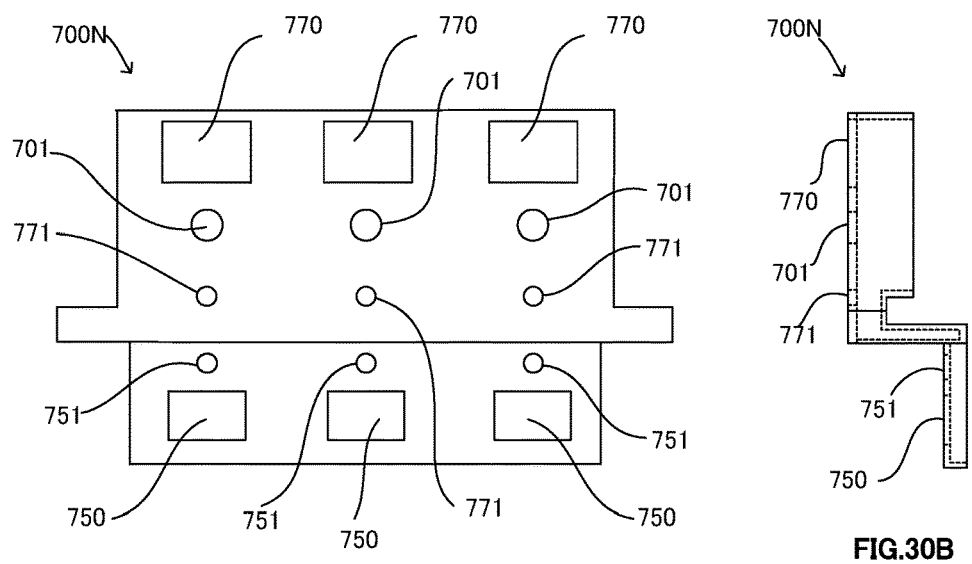
FIG.30A
FIG.30B
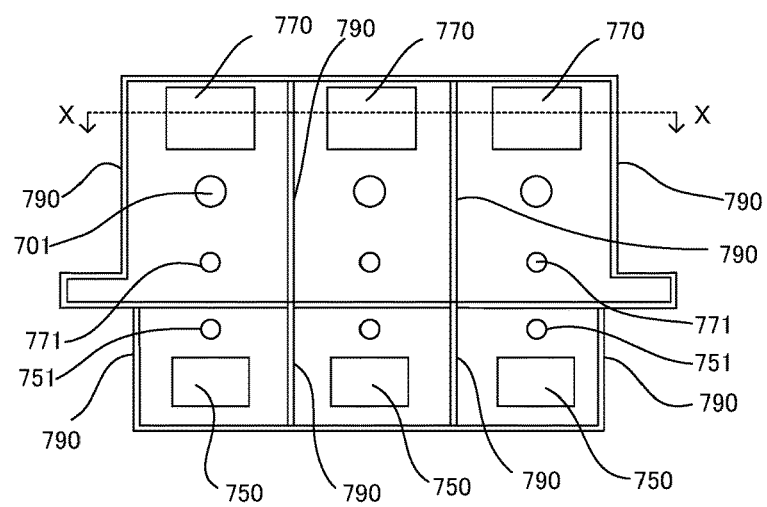
FIG.30C
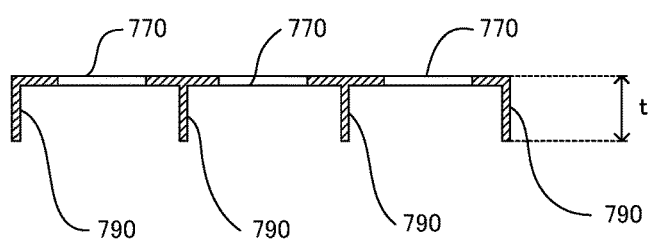
FIG.30D

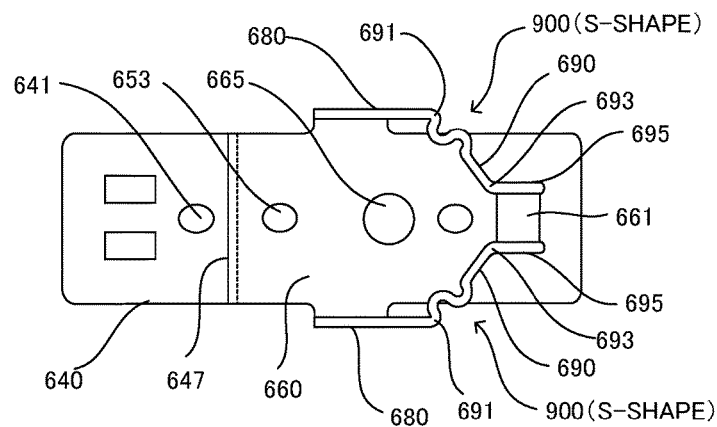
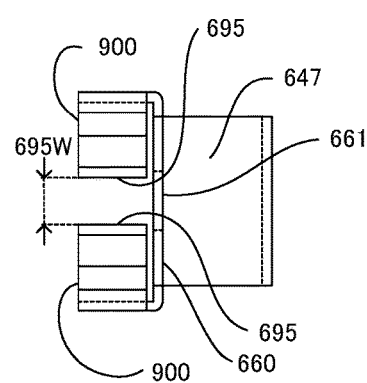
FIG.33A
FIG.33B
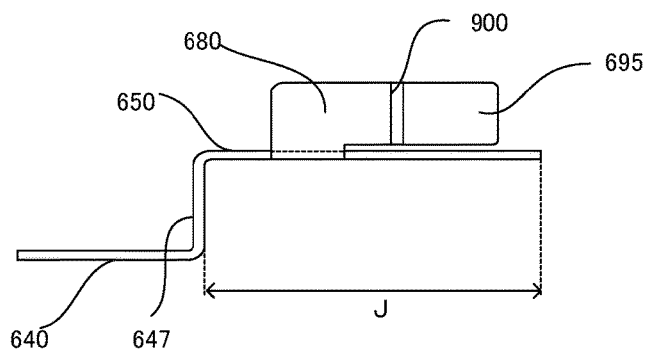
FIG.33C

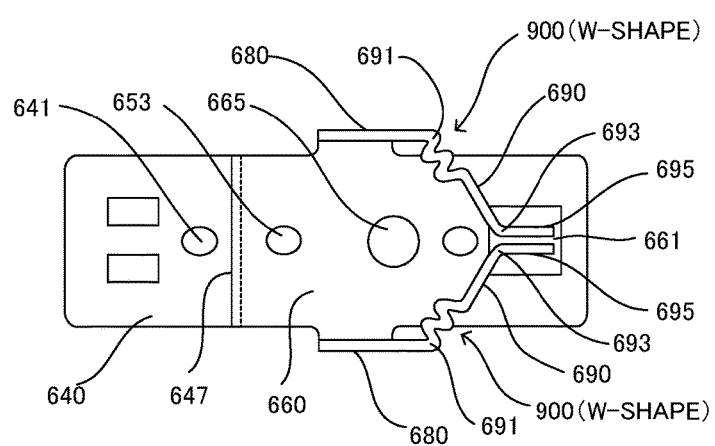
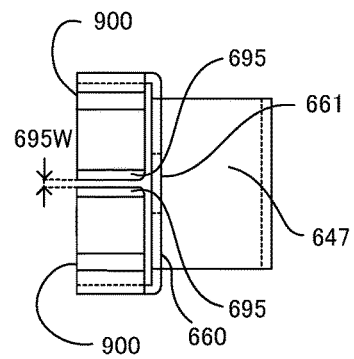
FIG.34A
FIG.34B
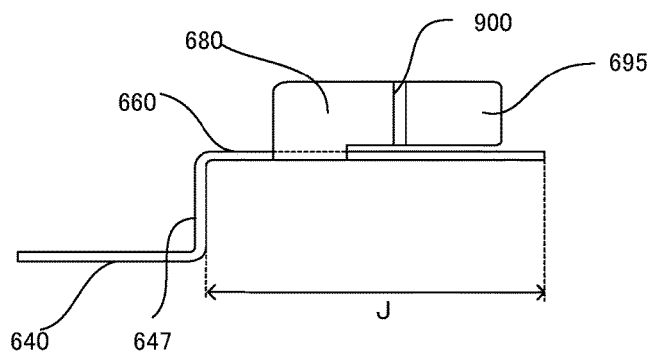
FIG.34C

TERMINAL CONNECTION COMPONENT, AND TERMINAL CONNECTION STRUCTURE BETWEEN CONTROL UNIT USING THE SAME AND MOTOR

CROSS REFERENCE TO RELATED APPLICATIONS

This application is a National Stage of International Application No. PCT/JP2017/030135, filed Aug. 23, 2017, claiming priorities based on Japanese Patent Application Nos. 2016-162749, filed Aug. 23, 2016, 2016-242243, filed Dec. 14, 2016 and 2017-080598, filed Apr. 14, 2017.

TECHNICAL FIELD

The present invention relates to a terminal connection component, and a terminal connection structure between a control unit using the same and a motor, in particular to the terminal connection component that comprises press-fit terminals and terminal metal-fittings, and the terminal connection structure between the control unit, which has a structure that a substrate installed therein is electrically connected to the motor by press-fitting press-fit terminals stood from the substrate to the terminal metal-fittings disposed on the motor, and the motor.

BACKGROUND ART

In the apparatus that uses the motor as a driving source, a combined structure with the motor and the control unit is generally used. As the combined apparatus with such a control unit and the motor, for example an electric power steering apparatus (EPS) is known.

Such an electric power steering apparatus applies a steering-assist torque (an assist torque) to a steering mechanism of a vehicle by a rotational torque of the motor. An integrated unit that is combined with the control unit and the motor are mainly used, and the motor is connected to or is assembled with an electric parts of the control unit.

Thus, in the above motor is assembled with the control unit, even if these elements have a slight variation in dimension, the terminal connection component and the terminal connection structure are required so that an assembling operation can smoothly be performed and can be simplified.

Further, in a case of performing the simplification of such an assembling, for example, in the electric power steering apparatus, large current, which is larger than 120 [A], is passed between the control unit and the motor depending on the steering state of the vehicle. The variation of a thermal environment in the portion in the vehicle, which the control unit and the motor are received, vibration of the vehicle and the like are also known. It is necessary to consider durability and reliability so that the control unit and the motor endure such the environments for the long term.

Recently, it is necessary to reduce the environment load even in industrial products. The use of lead-free solder at the connection portion and the reduction of the number of the components are also required.

In this connection, in order to simplify the assembling of the electric parts in the control unit of the electric power steering apparatus, as an example of the combination of such a control unit and the motor, for example, technologies described in Japanese Unexamined Patent Publication No. 2008-22653 A (Patent Document 1) and Japanese Unexamined Patent Publication No. 2004-254359 A (Patent Document 2) are disclosed.

The technology described in Patent Document 1 relates to the control unit of the electric motor and the like. The control unit of the electric motor comprises a control substrate formed the drive circuit to control a supply of the driving current to the motor; a substrate holding body to hold the control substrate and be detachably fixed to the motor at a predetermined position; a substrate-side conductive member and a motor-side conductive member that are electrically connected each other and form a current supply path from the control substrate to the motor; a substrate-side support body and a motor-side support body that are made of an electrically insulating resin and are integrally and respectively provided with the substrate-side conductive member and the motor-side conductive member; and a substrate-side fitting section and a motor-side fitting section in which the substrate-side support body is fitted to the motor-side support body so that the substrate-side conductive member is electrically connected to the motor-side conductive member and the substrate holding body is positioned to the motor at the predetermined position.

The substrate-side fitting section is formed in a concave shape so that the motor-side fitting section is fitting-inserted into the inner circumference of the substrate-side fitting section. The motor-side fitting section is fitted to the substrate-side fitting section, and the connection section of the substrate-side conductive member protruded into the interior of the substrate-side fitting section and the connection section of the motor-side conductive member protruded from the motor-side fitting section are elastically deformed and are connected by a push (fitting) operation.

Further, the technology described in Patent Document 2 relates to the electric power steering apparatus. The above electric power steering apparatus comprises the motor to output the steering assist torque; a control means that is equipped with the motor, performs the control of the motor, and comprises at least a control substrate on which the control circuit is mounted, a power substrate on which the power components are mounted, and an input and output connector; and connection terminals that connects among the control substrate, the power substrate and the connector in the control means; wherein press-fit terminals are formed at one end of the connection terminals, and the press-fit terminals are fitted to through holes disposed on the control substrate so that the control substrate is electrically connected to the power substrate.

The List of Prior Art Documents

PATENT DOCUMENTS

Patent Document 1: Japanese Unexamined Patent Publication No. 2008-22653 A
Patent Document 2: Japanese Unexamined Patent Publication No. 2004-254359 A

SUMMARY OF THE INVENTION

Problems to be Solved by the Invention

However, the technology described in Patent Document 1 is a structure that the on-vehicle motor is simply removed from or is assembled with the fixing box having terminals. In a case that the above structure is used in the electric power steering apparatus, the elastic deformation section is largely and outwardly pushed out. In a case of dealing with the large current, there is a problem that a size of the unit increases. In the technology described in Patent Document 1, when the motor is connected to the substrate, since the substrate-side fitting section is formed in a concave shape so that the motor-side fitting section is fitting-inserted into the inner circumference of the substrate-side fitting section, there is a problem that the process takes a high cost and is complicate. Since the connection is performed in an inside of the substrate-side fitting section that is formed in the concave shape, there is a problem that the connection state cannot visually be confirmed from the outside.

Further, in the technology described in Patent Document 2, the connection terminals that are connected among the control substrate, the power substrate and the connector are disposed in the control means. The press-fit terminals are formed at one end of the connection terminals, and the press-fit terminals are press-fitted to through holes disposed on the control substrate. Accordingly, in the technology described in Patent Document 2, a conventional welding (gas tungsten arc welding (TIG welding)) is performed on the connection section to the motor wirings, and the above welding is used for the portion which solder connections to the substrate are not used. The press-fit technology is used in connector wirings for the signals in which small current are flown. In order to apply an elastic force to the terminals, the cross-sectional area becomes small. The configuration is not designed for use of the connection with the motor wirings in which the large current is flown.

In the technology described in Patent Document 2, since small through holes, which are disposed on the control substrate for the connection terminals, are needed, process accuracy of the through holes and precise position alignment in the assembling are required. There is a problem that the mechanical and thermal loads are concentrated on the through holes, and the handling to the large currents is difficult.

Accordingly, the present invention has been developed for resolving the problems with reference to the terminal connection components using the electrical connection of such a unit, and the terminal connection structure between the control unit and the motor. An object of the present invention is to provide the terminal connection component that comprises the press-fit terminals which are used in the one end of the motor wirings of the control unit-side substrate; and the terminal metal-fittings corresponding to the above press-fit terminals, for example, as the terminal connection component used in the electrical connection between the control unit in which the large current is flown and the motor, and the terminal connection structure between the control unit, which the terminal connection component comprising the press-fit terminals and the terminal metal-fittings is used, and the motor.

Another object of the present invention is to enable to handle a slight error when the press-fit terminals and the like are mounted on the substrate, and the slight variation in dimension of the press-fit terminals and the like with reference to such terminal connection components and the terminal connection structure between the control unit and the motor. Still another object of the present invention is to improve the durability and the reliability in the electrical connecting section of the unit in which the terminal connection component is used, and the terminal connection structure between the control unit and the motor, by adopting the structure that can handle with even the large current.

Yet another object of the present invention is to improve the convenience of the assembling operation or the removing operation of the unit comprising the control unit, the motor and the like in the electric power steering apparatus and the like, by using the unit in which such terminal connection component is used, and the terminal connection structure between the control unit using the terminal connection component and the motor, to reduce the number of the components and consider the environment impact, and to realize further miniaturization of the unit in which such terminal connection component is used, and the unit comprising the control unit, the motor and the like.

Means for Solving the Problems

In order to resolve the above-described problems, the present invention provides a terminal connection component, comprising press-fit terminals and terminal metal-fittings, wherein the press-fit terminals have a plate shape in which a taper is disposed at one tip, and the terminal metal-fittings have a plate shape and have a fitting section at one end, wherein the fitting sections of the terminal metal-fittings have a first hole part and a second hole part from the one end in parallel, wherein the first hole part is a rectangular shape, wherein the second hole part is a rectangular shape, and a central portion of one long side near the first hole part is shifted to an interior of the second hole part so that a length of a central portion of the second hole part is slightly shorter than a thickness of the press-fit terminals, and wherein the tips of the press-fit terminals are press-fitted to and are connected to the fitting sections of the terminal metal-fittings, and a portion between the first hole part and the second hole part of the fitting section, which serves as an elastic deformation section, is elastically deformed in a thickness direction of the press-fit terminals and biases the press-fit terminal so that the press-fit terminals are surely press-fitted to the fitting sections of the terminal metal-fittings.

The above-described problems are efficiently resolved by that: wherein the taper, which is disposed at one tip of the press-fit terminal, has round sections having a curvature at both corner portions in the end portion of the plate, and has a portion that a thickness of side surface portions of the plate decreases toward the end portion.

The above-described problems are efficiently resolved by that: in a terminal connection structure between a control unit using the terminal connection component and a motor, wherein the control unit comprises a substrate on which at least a control circuit is mounted, and the press-fit terminals stood from the substrate, wherein the terminal metal-fittings are disposed on the motor, and the motor is connected to one end of the terminal metal-fittings, and wherein a connection between the control unit and the motor is performed by press-fitting the tips of the press-fit terminals to the fitting-in sections of the terminal metal-fittings.

Further, in order to resolve the above-described problems, the present invention provides a terminal connection component, comprising press-fit terminals, and terminal metal-fittings, wherein the press-fit terminals have a first fitting-in section and a second fitting-in section, a tip of the first fitting-in section and a tip of the second fitting-in section are branched from a branch section, the first fitting-in section and the second fitting-in section from the tip to the branch section comprise a guide section and a straight portion, the guide section comprises a first taper section and a second taper section, and a taper ratio of the first taper section is smaller than that of the second taper section, wherein the terminal metal-fittings have a plate shape, and comprise a fitting section to which the first fitting-in section and the second fitting-in section of the press-fit terminal are press-fitted, at one end, wherein the fitting section comprises first and second rectangular hole parts which are in parallel disposed in a width direction of the terminal metal-fitting at one end of the terminal metal-fitting, and a bridge section formed between the first and second hole parts, and the first and second hole parts have a short side in a width direction of the terminal metal-fitting and have a long side in a longitudinal direction of the terminal metal-fitting, wherein a length of the short side of the first and second hole parts is longer than respective widths of the tips of the first and second fitting-in sections in the press-fit terminal, and is shorter than respective widths in the straight portion side of the first and second fitting-in sections, wherein a length of the long side of the first and second hole parts is longer than respective thicknesses of the first and second fitting-in sections in the press-fit terminal, wherein a width of the bridge section of the terminal metal-fitting is longer than a space between an inner surface of the first fitting-in section of the press-fit terminal and an inner surface of the second fitting-in section of the press-fit terminal, wherein a farthest space of the long side between the first hole part and the second hole part is formed shorter than a space between an outer surface in the straight portion of the first fitting-in section of the press-fit terminal and an outer surface in the straight portion of the second fitting-in section of the press-fit terminal, wherein a connection between the press-fit terminal and the terminal metal-fitting is performed by inserting the tips of the first and second fitting-in sections of the press-fit terminal into the first and second hole parts of the fitting-in section of the terminal metal-fitting, and press-fitting the tips of the first and second fitting-in sections of the press-fit terminal to the first and second hole parts of the fitting-in section of the terminal metal-fitting, and wherein the press-fitting is achieved by disposing the width direction of the press-fit terminal parallel to the width direction of the terminal metal-fitting at a substantially central portion of the first and second rectangular hole parts of the fitting section, and by pressing the press-fit terminal to the terminal metal-fitting at two portions in first contact regions of both side surfaces of the bridge section and two portions in second contact regions where an inner side-surfaces of the long side of the first hole part is farthest to that of the second hole part.

The above-described problems are efficiently resolved by that: wherein a reference dimension in a width of the bridge section of the terminal metal-fitting is the same as that of a space between an inner surface in the straight portion of the first fitting-in section of the press-fit terminal and an inner surface in the straight portion of the second fitting-in section of the press-fit terminal, wherein a reference dimension in a farthest space of the long side between the first hole part of the terminal metal-fitting and the second hole part of the terminal metal-fitting is the same as that of a space between an outer surface in the straight portion of the first fitting-in section of the press-fit terminal and an outer surface in the straight portion of the second fitting-in section of the press-fit terminal, wherein the width of the bridge section of the terminal metal-fitting is manufactured with a positive tolerance to the reference dimension, and the space between the inner surface in the straight portion of the first fitting-in section of the press-fit terminal and the inner surface in the straight portion of the second fitting-in section of the press-fit terminal is manufactured with a negative tolerance to the reference dimension, and wherein the space where the long side of the first hole part of the terminal metal fitting is farthest to that of the second hole part of the terminal metal fitting is manufactured with a negative tolerance to the reference dimension and the space between the outer side-surface in the straight portion of the first fitting-in section of the press-fit terminal and the outer side-surface in the straight portion of the second fitting-in section of the press-fit terminal is manufactured with a positive tolerance; or wherein plural combinations of the first and second fitting-in sections of the press-fit terminal are formed in parallel at tips of the press-fit terminal, and plural combinations of the first and second hole parts are formed in the longitudinal direction of the terminal metal-fitting, corresponding to the plural combinations of the first and second fitting-in sections of the press-fit terminal; or wherein the press-fit terminal comprises an extending section to extend from the branch section to a downward side, and a substrate connecting section to be disposed below the extending section and connect to the substrate, and wherein the substrate connecting section comprises a forward bent section to be disposed below the extending section and be bent forwardly, a downward section to be bent from one end of the forward bent section to downward, and a substrate contacting section to be bent from the downward section backwardly, be perpendicular to the extending section, and be mounted on the substrate.

The above-described problems are efficiently resolved by that, in a terminal connection structure between a control unit using the terminal connection component and a motor, wherein the control unit comprises a substrate on which at least a control circuit is mounted, and the press-fit terminals stood from the substrate, wherein the terminal metal-fittings are disposed on the motor, and the motor is connected to one end of the terminal metal-fittings, wherein a connection between the control unit and the motor is performed by inserting the tips of the first and second fitting-in sections of the press-fit terminal into the first and second hole parts of the fitting-in section of the terminal metal-fitting, and press-fitting the tips of the first and second fitting-in sections of the press-fit terminal to the first and second hole parts of the fitting-in section of the terminal metal-fitting, and wherein the press-fitting is achieved by disposing the width direction of the press-fit terminal parallel to the width direction of the terminal metal-fitting at a substantially central portion of the first and second rectangular hole parts of the fitting section, and by pressing the press-fit terminal to the terminal metal-fitting at two portions in first contact regions of both side surfaces of the bridge section and two portions in second contact regions where an inner side-surfaces of the long side of the first hole part is farthest to that of the second hole part.

The above-described problems are efficiently resolved by that, in a terminal connection method between a control unit and a motor to make a terminal connection structure between the control unit using the terminal connection component and the motor, comprising of: abutting and supporting a lower surface of the forward bent section of the press-fit terminal stood from an upper surface of the substrate of the control unit to a support surface of a support body from a bottom, inserting and press-fitting the tips of the first and second fitting-in sections of the press-fit terminal to the first and second hole parts of the fitting-in section of the terminal metal-fitting, pressing a portion between the first and second fitting-in sections in a widening direction in first contact regions of both side surfaces of the bridge section of the terminal metal-fitting by the press-fitting, and pressing outer surfaces of the first and second fitting-in sections in an inward direction at second contact regions where an inner side-surface of the long side of the first hole part is farthest to that of the second hole part by a progress of the press-fitting, wherein the press-fitting is completed in a stage that the straight portions of the first and second fitting-in sections of the press-fit terminal arrive at the first and second hole parts of the terminal metal-fitting.

Furthermore, in order to resolve the above-described problems, the present invention provides a terminal connection component, comprising: press-fit terminals, and terminal metal-fittings, wherein the press-fit terminals have at least an inserting section, wherein the inserting section is formed in a substantially rectangular plate-shape and has a taper whose width of a plate decreases toward one end side of a longitudinal direction, wherein the terminal metal-fittings comprise a fixing-side plate section, a step section, a holding-side plate section and standing sections, wherein the fixing-side plate section forms substantially quadrangular plate, the plate-shape step section is formed at one side of the substantially quadrangular plate and is perpendicular to the substantially quadrangular plate, and the holding-side plate section is formed at an opposite side of the fixing-side plate section side of the step section, is extended to the opposite direction of the fixing-side plate section side, and is positioned parallel to the fixing-side plate section, wherein the holding-side plate section comprises the standing sections and a through hole which is disposed from the standing positions toward the end portion of the holding-side plate section, wherein the standing sections stand at both sides in a longitudinal direction of the holding-side plate section, and each of the standing sections comprises an extending section which is disposed at a side and is extended toward the holding-side plate section, and a holding section which is disposed at a side and is extended toward the end portion of the extending section, wherein each of the extending sections comprises a first bent section bending toward a center line direction of the holding-side plate section, and a second bent section which is disposed from the first extending section toward the end portion of the holding-side plate section and is parallel to the center line direction of the holding-side plate section, wherein a space between the holding sections formed at the end portions of the extending sections is slightly longer than a width of one end portion of the plate where the taper in the inserting section of the press-fit terminal is provided, and is slightly shorter than the width of the plate, and wherein the inserting section of each of the press-fit terminals is passed through an interior of the through hole and is held by the holding sections, and the press-fit terminals are connected to the terminal metal fittings.

In order to resolve the above-described problems, the present invention provides a terminal connection component, comprising: press-fit terminals, and terminal metal-fittings, wherein the press-fit terminals have at least an inserting section, wherein the inserting section is formed in a substantially rectangular plate-shape and has a taper whose thickness of a plate decreases toward one end side of a longitudinal direction, wherein the terminal metal-fittings comprise a fixing-side plate section, a step section, a holding-side plate section and standing sections, wherein the fixing-side plate section forms substantially quadrangular plate, the plate-shape step section is formed at one side of the substantially quadrangular plate and is perpendicular to the substantially quadrangular plate, and the holding-side plate section is formed at an opposite side of the fixing-side plate section side of the step section, is extended to the opposite direction of the fixing-side plate section side, and is positioned parallel to the fixing-side plate section, wherein the holding-side plate section comprises the standing sections and a through hole which is disposed from the standing positions toward the end portion of the holding-side plate section, wherein the standing sections stand at both sides in a longitudinal direction of the holding-side plate section, and each of the standing sections comprises an extending section which is disposed at a side and is extended toward the holding-side plate section, and a holding section which is disposed at a side and is extended toward the end portion of the extending section, wherein each of the extending sections comprises a first bent section bending toward a center line direction of the holding-side plate section, and a second bent section which is disposed from the first extending section toward the end portion of the holding-side plate section and is parallel to the center line direction of the holding-side plate section, wherein a space between the holding sections formed at the end portions of the extending sections is slightly longer than a thickness of one end portion of the plate where the taper in the inserting section of the press-fit terminal is provided, and is slightly shorter than the thickness of the plate, and wherein the inserting section of each of the press-fit terminals is passed through an interior of the through hole and is held by the holding sections, and the press-fit terminals are connected to the terminal metal fittings.

The above-described problems are efficiently resolved by that wherein the extending sections are formed in two or more stages in a standing direction from the holding-side plate section; or wherein taper sections which widen the holding sections toward the holding-side plate section side are provided at the holding-side plate section side of the holding sections; or the extending sections comprise an S-shape bent shock absorbing section or an M-shape bent shock absorbing section in an extending direction of the extending sections.

The above-described problems are efficiently resolved by that, in a terminal connection structure between a control unit using the terminal connection component and the motor, wherein the control unit comprises a substrate having at least a control circuit, and the press-fit terminals vertically stood from an upper surface of the substrate, wherein the terminal metal-fittings are disposed on the motor, and windings of the motor are connected to one end of the terminal metal-fittings, wherein the connection between the control unit and the motor is performed by passing the tips of inserting sections of the press-fitting terminals through interiors of the respective through holes of the terminal metal-fittings, and press-fitting the inserting sections of the press-fitting terminals to respective spaces formed between the holding sections, and wherein the inserting sections of the press-fit terminals are sandwiched between the holding sections of the terminal metal-fittings; or further comprising fixing plates which cover from the step section sides of holding-side plate sections of the terminal metal-fittings to portions in front of the through holes.

The above-described problems are efficiently resolved by that, in a terminal connection structure between a control unit using the terminal connection component and the motor, further comprising a cover which covers the press-fit terminals and the terminal metal-fittings from a direction of a standing section of the terminal metal-fittings, wherein the cover comprises insulating walls to insulate between the terminal metal-fittings which are formed below of a back surface of the cover, and openings formed portions corresponding to upper surfaces of the fitting sections of the terminal metal-fittings or portions corresponding to upper surfaces of the holding sections of the terminal metal-fittings in a case that the cover covers the press-fit terminals and the terminal metal-fittings from a direction of a standing section of the terminal metal-fittings.

The above-described problems are efficiently resolved by an electric power steering apparatus, comprising: the terminal connection component, or an electric power steering apparatus, comprising: the terminal connection structure between the control unit and the motor.

Effects of the Invention

The present invention provides the terminal connection component that comprises the press-fit terminals which are used in one end of the motor wirings of the control unit-side substrate, and the terminal metal-fittings corresponding to the press-fit terminals disposed on the motor-side, as the terminal connection component used between the control unit in which the large current is flown and the motor. The present invention also provides the terminal connection structure between the control unit using the terminal connection component comprising the press-fit terminals and the terminal metal-fittings, and the motor.

Such a terminal connection component and the terminal connection structure between the control unit and the motor can handle a situation that the slight error when the press-fit terminals and the like are assembled with the substrate is occurred and the slight variation in dimension of the press-fit terminals and the like is occurred, and can handle the large current. The durability and the reliability in the electrical connecting section of the unit in which the terminal connection component is used, and the terminal connection structure between the control unit and the motor, can be improved.

Thus, the convenience of the assembling operation or the removing operation of the unit comprising the control unit, the motor and the like in the electric power steering apparatus and the like can be improved by using the unit in which such terminal connection component is used, and the terminal connection structure between the control unit using the terminal connection component and the motor. By considering the environment impact, the number of the components can be reduced. More-miniaturization of the unit in which such a terminal connection component is used, and the unit comprising the control unit, the motor or the like, can be realized.

BRIEF DESCRIPTION OF THE DRAWINGS

In the accompanying drawings:

FIG. 5A is a front view, FIG. 5B is a side view, FIG. 5C is an enlarged view of a region of "K" which is shown by a circle using a dashed line in FIG. 5A, and FIG. 5D is an enlarged view of a region of "L" which is shown by a circle using a dashed line in FIG. 5B;

FIG. 6A is a top view, FIG. 6B is a side view, and FIG. 6C is an enlarged view of a region of "M" which is shown by a circle using a dashed line in FIG. 6A;

FIG. 7A is a side cross-sectional view showing a state before performing the above press-fitting, FIG. 7B is a side cross-sectional view showing a state when the press-fitting is begun, and FIG. 7C is a side cross-sectional view showing a state when the press-fitting is completed;

FIG. 8A is a perspective view showing the terminal connection component and the terminal connection structure according to the first embodiment of the present invention from the terminal metal-fitting side of the motor, as well as FIG. 4B, and FIG. 8B is a perspective view showing an example that the cover which covers the press-fit terminals and the terminal metal-fittings from the top is disposed;

FIG. 11A is a front view, FIG. 11B is a side view, and FIG. 11C is a bottom view;

FIG. 13A is a top view, FIG. 13B is a side view, and FIG. 13C is an enlarged view of a region of "M" which is shown by a circle using a dashed line in FIG. 13A;

FIG. 14A is a side cross-sectional view showing a state before performing the above press-fitting, FIG. 14B is a side cross-sectional view showing a state when the press-fitting is begun, and FIG. 14C is a side cross-sectional view showing a state when the press-fitting is completed;

FIG. 18A is a perspective view showing the terminal connection component and the terminal connection structure according to the second embodiment of the present invention from the terminal metal-fitting side of the motor, as well as FIG. 10B, and FIG. 18B is a perspective view showing an example that the cover which covers the press-fit terminals and the terminal metal-fittings from the top is disposed;

FIG. 21A is a front view, FIG. 21B is a side view, and FIG. 21C is a side view of a different example;

FIGS. 22A, 22B and 22C are diagrams showing an embodiment of the terminal metal-fitting according to the third embodiment, FIG. 22A is a top view, FIG. 22B is a front view, and FIG. 22C is a side view;

FIG. 23A is a front view showing a state before performing the above press-fitting, FIG. 23B is a front view showing a state when the press-fitting is begun, FIG. 23C is a front view showing a state when the press-fitting is completed, and FIG. 23D is a front view showing a relationship between a width of the inserting section of the press-fit terminal and a width of the holding section of the terminal metal-fitting;

FIG. 25A is a front view, and FIG. 25B is a side view;

FIG. 26A is a top view, FIG. 26B is a front view, and FIG. 26C is a side view;

FIG. 27A is a front view showing a state before performing the above press-fitting, FIG. 27B is a front view showing a state when the press-fitting is begun, and FIG. 27C is a front view showing a state when the press-fitting is completed, and FIG. 27D is a front view showing a relationship between a width of the inserting section of the press-fit terminal and a width of the holding section of the terminal metal-fitting;

FIG. 28A is a perspective view showing the configuration of the fixing plate according to the third embodiment from the terminal metal-fitting side of the motor, and FIG. 28B is a perspective view showing the configuration of the fixing plate according to the fourth embodiment from the terminal metal-fitting side of the motor;

FIG. 30A is a top view of the cover, FIG. 30B is a side view of the cover, FIG. 30C is a bottom view of the cover, and FIG. 30D is an enlarged cross-sectional view, taken along line X-X in FIG. 30C;

FIGS. 33A, 33B and 33C are diagrams in a case that an S-shape shock absorbing section is disposed at the extending section of the terminal metal-fitting in the third embodiment as an example, FIG. 33A is a top view, FIG. 33B is a front view, and FIG. 33C is a side view, as well as FIGS. 22A, 22B and 22C;

FIGS. 34A, 34B and 34C are diagrams in a case that a W-shape shock absorbing section is disposed at the extending section of the terminal metal-fitting in the fourth embodiment as an example, FIG. 34A is a top view, FIG. 34B is a front view, and FIG. 34C is a side view, as well as FIGS. 26A, 26B and 26C;

Figure 37A:
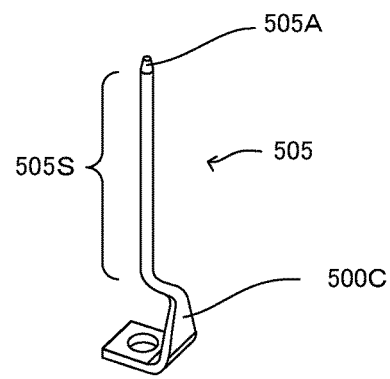
FIG. 37A is a perspective view showing an example of the press-fit example in which the round bar is used, and FIGS.

37B and 37C are top views showing examples of the holding section of the terminal metal-fitting corresponding to FIG. 37A.

MODE FOR CARRYING OUT THE INVENTION

Embodiments according to the present invention will be described as examples in a case that a terminal connection component, and a terminal connection structure between a control unit using the same and a motor according to the present invention are used to an electric power steering apparatus (EPS).

The electric power steering apparatus applies a rotational torque of an electric motor as a steering assist torque (an assist torque) to a steering mechanism of the vehicle. The electric power steering apparatus applies a driving torque of the motor as the steering assist torque to a steering shaft or a rack shaft by means of a transmission mechanism such as gears or a belt through a reduction mechanism. In order to accurately generate the steering assist torque, such an electric power steering apparatus (EPS) performs a feedback control of a motor current.

The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

Figure 1:
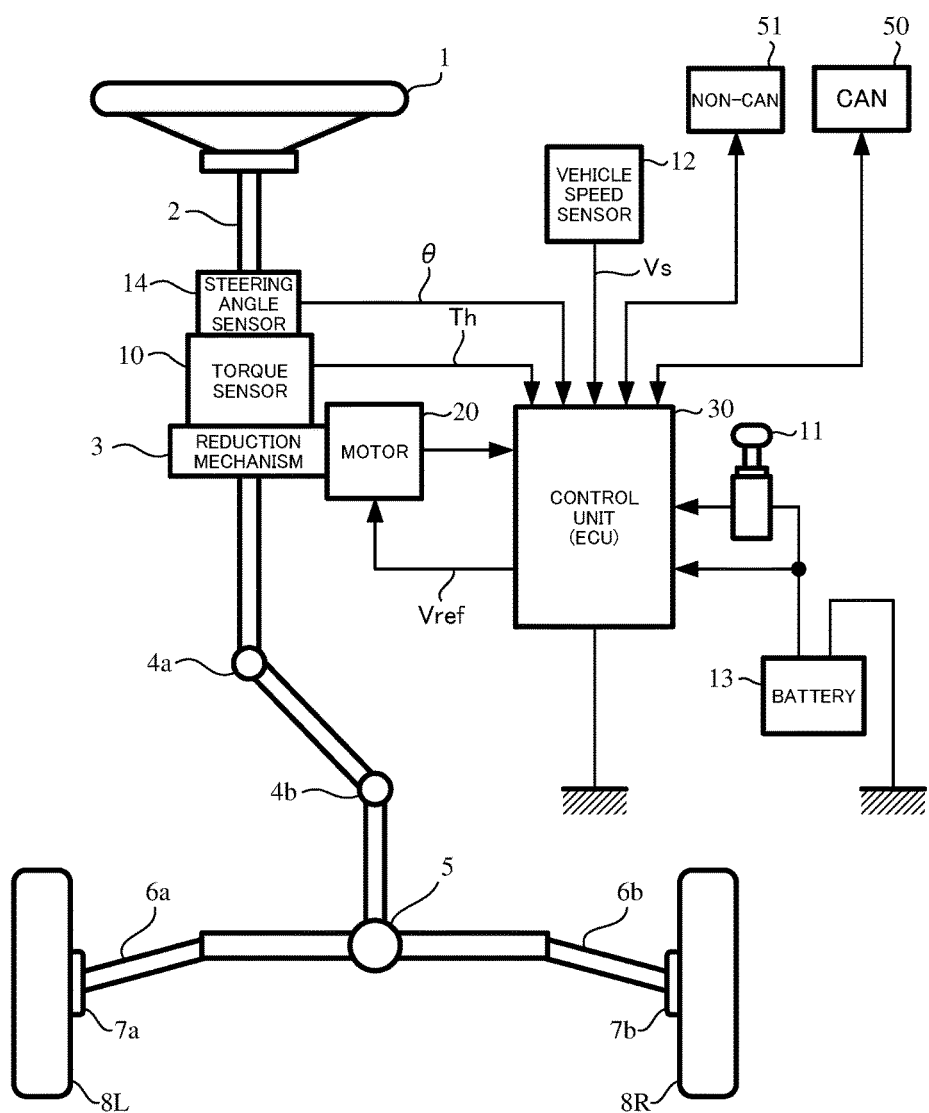
FIG. 1 is a configuration diagram showing a general outline of an electric power steering apparatus.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears of a reduction mechanism 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the handle 1 and a steering angle sensor 14 for detecting a steering angle θ, and a motor 20 for assisting a steering torque of the handle 1 is connected to the column shaft 2 through the reduction gears (a gear ratio "n") of the reduction mechanism 3.

A control unit (ECU) 30 that is a control apparatus which controls the electric power steering apparatus comprises a micro controller unit (MCU) as a core part. The electric power is supplied to a control unit (ECU) 30 from a battery 13, and an ignition key signal is inputted into the control unit (ECU) 30 through an ignition key 11.

Such a control unit 30 calculates a current command value of an assist (steering assist) command on the basis of a steering torque Th detected by the torque sensor 10 and a vehicle speed Vs detected by a vehicle speed sensor 12, and controls a current supplied to the motor 20 by means of a voltage control value Vref obtained by performing compensation or the like for the steering assist command value. The steering angle sensor 14 is not indispensable and may not be provided. It is possible to obtain the steering angle from a rotational position sensor such as a resolver which is connected to the motor 20.

The controller area network (CAN) 50 to send/receive various information and signals on the vehicle is connected to the control unit 30, and it is also possible to receive the vehicle speed Vs from the CAN 50. Further, a Non-CAN 51 to send and receive a communication, analogue/digital signals, electric wave or the like except for the CAN 50 is also connected to the control unit 30.

Figure 2:
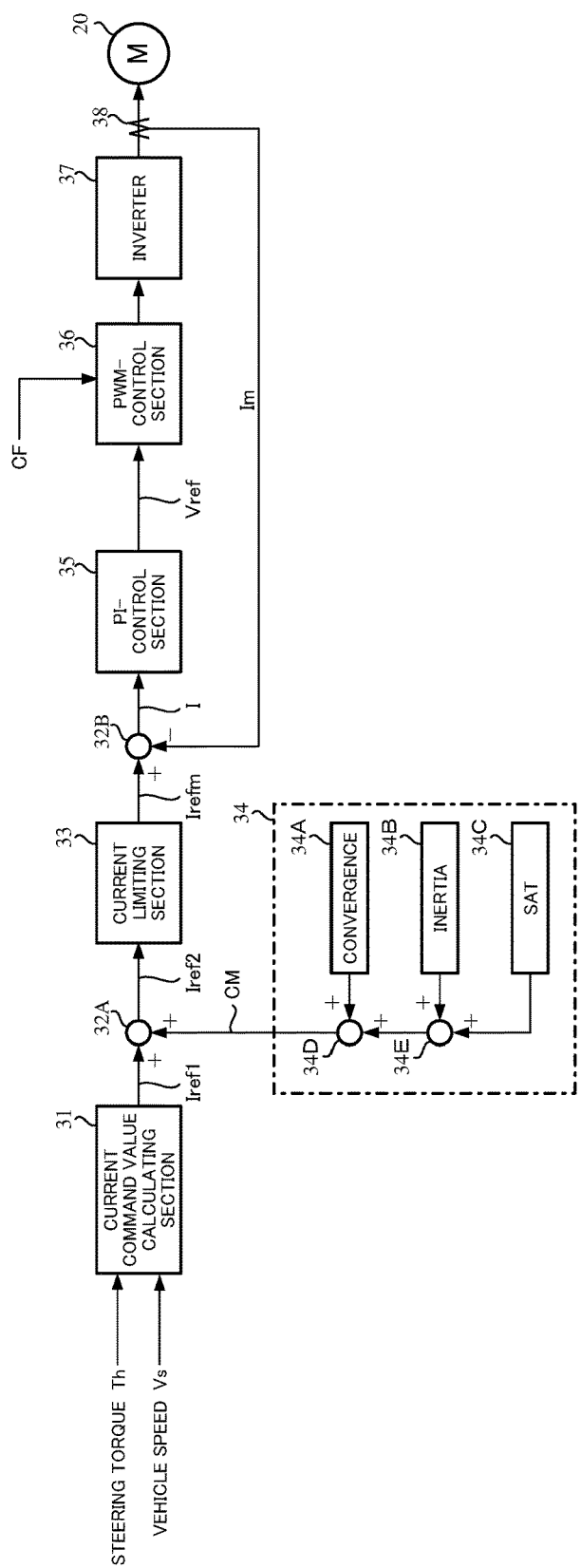
FIG. 2 is a block diagram showing a configuration example of a control unit (ECU) of the electric power steering apparatus.

General functions performed by programs within the above MCU of the above control unit 30 are shown in FIG. 2.

Functions and operations of the control unit 30 will be described with reference to FIG. 2. The steering torque Th detected by the torque sensor 10 and the vehicle speed Vs detected by the vehicle speed sensor 12 are inputted into a current command value calculating section 31. The current command value calculating section 31 calculates a current command value Iref1, based on the steering torque Th and the vehicle speed Vs with reference to an assist map and the like. The calculated current command value Iref1 is added to a compensation signal CM from a compensating section 34 for improving a characteristic at an adding section 32A, and an added current command value Iref2 limits the maximum value at the current limiting section 33. A current command value Irefm, which limits the maximum value, is inputted into a subtracting section 32B and a motor current detecting value Im is subtracted from the current command value Irefm.

The subtracted result I (=Irefm−Im) at the subtracting section 32B is proportional-integral (PI)-controlled at a PI-control section 35. The PI-controlled voltage control value Vref and a modulation signal (carrier) CF are inputted into a pulse width modulation (PWM)-control section 36, and a duty is calculated. The motor 20 is PWM-driven with a duty-calculated PWM-signal via an inverter 37. The motor current value Im of the motor 20 is detected by a motor current detecting means 38, and is fed-back to the subtracting section 32B.

The compensating section 34 adds a detected or estimated self-aligning torque (SAT) 34C to an inertia compensation value 34B at an adding section 34E, the added result is added to a convergence control value 34A via the adding section 34D. The above added result is inputted into the adding section 32A as the compensation signal CM to improve a characteristic.

Figure 3:
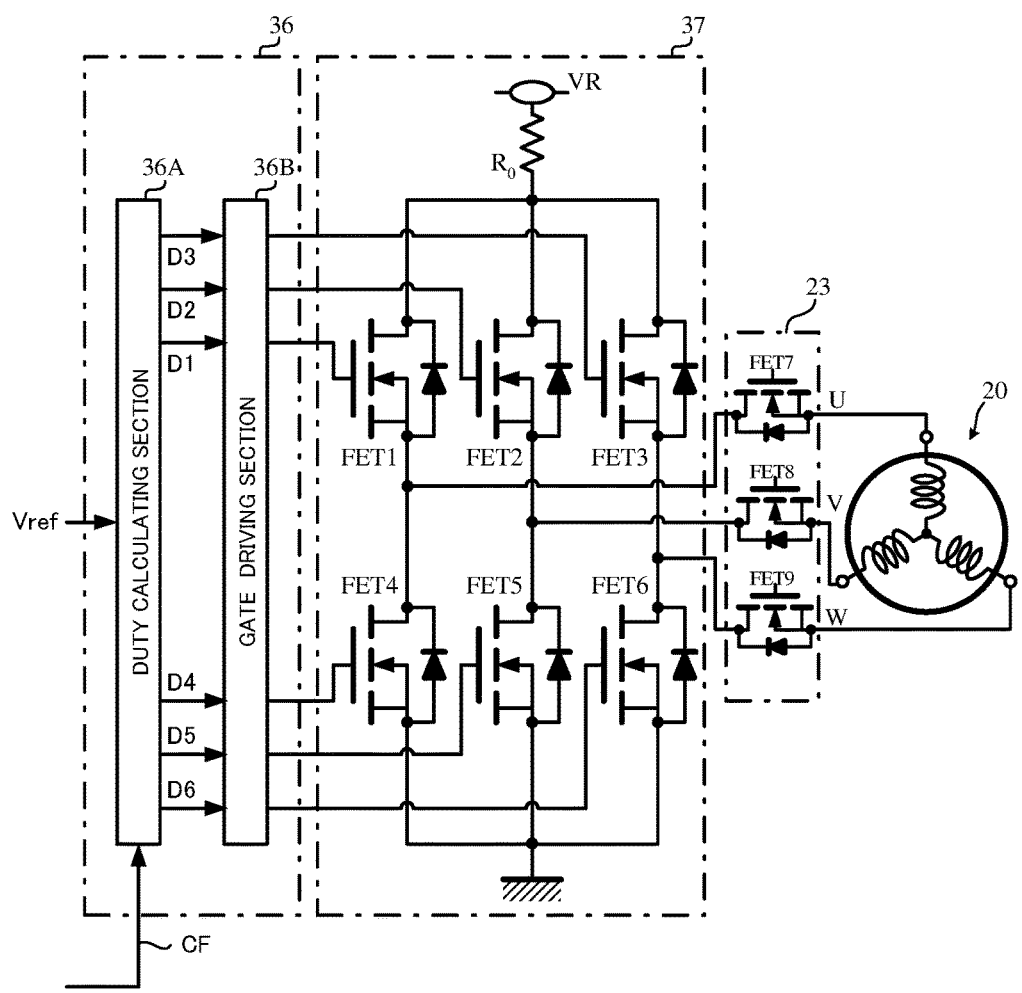
FIG. 3 is a diagram showing a general outline of a PWM-control section and a configuration example of an inverter circuit.

In a case that the above motor 20 is a 3-phase brushless motor, details of the PWM-control section 36 and an inverter 37 are shown in for example a configuration of FIG. 3. The PWM-control section 36 comprises a duty calculating section 36A that calculates 3-phase PWM-duty values D1 to D6 from the voltage control value Vref in accordance with a predetermined equation, and a gate driving section 36B that drives gates of field-effect transistors (FETs) as driving elements by using the PWM-duty values D1 to D6 and turns-ON or turns-OFF for compensating a dead time. The modulation signal (carrier) CF is inputted into the duty calculating section 36A, and the duty calculating section 36A calculates the PWM-duty values D1 to D6 in synchronization with the modulation signal CF.

The inverter 37 comprises a 3-phase bridge that includes the first up-down arm which includes an upper FET1 and a lower FET4 of a U-phase, the second up-down arm which includes an upper FET2 and a lower FET5 of a V-phase, and the third up-down arm which includes an upper FET3 and a lower FET6 of a W-phase. The above respective FETs drive the motor 20 by turning-ON or turning-OFF based on the PWM-duty values D1 to D6.

As well, a motor release switch 23 to interrupt a supply of a current when stopping the assist control and the like is interposed between the inverter 37 and the motor 20. The motor release switch 23 comprises FET7 to FET9 that include a parasitic diode and are interposed to the respective phases.

In the electric power steering apparatus configured as described above, in order that the control unit 30 is connected to the motor 20 and the like, the terminal connection component and the terminal connection structure according to the present invention, for example, are configured as follows. In the following description, the same reference numerals are used for the same elements even if the elements can take other forms. In addition, duplicated descriptions or configurations may be omitted in some cases. Furthermore, the size, the ratio and the like of each element shown in the drawings may be different from the actual ones for convenience of description.

As described above, the present invention relates to the terminal connection component and the terminal connection structure in order that the control unit 30 is connected to the motor 20 and the like in the electric power steering apparatus. The terminal connection component comprises press-fit terminals in a plate shape, and terminal metal-fittings.

At first, the first embodiment according to the present invention will be described. The terminal connection component and the terminal connection structure using the same are shown in, for example, FIGS. 4A and 4B. Tips of the press-fit terminals 500 which are a plate-shape electrode are press-fitted to and are connected to second hole parts 620 (610 and 620) of the fitting sections disposed on the plate-shape terminal metal-fittings 600 which are electrically connected to the respective phase coils of the motor 20. Further, a cover 700 that covers the press-fit terminals 500 and the terminal metal-fittings 600 can be provided, as shown in FIG. 8B, FIG. 9A, FIG. 9B, FIG. 9C and FIG. 9D.

Figure 4A:
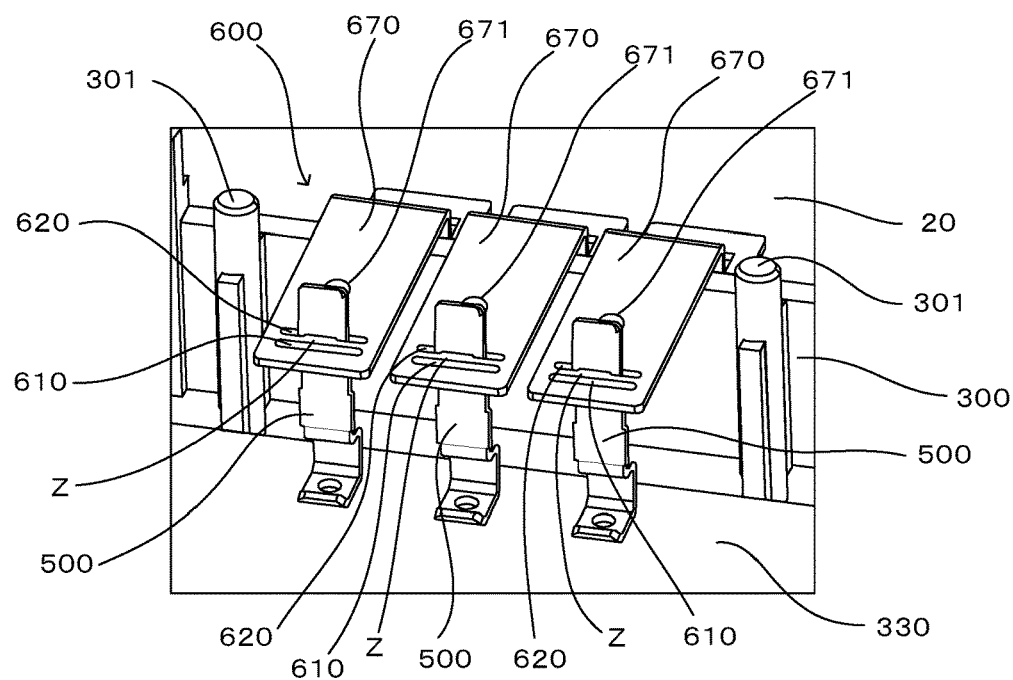
FIG. 4A is a perspective view showing a terminal connection component and a terminal connection structure according to the first embodiment of the present invention from a substrate side in an interior of the control unit.
Figure 4B:
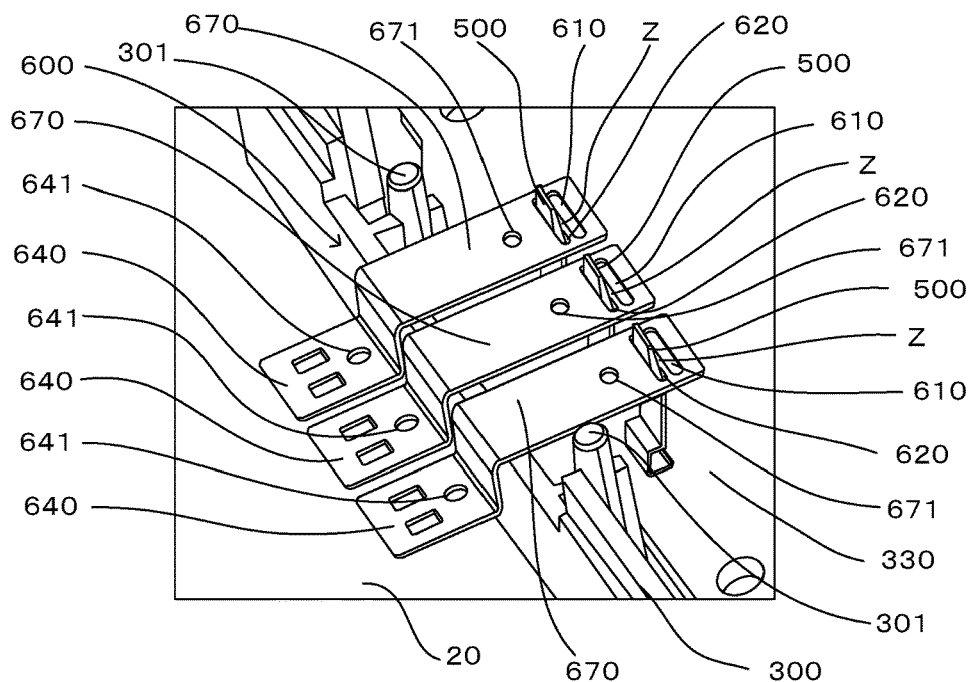
FIG. 4B is a perspective view showing the terminal connection component and the terminal connection structure from a terminal metal-fitting side of a motor.

Then, the above elements will be described as follows. As well, FIGS. 4A and 4B are perspective views showing an outline of the terminal connection component and the terminal connection structure using the same according to the first embodiment of the present invention. FIG. 4A is a perspective view showing the terminal connection structure using the terminal connection component according to the first embodiment from the substrate 330 side in an interior of the control unit 30, and FIG. 4B is a perspective view showing the terminal connection structure using the terminal connection component from the terminal metal-fitting 600 side of the motor 20.

In FIGS. 4A and 4B, a circuit formed on the substrate 330 and portions on which the terminal metal-fittings 600 are disposed are omitted. The portions where the press-fit terminals 500 of the substrate 330 are stood are electrically connected to output lines of the U-phase, the V-phase and the W-phase from the above-described inverter 37 to the motor 20. The terminal metal-fittings 600 of the motor 20 are electrically connected to the 3-phase coils by which the motor 20 is constituted.

In the elements by which the terminal connection structure according to the first embodiment of the present invention is constituted, the control unit 30 is, for example, that of the above-described electric power steering apparatus, and the control unit 30 comprises the substrate 330 on which the control circuit such as the inverter 37, which controls the motor current, is mounted. Here, the substrate 330 is assumed to the power substrate on which the inverter circuit is mounted. Even one substrate which integrates the power substrate with the control substrate which processes the signals from the CAN 50 in the low power system or the like, can be used.

The 3-phase output lines, which are the U-phase, the V-phase and the W-phase, are disposed on the substrate 330 on which the inverter 37 is formed, via the motor release switch 23. The three press-fit terminals 500 having the taper at the tip are stood from the substrate 330 and are connected to the 3-phase output line along the side surface of the substrate 330 in parallel.

Figure 5A:
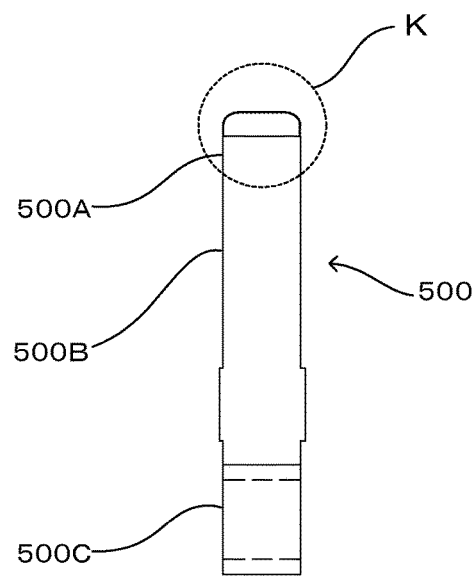
FIGS. 5A, 5B, 5C and 5D are diagrams showing an embodiment of a press-fit terminal stood from the substrate according to the first embodiment.
Figure 5B:
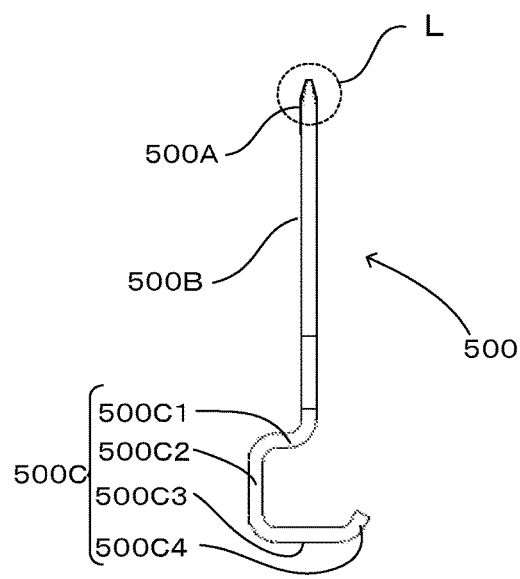
Figure 5C:
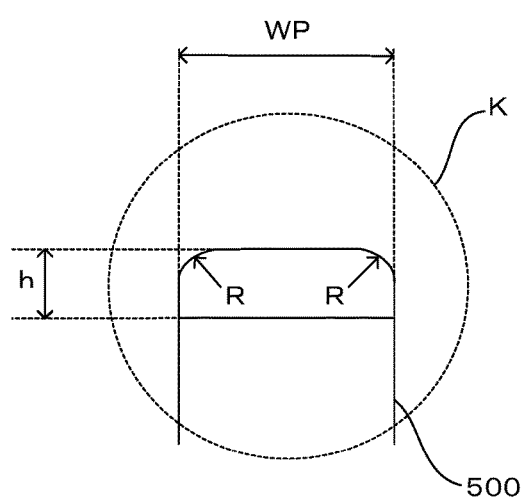
Figure 5D:
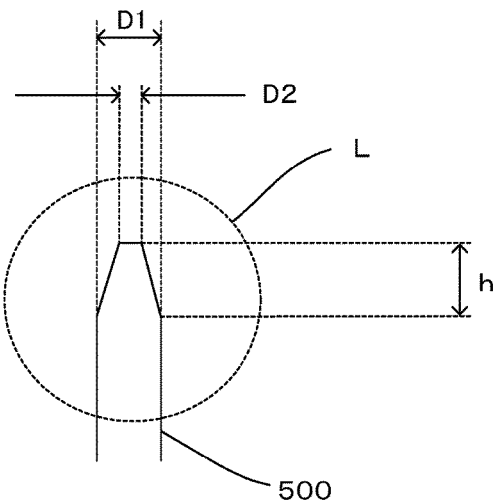

The press-fit terminals 500, for example, are formed by bending a substantially rectangular metal conductor made of copper or the like. The shape of the press-fit terminals 500 is shown in FIGS. 5A, 5B, 5C and 5D. Here, FIGS. 5A, 5B, 5C and 5D show an embodiment of the press-fit terminal 500 stood from the substrate 330 and the like, FIG. 5A is a front view, FIG. 5B is a side view, FIG. 5C is an enlarged view of a region of "K" which is shown by a circle using a dashed line in FIG. 5A, and FIG. 5D is an enlarged view of a region of "L" which is shown by a circle using a dashed line in FIG. 5B.

The configuration of the press-fit terminal 500 is roughly divided into the following sections. The press-fit terminal 500 comprises a tip portion 500A which is a top portion in a case that the press-fit terminal 500 is mounted on the substrate 330 and the like, an extending section 500B to extend from the tip portion 500A to a downward side, and a substrate connecting section 500C to be disposed below the extending section and connect to the substrate 330.

The tip portion 500A is firstly press-fitted to the second hole part 620 (610 and 620) of the fitting section of the terminal metal-fitting 600. The motor 20 is connected to one end of the terminal metal-fitting 600. The embodiment of the tip portion 500A is formed by the one taper, which has round sections having a curvature at both corner portions in the end portion of the rectangular plate, as shown in FIG. 5A, and the other taper, which has a portion that a thickness of side surface portions of the plate decreases toward the end portion as shown in FIG. 5B. That is, the two tapers (double tapers) are formed.

In the tip portion 500A, FIG. 5C specifically shows the configuration that the round sections have the curvature at the both corner portions in the end portion of the rectangular plate. Here, the curve surfaces having an appropriate curvature radius R are formed at the both corner portions in the end portion of the rectangular plate having a width WP by which the press-fit terminal 500 is constituted. Thereby, the fitting to the terminal metal-fitting 600 can easily be performed.

Furthermore, in the tip portion 500A, FIG. 5D specifically shows the configuration that the thickness of the side surface portions of the rectangular plate shape decreases toward the end portion. The configuration shown in FIG. 5D shows an example that the thickness of the side surface portions of the plate decreases from the portion where the length "h" is distant from the end portion, to the end portion. In a case that the thickness of the press-fit terminal 500 defines as "D1", the thickness of the press-fit terminal 500 at the endportion is set to "D2" (D1>D2). As described below, the thickness of D1 is slightly longer than the length of the rectangular inserting portion by which the second hole part 620 of the fitting section (610 and 620) formed on the terminal metal-fitting 600 is constituted. The thickness of D2 is shorter than the second hole part 620.

Consequently, as described above, in a case that the one taper is formed at the both corner portions in the end portion of the rectangular plate, and the other taper is formed at the portion that the thickness of the side surface portions of the plate, are formed with the double tapers, the fitting to the second hole part 620 by which the fitting section (610 and 620) is constituted can further easily be performed.

In an embodiment of the extending section 500B and the substrate connecting section 500C, which is disposed below the extending section 500B, of the press-fit terminal 500, the extending section 500B is combined with at least the substrate connecting section 500C and the tip of the press-fit terminal 500 is upwardly extended along the side surface of the side wall portion of the casing 300 on which the substrate 330 is mounted. It is required that the combined length of the extending section 500B and the substrate connecting section 500C has an adequate length to fit to the terminal metal-fitting 600 from the motor 20.

Further, the substrate connecting section 500C comprises a forward bent section 500C1 to be disposed below the extending section 500B and be bent forwardly, a downward section 500C2 to be bent from one end of the forward bent section 500C1 to downward, a substrate contacting section 500C3 to be bent from the downward section backwardly, be perpendicular to the extending section 500B, and be mounted on the substrate 330, and an jumping-up section 500C4 to slightly and upwardly bend from the surface of the substrate 330 at an end portion of the substrate contacting section 500C3.

The forward bent section 500C1, which is combined with the downward section 500C2, is a portion where a stress against the press-fit terminal 500 is relaxed, and has functions that the stress is relaxed in a case that the large stress is added to the press-fit terminal 500 when the press-fit terminal 500, which is electrically connected to the circuit on the substrate at the substrate contacting section 500C3, is press-fitted to the terminal metal-fitting 600 of the motor 20, and the stress due to the deformation generated by an influence of the temperature variation in the vehicle in which the products according to the present invention is mounted is relaxed.

Figure 11A:
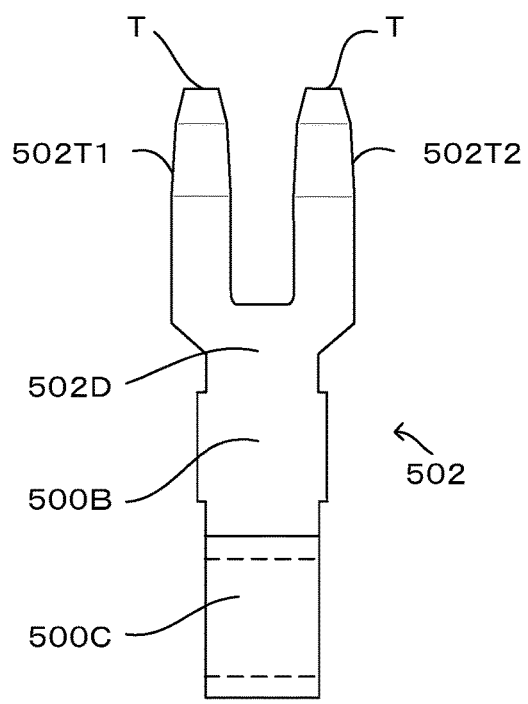
FIGS. 11A, 11B and 11C are diagrams showing an embodiment of the press-fit terminal stood from the substrate according to the second embodiment.
Figure 11B:
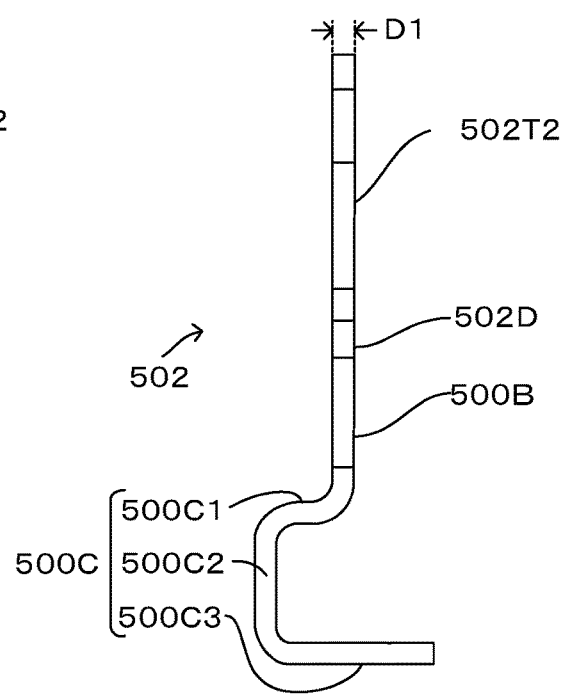
Figure 11C:
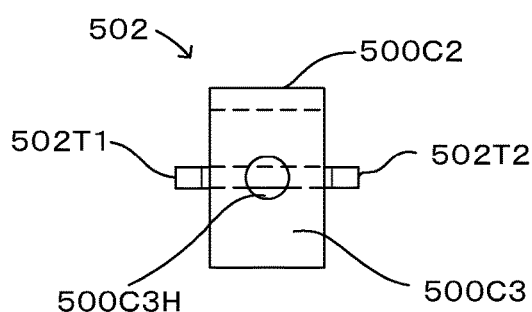

The substrate contacting section 500C3 is a portion electrically connected to the circuit which is formed on the substrate 330. The connection is performed by soldering or the like. Instead of the soldering or in addition to the soldering, using a screw hole 500C3H as shown in FIG. 11C or the like as described below is possible to electrically connect to the substrate contacting section 500C3 and the circuit. In the substrate contacting section 500C3, the connection terminal is used for electrically connecting to the other member. Thus, the substrate contacting section 500C3 is not limited for connecting the substrate, as the name suggests, and can be used for connecting the other member.

Further, in a case that the substrate contacting section 500C3 is connected to the substrate by a reflow process, the jumping-up section 500C4 is formed so that a surface tension due to the dissolved solder to the substrate 330 at the both ends of the substrate contacting section 500C3 is uniform, and the press-fit terminal 500 itself is exactly stood on the substrate 330. The substrate that is connected to the substrate contacting section 500C3 is not especially limited. A metal base substrate and a multilayer substrate may be used.

Next, in the elements by which the terminal connection component and the terminal connection structure using the same according to the first embodiment of the present invention are constituted, a configuration example of the terminal metal-fittings 600 of the motor 20 will be described.

The terminal metal-fittings 600 are electrically connected to the 3-phase (U-phase, V-phase and W-phase) coils by which the motor 20 is constituted. The electrical connection embodiment between each of the terminal metal-fittings 600 and the motor 20 is not especially limited. For example, input terminals, bus bars or the like to the motor 20, which are disposed at the casing of the motor 20 or at the flange of the casing of the motor 20, may be connected to the motor-side connecting section (the fixing-side plate section) 640 at one end of the terminal metal-fittings 600, and then the terminal metal-fittings 600 may be connected to the motor 20.

As shown in FIGS. 4A and 4B, the terminal metal-fittings 600 according to the first embodiment of the present invention have a fitting section (610 and 620) comprising the first hole part 610 and the second hole part 620 as described below. In a case that the fitting section (610 and 620) is disposed on the side surface or the bottom surface of the control unit 30, the terminal metal-fittings 600 are formed from the exterior portion of the case 300 of the control unit 30 to the interior portion of the case 300 and are extended parallel to the substrate 330 so as to be disposed on the upper portion of the press-fit terminals 500. The tip portion 500A of the press-fit terminal 500 is press-fitted to the second hole part 620 of the fitting section (610 and 620) of the terminal metal-fitting 600. Then, the extending section 500B of the press-fit terminal 500 is inserted to the second hole part 620, and is fixedly held at the second hole part 620.

Figure 6A:
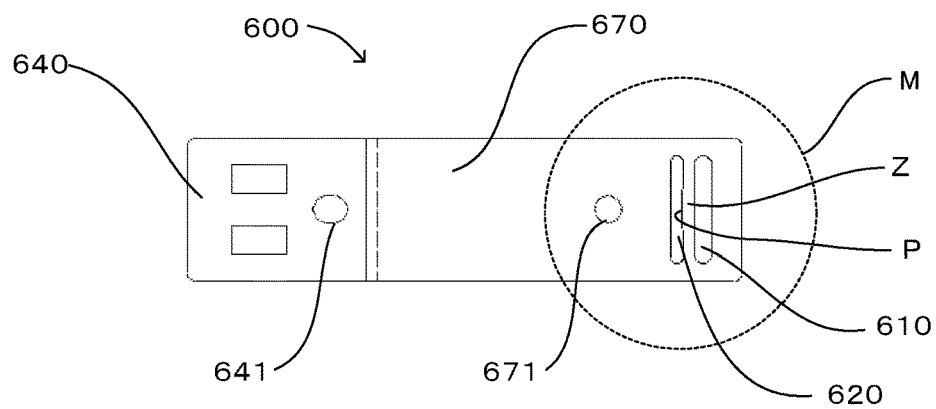
FIGS. 6A, 6B and 6C are diagrams showing an embodiment of the terminal metal-fitting of the motor according to the first embodiment.
Figure 6B:
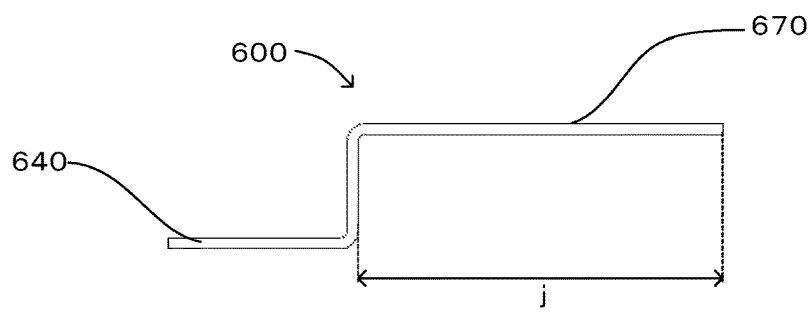
Figure 6C:
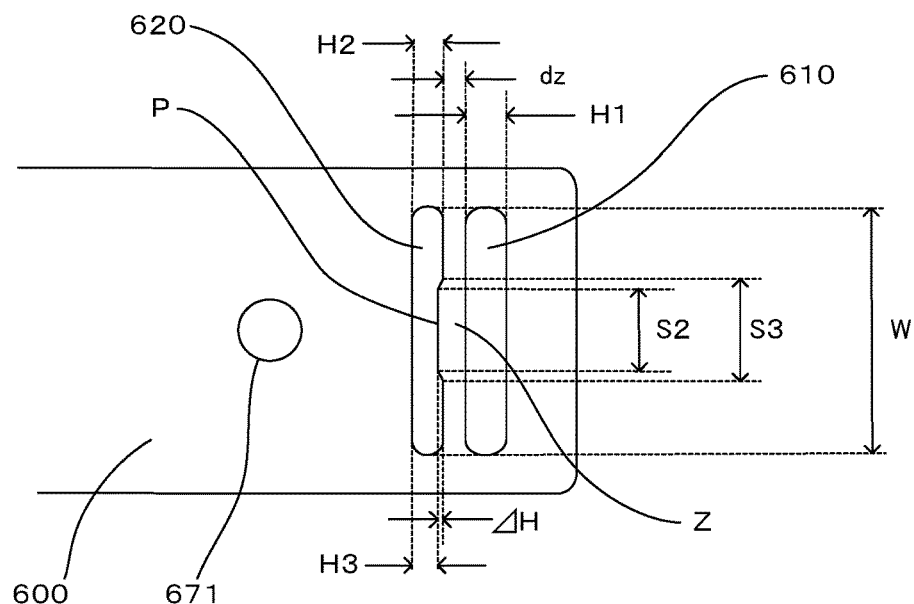

Thus, in the first embodiment of the present invention, for example, as shown in FIGS. 6A, 6B and 6C, the terminal metal-fitting 600 has a configuration that a substantially rectangular metal conductor made of the copper or the like is bent. The terminal metal-fitting 600 comprises a motor-side connecting section (a fixing-side plate section) 640 that forms one end portion of the terminal metal-fitting 600, and an elongating section 670 that elongates to the other portion of the terminal metal-fitting 600 as a parallel plane (a rectangular plane), has a length "j" (see, FIG. 6B), and forms by perpendicularly bending the plate in the vicinity of the other end side of the terminal metal-fitting 600 from the motor-side connecting section (the fixing-side plate section) 640, and further perpendicularly bending the plate (see also, FIG. 6B).

The motor-side connecting section (the fixing-side plate section) 640 is electrically connected to the motor 20 at the motor 20 side.

In the terminal metal-fitting 600, the fitting section (610 and 620) is formed at the one end that is opposite to the motor-side connecting section (the fixing-side plate section) 640, and comprises the first rectangular hole part 610 and the second rectangular hole part 620. The first rectangular hole part 610 is disposed parallel to the second rectangular hole part 620, and is located near the one end.

As described below, a motor-side connecting section-side hole part (a fixing-side plate section-side hole part) 641 is disposed at a portion adjacent to the elongating section 670 of the motor-side connecting section (the fixing-side plate section) 640. An elongating section-side hole part 671 is disposed at a portion adjacent to the motor-side connecting section (the fixing-side plate section) 640 of the fitting section (610 and 620) in the elongating section 670. These hole parts can be used for fixing the case 700 and the like.

Here, FIGS. 6A, 6B and 6C show an embodiment of the terminal metal-fitting 600 of the motor. FIG. 6A is a top view, FIG. 6B is a side view, and FIG. 6C is an enlarged view of a region of "M" which is shown by a circle using a dashed line in FIG. 6A.

As described above, the fitting section (610 and 620) of the terminal metal-fitting 600 comprises the first hole part 610 and the second hole part 620. The press-fit terminal 500 stood from the substrate 330 is fitted-in to the second hole part 620 in the fitting section (610 and 620) so that the press-fit terminal 500 is surely press-fitted to the fitting section of the terminal metal-fitting. In addition, the first hole part 610 is disposed adjacent to the second hole part 620 in parallel. An elastic deforming section Z that biases the press-fit terminal 500 in the thickness direction is disposed between the first hole part 610 and the second hole part 620. In the first embodiment of the present invention, the press-fit terminal is connected to the fitting section of the terminal metal-fitting by using the above hole parts and the elastic deforming section Z.

That is, the press-fit terminal 500 and the fitting section (610 and 620) of the terminal metal-fitting 600 are manufactured in consideration of the dimensional tolerance and the like in which the fitting between both members is considered. However, the dimensional tolerance is a value having a constant variation width. It is possible that the thickness of the press-fit terminal 500 is longer than the expected width of the corresponding portion of the second hole part 620.

In this connection, as described below, in the first embodiment of the present invention, a shifted region P to which the press-fit terminal 500 is abutted is provided at the second hole part 620 by which the fitting section (610 and 620) is constituted. Thereby, the press-fit terminal 500 can be held from the thickness direction by the shifted region P. Even when the thickness of the press-fit terminal 500 has a variation, the elastic deforming section Z disposed between the first hole part 610 and the second hole part 620 biases the shifted region P in the thickness direction of the press-fit terminal 500 with the appropriate stress so that the press-fit terminal 500 is surely press-fitted to and is held by fitting section 620 of the terminal metal-fitting 600.

In order to achieve the effect, the first hole part 610 in the fitting section (610 and 620) is formed by the substantially rectangular shape, corresponding to a cross-sectional embodiment of the inserted portion by the press-fit terminal 500.

For example, as shown in FIG. 6C, the short side in the first substantially rectangular hole part 610 has a semicircular shape whose diameter is "H1" which is a length of the short side of the substantially rectangular hole part 610. However, the shape is not especially limited to the above semicircular shape. As shown in FIG. 6C, the long side in the substantially rectangle has a length W which is the same as or longer than the lateral width WP of the plate of the press-fit terminal 500.

Further, as described below, the elastic deforming section Z disposed between the first hole part 610 and the second hole part 620 functions as the plate spring against the widening of the hole part portion of the second hole part 620 by the press-fit terminal 500, and biases in the thickness direction against the press-fit terminal 500 by using the stress. The width dz in the elastic deforming section Z and the shift width ΔH in the shifted region P can be determined by considering the material of the terminal metal-fitting 600, the deformation when the press-fit terminal 500 is press-fitted to the second hole part 620, and the distance between the first hole part 610 and the second hole part 620 so that the deformation is not plastic deformation and the elastic deforming section Z can function as the plate spring by elastic deformation.

As well as the first hole part 610, the second hole part 620 in the fitting section (610 and 620) is formed in the substantially rectangular shape, corresponding to the cross-sectional embodiment of the inserted portion of the press-fit terminal 500.

For example, as shown in FIG. 6C, as well as the first hole part 610, the short side in the second substantially rectangular hole part 620 has a semicircular shape whose diameter is "H2". However, the shape is not especially limited to the above semicircular shape. The length "H2" of the short side of the substantially rectangular hole part is slightly longer than the thickness "D1" of the plate of the press-fit terminal 500 (H2>D1). When the press-fit terminal 500 is inserted to and is press-fitted to the second hole part 620, the inserting is easily performed even when the slight position variation is occurred.

As shown in FIG. 6C, as well as the long side in the first hole part 610, the long side in the second substantially rectangular hole part 620 has a length W which is the same as or longer than the lateral width WP of the plate of the press-fit terminal 500. In the space between the long side in the first hole part 610 and the long side in the second hole part 620, the central portion P of one long side near the first hole part 610 is shifted the width ΔH to (is parallel-translated the width ΔH to) an interior of the second hole part 620 so that the length of the central portion of the second hole part 620 is slightly shorter than the thickness D1 of the press-fit terminal 500, and the press-fit terminal 500 is surely fitted to the second hole part 620 by the press-fitting.

In other words, the length of the short side in the second substantially rectangular hole part 620 (the width of the second section 620) has a width H2 at both ends, and has a width H3 at the central portion P, which decreases by the width ΔH. The width H3 is slightly shorter than the thickness D1 of the press-fit terminal 500 so that the press-fit terminal 500 is press-fitted to and is held by the second hole part 620. Thus, a relationship of the respective widths is "H2>D1>H3". Since the dimensional tolerance is considered in the above relationship when manufacturing, the slight manufacturing variation can be handled.

As described above, the region P, which is disposed at the central portion of the long side near the first hole part 610 in the two long sides of the second substantially rectangular hole part 620, and has a length "S2", is gradually shifted to an interior direction of the second hole part 620 from the portion whose length between both ends is "S3" (see, FIG. 6C). The size of the region P having the length "S2" is not especially limited. The size of the region P is needed such that the second hole part 620 can hold the press-fit terminal 500. For example, the length "S2" of the region P is determined by an appropriate ratio to the length "W" which is the long side of the second substantially rectangular hole part 620. Even when the position where the press-fit terminal 500 is press-fitted is slightly moved to the lateral width "WP" direction, the region P having the length "S2" can press the plate of the press-fit terminal 500.

Figure 7A:
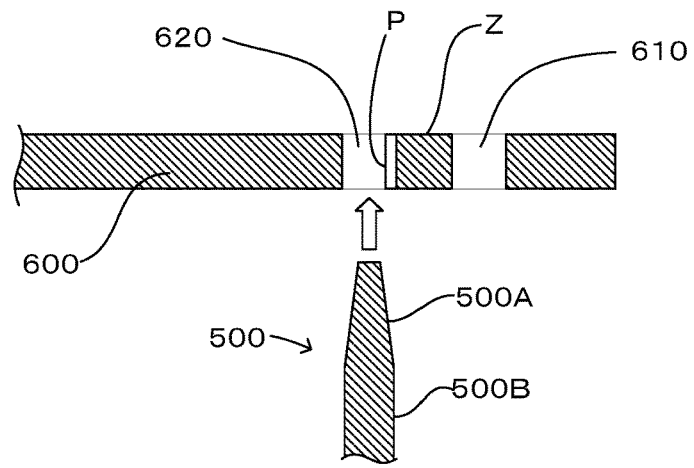
FIGS. 7A, 7B and 7C are side cross-sectional views showing a state when the press-fit terminal is press-fitted to a fitting section of the terminal metal-fitting in the first embodiment.
Figure 7B:
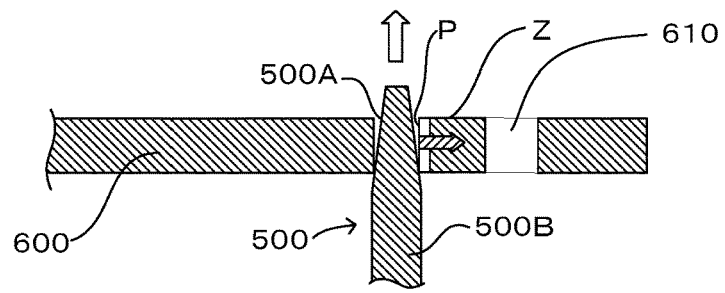
Figure 7C:
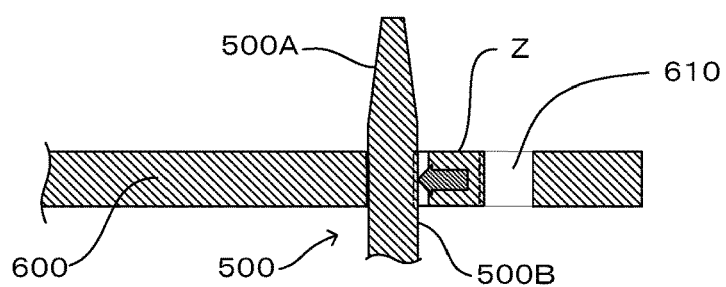

A method that the press-fit terminal 500 is press-fitted to the second hole part 620 in the fitting section (610 and 620) of the terminal metal-fitting 600 will be described with reference to FIGS. 7A, 7B and 7C as follows. Here, FIGS. 7A, 7B and 7C are side cross-sectional views showing a state when the press-fit terminal 500 is press-fitted to the fitting section (610 and 620) of the terminal metal-fitting 600, FIG. 7A is a side cross-sectional view showing a state before performing the above press-fitting, FIG. 7B is a side cross-sectional view showing a state when the press-fitting is begun, and FIG. 7C is aside cross-sectional view showing a state when the press-fitting is completed. The elongating section-side hole part 671 is omitted in FIGS. 7A, 7B and 7C.

As shown in FIG. 7A, since the thickness of the tip portion 500A of the press-fit terminal 500 is shorter than the width of the second hole part 620 in the fitting section (610 and 620) of the terminal metal-fitting 600 in a state before the press-fitting, the positioning can be easily performed. The tip portion 500A of the press-fit terminal 500 is relatively moved to the second hole part 620 in a white arrow direction shown in FIG. 7A and is easily press-fitted to the second hole part 620.

Next, as shown in FIG. 7B, when the tip portion 500A of the press-fit terminal 500 begins to be press-fitted to the second hole part 620 of the terminal metal-fitting 600, the taper surface of the tip portion 500A of the press-fit terminal 500 is smoothly inserted to the second hole part 620 in a white arrow direction shown in FIG. 7B. As shown in FIGS. 6B and 6C, since the fitting section (610 and 620) of the terminal metal-fitting 600 is formed at the one end of the elongating section 670 of the terminal metal-fitting 600, in a case that the length "j" of the elongating section 670 is elongated, the stress which is generated when the position is moved in the press-fitting can be relaxed.

Subsequently, when the press-fitting is progressed, the space between the region P shifted to an interior to the second hole part 620 and the tip portion 500A of the press-fit terminal 500 is gradually narrowed. In a case that the thickness of the tip portion 500A of the press-fit terminal 500 is longer than the width at the region P which is shifted to the interior to the second hole part 620 in the fitting section (610 and 620) of the terminal metal-fitting 600 due to the variation in manufacturing and the like, the elastic deforming section Z formed between the first hole part 610 and the second hole part 620 is elastically deformed in a hatched line arrow direction shown in FIG. 7B depending on the magnitude of the deformation.

When the press-fitting is further progressed, the space between the press-fit terminal 500 and the central portion of the second hole part 620 (the region P shifted to the interior of the second hole part 620) becomes narrower. In a case that the press-fitting is progressed to the extending section of the press-fit terminal 500, since an inside dimension at the central portion of the second hole part 620 is smaller than the thickness D1 of the press-fit terminal 500, finally the space is not existed, and the press-fitting is completed in the dimensional tolerance of the material thickness. In the above case, since the thickness of the tip portion 500A of the press-fit terminal 500 is longer than the width at the region P shifted to the interior of the second hole part 620 in the fitting section (610 and 620) of the terminal metal-fitting 600 due to the variation in manufacturing and the like, the elastic deforming section Z formed between the first hole part 610 and the second hole part 620 is moved from the position before the deformation shown by the dashed line in FIG. 7C to the rightward. However, since the above deformation is the elastic deformation, the elastic deforming section Z operates the force to the press-fit terminal 500 in the thickness direction shown by the hatched line in FIG. 7C. This force is operated to hold the press-fit terminal 500, and it is possible to fixedly hold the press-fit terminal 500 by the terminal metal-fitting 600.

As well, as described above, the press-fitting is performed, checking the stroke of the press-fitting (checking the amount of the press-fitting when the press-fit terminal 500 is press-fitted to the terminal metal-fitting 600), checking the force in using the press-fitting (the press-fitting force), and confirming that the extending section 500B arrives at or enters into the portion where the press-fitting is performed.

In a case of performing the above embodiment, the dimensional tolerance is considered. For example, the following dimensions can be set. The reference dimension of the thickness D1 of the press-fit terminal 500 is set to 0.6 [mm] (the maximum tolerance dimension and the minimum tolerance dimension are respectively set to "+0.02 [mm]" and "−0.02 [mm]", and in a case that the process can be more precisely, the maximum tolerance dimension and the minimum tolerance dimension may respectively be set to "+0.015 [mm]" and "−0.015 [mm]"), the reference dimensions of the thickness D2 and the lateral width WP of the tip portion are respectively set to 0.2 [mm] and 3.2 [mm] (the maximum tolerance dimension and the minimum tolerance dimension may respectively be set to "+0.1 [mm]" and "−0.1 [mm]"), the length at the region h where the taper at the end side surface is set to 1.0 [mm], the reference dimensions of the width H2 at the end portion side and the width H3 at the central portion side of the second hole part 620 in the fitting section (610 and 620) of the above terminal metal-fitting 600 are respectively set to 0.7 [mm] and 0.6 [mm] (the maximum tolerance dimension and the minimum tolerance dimension are respectively set to "−0.04 [mm]" and "−0.07 [mm]"), the length W of the long side of the hole parts is set to 5.3 [mm], the length S2 of the portion where the second hole part is shifted to an interior direction is set to 2.0 [mm], and the length S3 of the portion where the second hole part begins to be shifted to an interior direction is set to 2.4 [mm].

Thus, by adopting the above configuration, the thickness D1 of the press-fit terminal 500 is slightly longer than the width H3 at the central portion of the second hole part 620 of the terminal metal-fitting 600, and the press-fit terminal 500 can be press-fitted to and can be connected to the terminal metal-fitting 600.

Figure 8A:
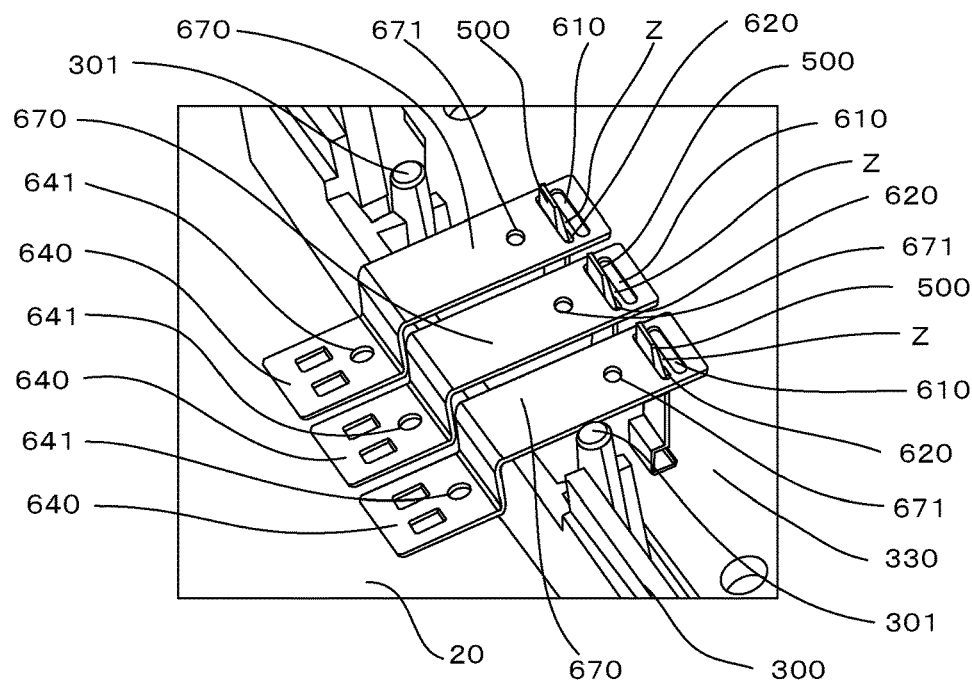
FIGS. 8A and 8B are diagrams for explaining a cover which covers the press-fit terminals and the terminal metal-fittings according to the first embodiment of the present invention.
Figure 8B:
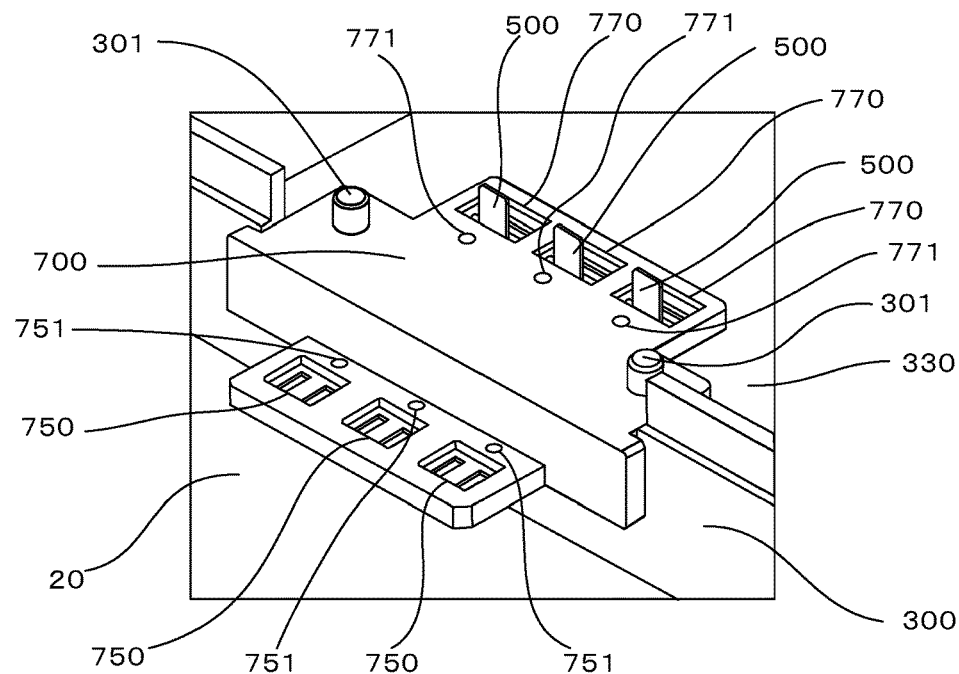
Figure 9A:
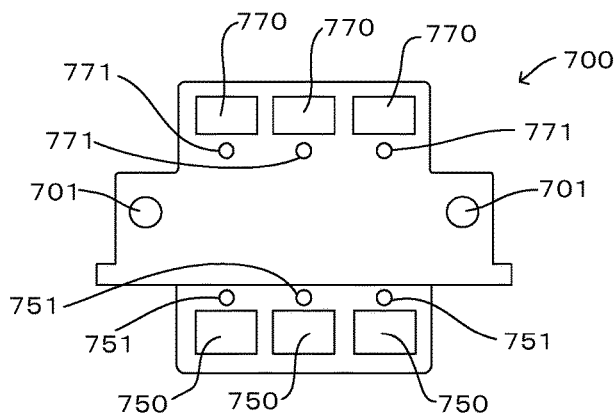
FIG. 9A is a top view of the cover.
Figure 9B:
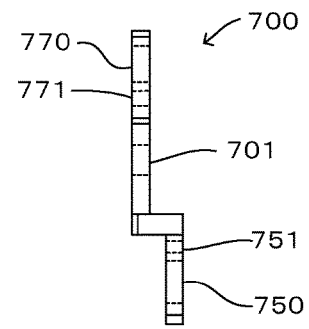
FIG. 9B is a side view of the cover.
Figure 9C:
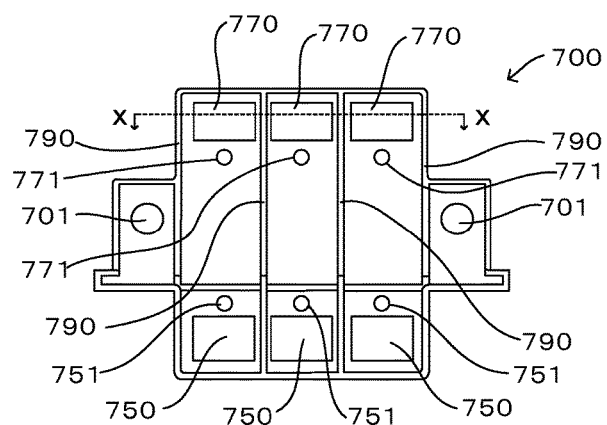
FIG. 9C is a bottom view of the cover.
Figure 9D:
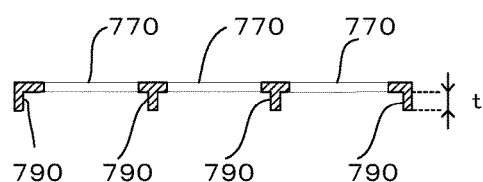
FIG. 9D is an enlarged cross-sectional view, taken along line X-X in FIG. 9C.

Further, in the terminal connection structure according to the first embodiment of the present invention, as shown in FIG. 8B and FIGS. 9A, 9B, 9C and 9D, the configuration that the cover 700 covers the press-fit terminals 500 and the terminal metal-fittings 600 which are connected to the press-fit terminals 500, can be adopted. Here, FIGS. 8A and 8B are diagrams for explaining the cover 700 which covers the press-fit terminals 500 and the terminal metal-fittings 600 which are connected to the press-fit terminals 500 according to the present invention, FIG. 8A is a perspective view showing the terminal connection structure according to the present invention from the terminal metal-fitting 600 side of the motor 20, as well as FIG. 4B, and FIG. 8B is a perspective view showing an example that the cover 700, which covers the press-fit terminals 500 and the terminal metal-fittings 600, is disposed as well as FIG. 8A. FIG. 9A is a top view of the cover 700, FIG. 9B is a side view of the cover 700, FIG. 9C is a bottom view of the cover 700, and FIG. 9D is an enlarged cross-sectional view, taken along line X-X in FIG. 9C;

The cover 700 according to the first embodiment of the present invention is disposed for protecting the press-fit terminals 500, the terminal metal-fittings 600 and the terminal connection structure.

That is, in the terminal connection structure according to the first embodiment of the present invention, the press-fit terminals 500 stood from the substrate 330 of the control unit 30 are directly connected to the terminal metal-fittings 600 which are connected to the motor 20 without using the conventional connectors and the conventional terminal blocks. The improvement of the environment performance is achieved by reducing the number of the parts and not using the solder or the like.

However, for example, in a case that the present invention is used in the electric power steering apparatus and the like, the control unit 30 and the like in the power electric power steering apparatus are disposed in the vehicle. Since the variation in the external environment such as dust, moisture and the like is large, it is preferred to adopt the closed structure to some extents in order to prevent these influences. The space in the connection section can be occurred due to the vibration of the vehicle. It is preferred to suppress the space to the constant amount due to the vibration of the connection section, in order to prevent such the space. Since the vehicle is exposed to the harsh environments such as the high temperature environment or the low temperature environment for a long term, it is preferred that the structure that the above terminal connection structure is not directly exposed to the harsh environments be adopted.

Since the terminal metal-fittings 600 are extended from the side surface of the case 300 of the control unit 30 or the like to an interior of the case 300 and are connected to the press-fit terminals 500 and further the connection section has the protruding portion from the case 300 of the control unit, the portion where the cover of the case 300 itself is not protected is existed. Therefore, it is preferred that the terminal connection structure including the terminal metal-fitting 600 be protected and be electrically insulated and the heat dissipation at the terminal connection structure be enhanced.

In this connection, in the first embodiment of the present invention, in order to protect the press-fit terminals 500 and the terminal metal-fittings 600, and protect and surely electrical-insulate the terminal connection structure from such the external environments, the configuration that the cover is disposed can be adopted.

Accordingly, the cover 700 is made of an acrylonitrile-butadiene-styrene resin (an ABS resin), an insulating and high heat conductive resin or the like. As shown in FIG. 8B, the cover 700 covers the press-fit terminals 500 and the terminal metal-fittings 600 from above of the connection portion of the substrate 330 and the terminal metal-fittings 600 of the motor 20, and the connection portion of the control unit 30 and the terminal metal-fittings 600 of the motor 20.

More concretely, as shown in FIG. 8B and FIGS. 9A, 9B, 9C and 9D, the cover 700 is formed from the upper surface of the motor-side connecting section (the fixing-side plate section) 640 in the motor 20 side of the terminal metal-fittings 600, is bent upwardly so as to cover the surfaces of the terminal metal-fittings 600 toward the elongating section 670 side of the terminal metal-fittings 600, is formed parallel to the upper surface side of the elongating section 670 of the terminal metal-fittings 600 beyond the outer edge of the case 300 of the control unit 30 from the motor 20 side, and is configured to cover the end side of the elongating section 670 of the terminal metal-fittings 600 beyond the first hole part 610 and the second hole part 620 in the fitting section (610 and 620).

In a case that the cover 700 covers the press-fit terminals 500 and the terminal metal-fittings 600 from above, motor-side connecting section opening windows (fixing-side plate section opening windows) 750 are formed at the corresponding upper surface portions where the motor-side connecting sections (the fixing-side plate sections) 640 are electrically connected to the motor 20, and fixing section opening windows 770 are formed at the upper surface portions of the first hole parts 610 and the second hole parts 620 in the fixing sections (610 and 620) of the elongating sections 670 (see, FIG. 9A). These opening windows (750 and 770) are formed by punching between the top surface (the upper surface) of the cover 700 and the bottom surface (the back surface) of the cover 700. The shape of these openings (750 and 770) are formed as, for example, the quadrangular openings.

Further, in a case of adopting such a configuration, by using these opening windows (750 and 770), the connection state between the terminal metal-fittings 600 and the motor 20, and the connection state between the terminal metal-fitting 600 and the press-fit terminal 500 can be visually confirmed from the external even after the cover 700 is attached.

As shown in FIGS. 9C and 9D, insulating walls 790 are disposed on the bottom surface side (the back surface side) of the cover 700.

The insulating walls 790 insulate between the terminal metal-fittings 600 and between the terminal metal-fitting 600 and the external environment, prevent from the variance and the like of the terminal metal-fitting 600 due to the vibration, and stand from the bottom surface of the cover 700 so as to surround a circumference of the terminal metal-fittings 600.

In a case that the cover 700 is covered from above of the terminal metal-fittings 600, the height "t" of the insulating walls 790 is formed so as to extend to the below in the position of the plates of the terminal metal-fittings 600. Even in a case that the terminal metal-fittings 600 is slightly vibrated in the upward and downward directions, the cover 700 is formed so that the plate surfaces of the elongating sections 670 are not protruded from the beneath of the side surface of the insulating walls 790.

The fixing method of the cover 700 is not especially limited. An appropriate fitting structure may be disposed between the cover 700 and the press-fit terminal 500 or between the cover 700 and the terminal metal-fitting 600. Or the structure that the case 300 is fixed by providing a control unit-side engaging section 301 in a part of the case 300 of the control unit 30, providing a cover-side engaging section 701 in the cover 700, which is fitted to the control unit-side engaging section 301, and fitting and engaging the cover-side engaging section 701 to the control unit-side engaging section 301 in an one-touch operation, can be adopted, as shown in FIG. 8B.

Further, in a case that the cover 700 is used, the motor-side connecting section-side hole parts (the fixing-side plate section hole parts) 641 adjacent to the motor-side connecting sections (the fixing-side plate sections) 640 of the terminal metal-fittings 600 or/and the elongating section-side hole parts 671 adjacent to the fitting section (610 and 620) in the elongating sections 670 of the terminal metal-fittings 600 are disposed. The cover 700 can be fixed or the positional shift of the terminal metal-fittings 600 can be prevented by disposing cover-side hole parts 751 and 771, which respectively are communicated with these hole parts (641 and 671).

That is, the cover 700 covers the terminal metal-fittings 600 from above at the predetermined position. Thereby, the motor-side connecting section-side hole parts (the fixing-side plate section hole parts) 641 of the terminal metal-fittings 600 are communicated with the cover-side hole parts 751 of the cover 700, and the elongating section-side hole parts 671 of the terminal metal-fittings 600 are communicated with the cover-side hole parts 771 of the cover 700. Screws are inserted into the cover-side hole parts 751 and the motor-side connecting section-side hole parts (the fixing-side plate section hole parts) 641 from above of the cover 700, and can be connected to screw holes (not shown) or the like of the motor 20 side. Similarly, the screws are inserted into the cover-side hole parts 771 and the elongating section-side hole parts 671, and can be connected to the screw holes (not shown) or the like, which are stood from the control unit 30 side.

Fixing the terminal metal-fittings 600 via the cover 700 by using the screws can not only fix the cover 700 and can but also effectively prevent the position space of the terminal metal-fittings 600, the press-fit terminals 500 and the like due to the thermal variation, and the positional shift to the horizontal direction or to the vertical direction of the terminal metal-fittings 600, the press-fit terminals 500 and the like due to the vibration of the vehicle.

Besides, after the cover 700 covers the press-fit terminals 500 and the terminal metal-fittings 600, further a cover for the case 300 is disposed over the case 300 of the control unit 30.

As stated above, in the first embodiment according to the present invention, the terminal connection component comprising the press-fit terminals 500 and the terminal metal-fittings 600 is used. The terminal connection structure between the control unit (ECU) of the electric power steering apparatus and the motor 20, which is connected by using the press-fit terminals 500, which the press-fit technology is used, at the one end of the motor wiring in the control unit 30 of the substrate 330 side in which the large current is flown and press-fitting the press-fit terminals 500 to the second hole parts 620 in the fitting sections (610 and 620) of the motor 20, is adopted. Further, the cover 700 which covers the press-fit terminals 500 and the terminal metal-fittings 600 from above of the connection portion of the substrate 330 and the terminal metal-fittings 600 of the motor 20, and the connection portion of the control unit 30 and the terminal metal-fittings 600 of the motor 20, can also be used.

In the first embodiment of the present invention, the terminal connection component according to the present invention is used, and the terminal connection structure in which the press-fit technology is used at the one end of the motor wiring of the substrate side in which the large current is flown is adopted. The first embodiment of the present invention enables to handle the slight variation in dimension of the above terminals, and provide the electric power steering apparatus which improves the durability and has a high reliability. Further, the first embodiment of the present invention enables to improve the convenience of the assembling operation or the removing operation of the unit comprising the control unit and the motor, reduce the number of the components (for example, not using the terminal block nor the bolt), and realize the miniaturization of the ECU in which the environment impact (the use of the lead-free solder and the like) is considered.

Next, the second embodiment according to the present invention with respect to the terminal connection component and the terminal connection structure between the control unit using the same and the motor will be described as follows.

Similar to the above-described first embodiment, the second embodiment according to the present invention relates to the terminal connection component and the terminal connection structure between the control unit 30 of the electric power steering apparatus using the same and the motor 20.

Figure 10A:
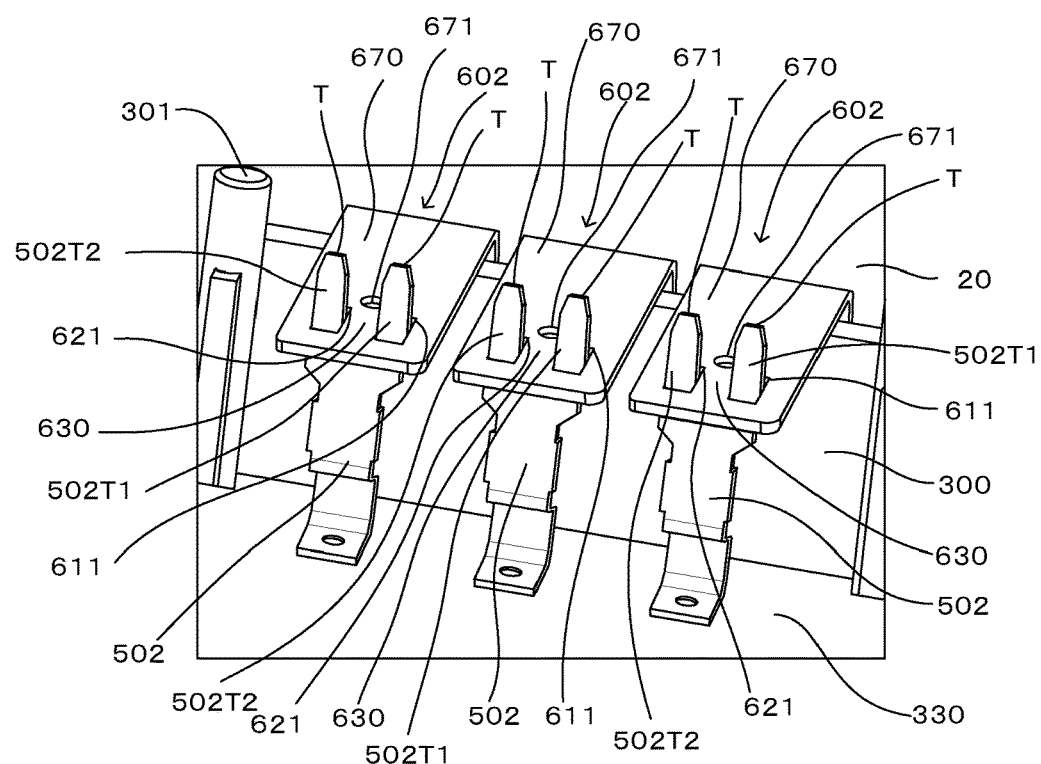
FIG. 10A is a perspective view showing the terminal connection component and the terminal connection structure according to the second embodiment of the present invention from the substrate side in an interior of the control unit.
Figure 10B:
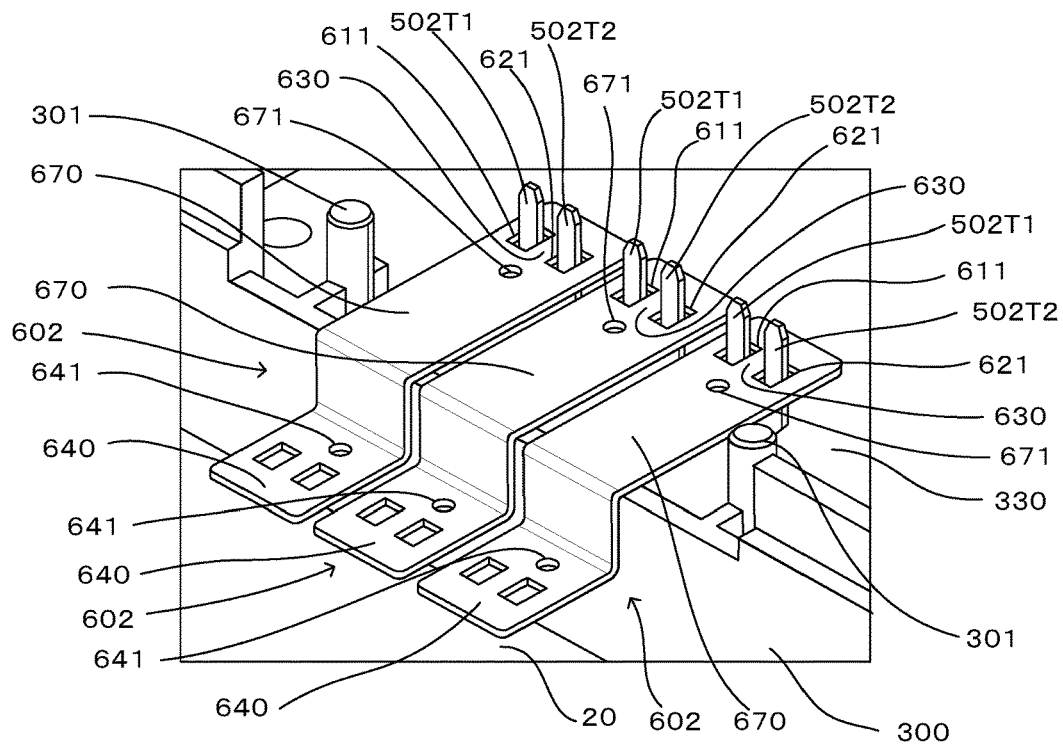
FIG. 10B is a perspective view showing the terminal connection component and the terminal connection structure from the terminal metal-fitting side of the motor.

However, the press-fit terminals 502 by which the terminal connection component according to the second embodiment of the present invention is constituted, adopt the structure that the tip portion is branched, and the fitting sections to which the press-fit terminals 502 are fitted are also adopted. As shown in FIGS. 10A and 10B, the first fitting-in section 502T1 and the second fitting-in section 502T2 are disposed at the tip portion of the press-fit terminal 502 which is perpendicularly stood from the upper surface of the substrate 330 received in the case 300 of the control unit 30. The fitting section of the plate-shape terminal metal-fitting 602 which is electrically connected to each phase of the coils by which the motor 20 is constituted, comprises the first hole part 611 and the second hole part 621. The first fitting-in section 502T1 and the second fitting-in section 502T2 are respectively press-fitted to and are respectively connected to the first hole part 611 and the second hole part 621.

That is, as describe below in detail, in the second embodiment of the present invention, the tip portion of the press-fit terminal 502 is branched. The tip portions of the first fitting-in section 502T1 and the second fitting-in section 502T2 of the press-fit terminal 502 are relatively inserted into, are pushed to (are press-fitted to), and are mutually connected to the first hole part 611 and the second hole part 621 of the fitting-in section of the terminal metal-fitting 602.

Figure 14A:
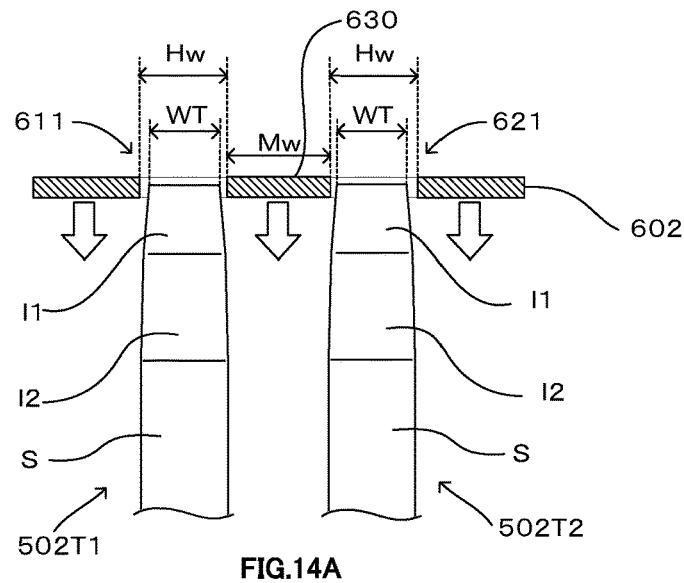
FIGS. 14A, 14B and 14C are side cross-sectional views showing a state when a fitting-in section of the press-fit terminal is press-fitted to a fitting section of the terminal metal-fitting in the second embodiment, viewed from a longitudinal direction of the terminal metal-fitting.

As shown in FIG. 14A, first tapers "l1" (see, FIG. 12) formed at the tip portions of the first fitting-in section 502T1 and the second fitting-in section 502T2 of the press-fit terminal 502 handle the position variance when the press-fit terminal 502 is mounted on the substrate of the control unit, and the dispersion in the individual embodiment of the press-fit terminal 502, and introduce to the appropriate positions of the first hole part 611 and the second hole part 621 in the fitting section of the terminal metal-fitting 602. Subsequently, second tapers "l2" handle the dimensional tolerance of the individual parts, and the straight portions S formed in below of the above fitting-in sections (502T1 and 502T2) of the press-fit terminal 502 is smoothly introduced to the first hole part 611 and the second hole part 621 in the fitting-in section of the terminal metal-fitting 602. In the straight portions S, when middle portions of the branch sections 502D from the entering portions of the straight portions S are fitted to the first hole part 611 and the second hole part 621 in the fitting-in section of the terminal metal-fitting 602, the press-fitting is completed. Here, a depth of the press-fitting of the terminal metal-fitting 602 to the straight portions S (that is, how long does the terminal metal-fitting 602 enter to the branch section 502D from the entering portion of the straight portion S?) is not especially limited. From a point of view of improving the connection certainty and the connection stability, it is preferred that the depth be high.

Figure 14B:
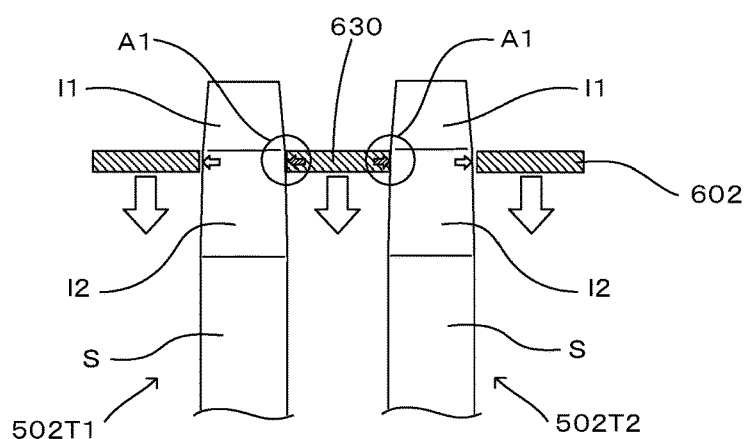

The press-fitting is performed as described above. Accordingly, at first, as shown in FIG. 14B, the first fitting-in section 502T1 and the second fitting-in section 502T2 of the press-fit terminal 502 are contacted to two portions of first contact regions A1, which are disposed at both sides of the bridge section 630 in the fitting section of the terminal metal-fitting 602, and receive the pressing force so that the space W4 between the first fitting-in section 502T1 and the second fitting-in section 502T2 is widened. Therefore, since the force of the press-fitting can be smoothed by the configuration of the first taper "l1" and the second taper "l2", the stable press-fitting assembling can be realized and the contact in applying the current can be stabled.

Figure 14C:
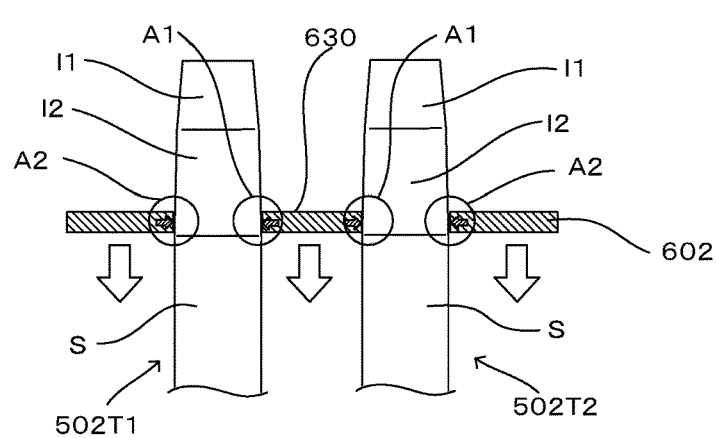

Subsequently, when the press-fitting is progressed, as shown in FIG. 14C, the outer side-surfaces in the width direction of the first fitting-in section 502T1 and the second fitting-in section 502T2 of the press-fit terminal 502 are contacted to two portions of second contact regions A2, which are disposed at the inner side-surfaces in which a distance between the long side of the first hole part 611 of the terminal metal-fitting 602 and the long side of the second hole part 621 of the terminal metal-fitting 602 is farthest, and receive the pressing force in a direction in which the outer side-surfaces in the width direction of the first fitting-in section 502T1 and the second fitting-in section 502T2 of the press-fit terminal 502 are inward (that is, in a direction in which the size of the first hole part 611 in the fitting-in section 502T1 and the size of the second hole part 621 in the fitting-in section 502T2 are shortened).

Thus, in the present invention, since the press-fit terminal 502 is fixedly held in corporation with the operation at the first contact regions A1 and the operation at the second contact regions A2 at four points in the same plane of the contact portion of the terminal metal-fitting 602 against the first fitting-in section 502T1 and the second fitting-in section 502T2 of the press-fit terminal 502, the connection of these two terminals are surely and stably performed. As a result, even if the heat by applying the current is generated, the heat is not concentrated in one point. Since the contact in applying the current is stable, the stable electrical connection can be maintained.

Figure 18A:
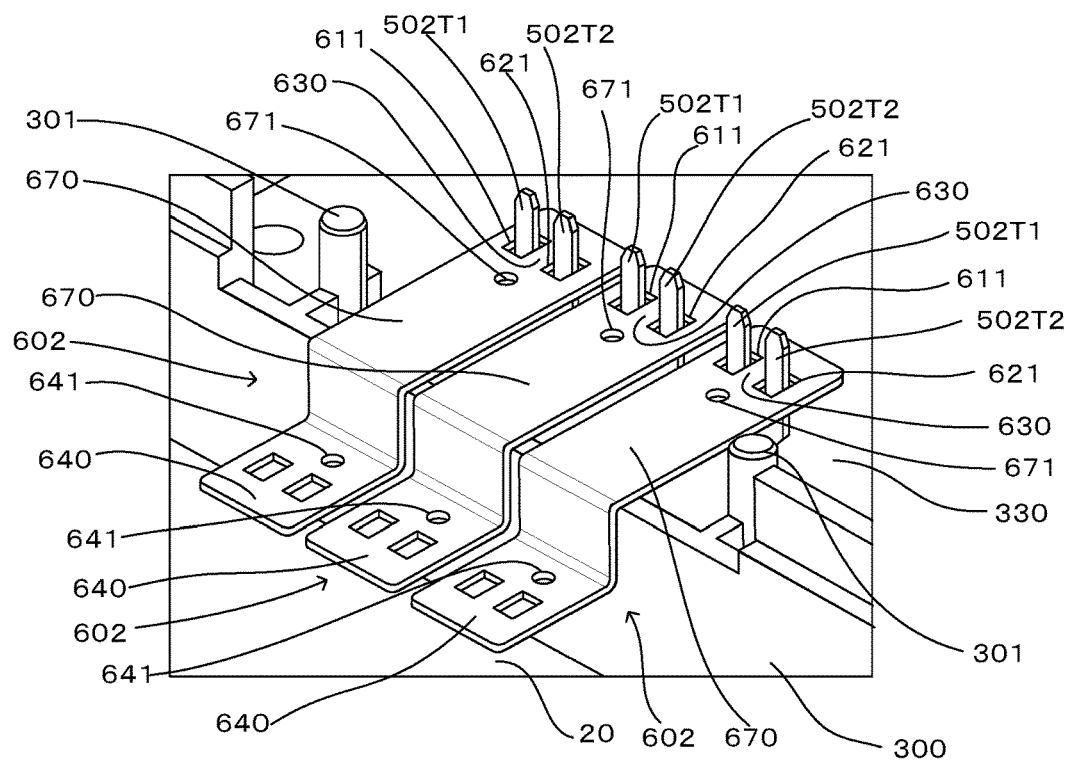
FIGS. 18A and 18B are diagrams for explaining a cover which covers the press-fit terminals and the terminal metal-fittings according to the second embodiment of the present invention.
Figure 18B:
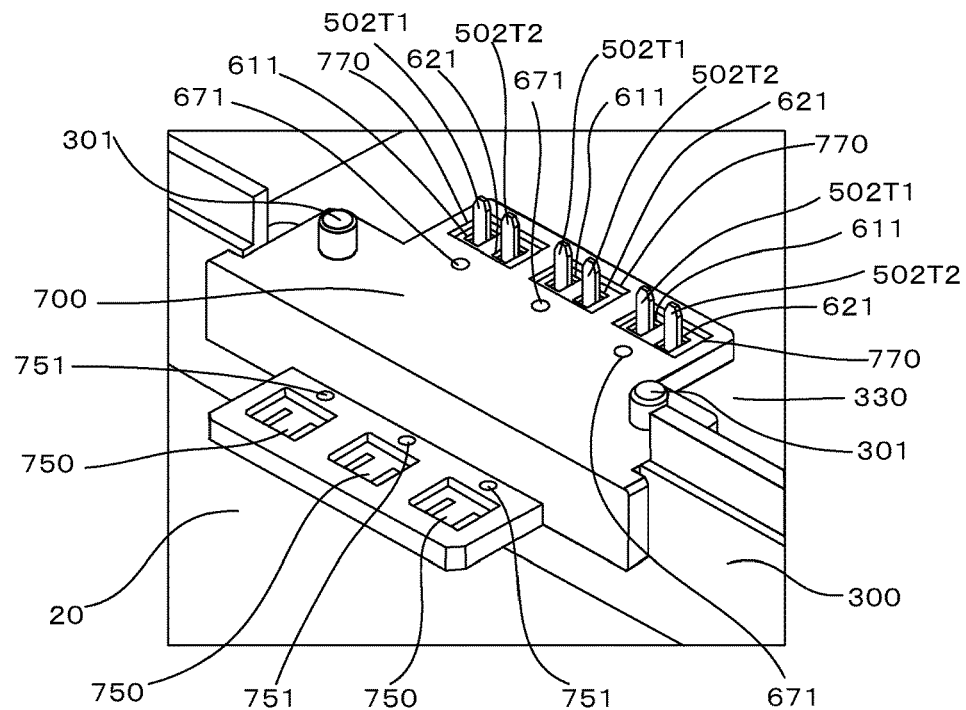

Further, the second embodiment of the present invention has a structure that the cover 700 as shown in FIG. 18B, which is described below, covers the press-fit terminals 502 and the terminal metal-fittings 602.

Then, the respective elements will be described in order. The above FIGS. 10A and 10B are perspective views showing an outline of the terminal connection component and the terminal connection structure using the same according to the second embodiment of the present invention. FIG. 10A is a perspective view showing the terminal connection component and the terminal connection structure according to the second embodiment of the present invention from the substrate side received in an interior of the control unit 30, and FIG. 10B is a perspective view showing the terminal connection component and the terminal connection structure from the terminal metal-fitting 602 side of the motor 20.

Further, in FIGS. 10A and 10B, as well as the description of the first embodiment, the circuit formed on the substrate 330 is omitted, and the portion with respect to the terminal metal-fittings 602 of the motor 20 is simply depicted. Portions that the press-fit terminals 502 are stood from the substrate 330 are electrically connected to the 3-phase (the U-phase, the V-phase and the W-phase) output lines from the inverter 37 to the motor 20. The terminal metal-fittings 602 of the motor 20 are respectively and electrically connected to the 3-phase coils by which the motor 20 is constituted.

As well as the explanation of the first embodiment, in the elements by which the terminal connection structure of the present invention is constituted, the control unit 30 is, for example, that of the above-described electric power steering apparatus, and the control unit 30 comprises the substrate 330 on which the control circuit such as the inverter 37, which controls the motor current, is mounted. Here, the substrate 330 is assumed to the power substrate on which the inverter circuit is mounted. Even one substrate which integrates the power substrate with the control substrate which processes the signals from the CAN 50 in the low power system and the like, can be used.

The 3-phase output lines, which are the U-phase, the V-phase and the W-phase, are disposed on the substrate 330 on which the inverter 37 is formed, via the motor release switch 23. The three press-fit terminals 502 according to the second embodiment whose tips are branched are stood from the substrate 330 and are connected to the 3-phase output lines along the side surface of the substrate 330 in parallel.

Figure 12:
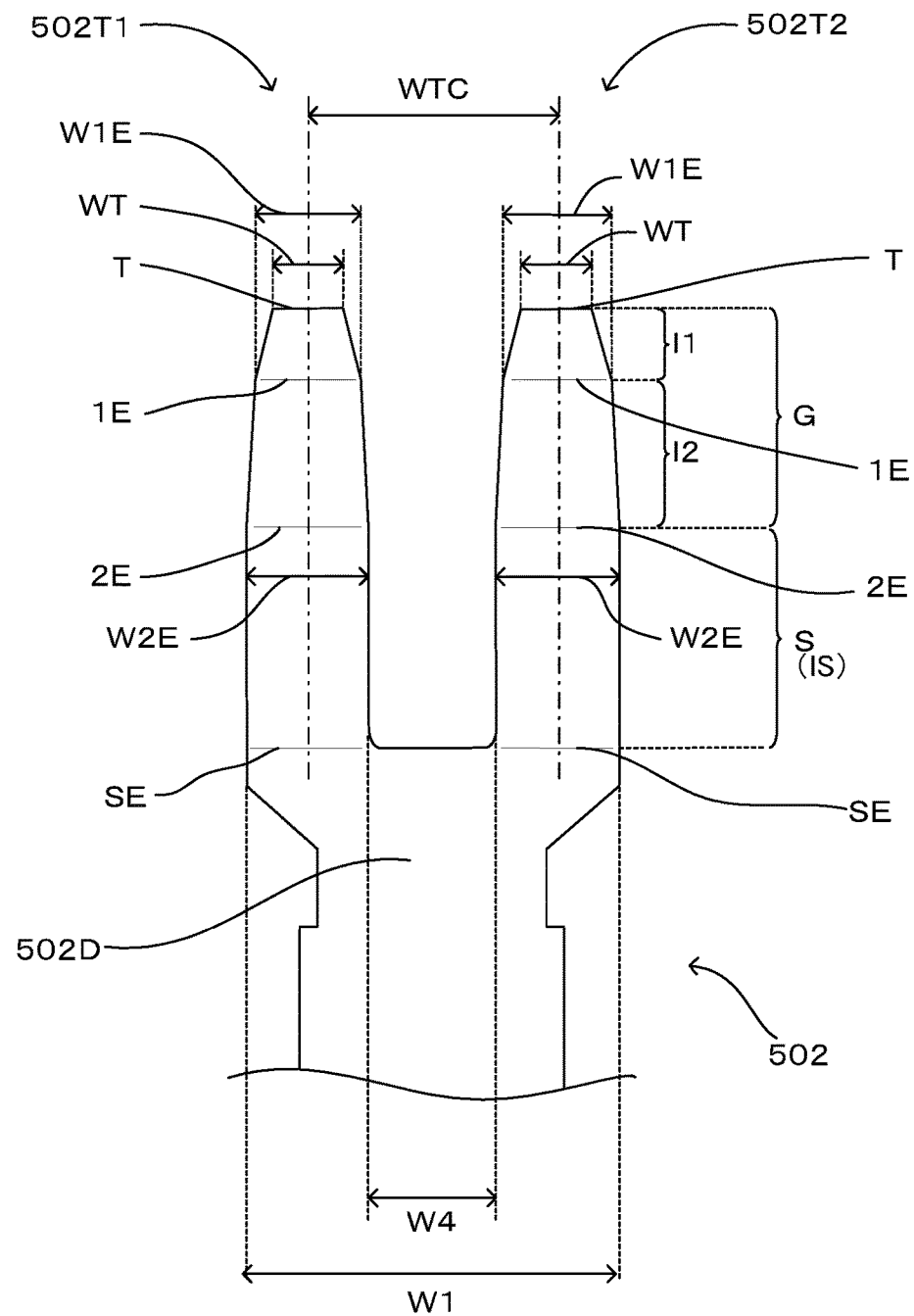
FIG. 12 is an enlarged front view of the first fitting-in section 502T1, the second fitting-in section 502T2 and a branch section 502D which are depicted in FIG. 11A.

The press-fit terminals 502, for example, are formed by bending a substantially rectangular metal conductor made of copper or the like. The shape of the press-fit terminals 502 is shown in FIGS. 11A, 11B and 11C and FIG. 12. Here, FIGS. 11A, 11B, 11C and 12 show an embodiment of the press-fit terminal 502 stood from the substrate 330 and the like, FIG. 11A is a front view, FIG. 11B is a side view, FIG. 11C is a bottom view, and FIG. 12 is an enlarged front view showing the first fitting-in section 502T1, the second fitting-in section 502T2 and the branch section 502D, which are shown in FIG. 11A.

The configuration of the press-fit terminal 502 is roughly divided into the following sections. The press-fit terminal 502 comprises the branch section 502D, the first fitting-in section 502T1 and the second fitting-in section 502T2, which are formed at the top portion of the branched tip from the branch section 502D in a case that the substrate 330 is connected, the extending section 500B to extend from the branch section 502D to the downward side, and the substrate connecting section 500C to be disposed below the extending section and connect to the substrate 330.

The first fitting-in section 502T1 and the second fitting-in section 502T2 are respectively press-fitted to the first hole part 611 and the second hole part 621, by which the fitting section of the terminal metal-fitting 602 is constituted. The motor 20 is connected to one end of the terminal metal-fitting 602.

As shown in FIGS. 11A and 12, the first fitting-in section 502T1 and the second fitting-in section 502T2 are branched at the upper portion of the branch section 502D and are extended toward the tip portions T.

As shown in FIG. 12, the first fitting-in section 502T1 and the second fitting-in section 502T2 have a guide section G and a straight portion S from the tip T to the branch section 502D. Furthermore, the guide section G has the first taper section l1 and the second taper section l2. The taper ratio of the second taper section l2 is a smaller than that of the first taper section l1 and the gradient of the second taper section l2 is formed gently.

That is, as shown in FIG. 12, the first taper section l1 has the length l1 in the vertical direction from the tip portion T to the bottom 1E. The second taper section l2 has the length l2 in the vertical direction from the position 1E shown in FIG. 12 to the lower position 2E. The taper ratios of the first taper section l1 and the second taper section l2 are calculated as follows. Assuming that the width at the tip portion T is WT and the width at the bottom portion of the first taper section l1 is "W1E", the taper ratio of the first taper section l1 is "((W1E−WT)/l1)". Assuming that the width at the bottom portion of the second taper section l2 is "W2E", the taper ratio of the second taper section l2 is "((W2E−W1E)/l2)". By setting to "((W2E−W1E)/l2)<((W1E−WT)/l1)", the gradient of the second taper section l2 is gentler than that of the first taper section l1 from the tip portion T to the straight portion S. As described below, for example, the taper ratio of the first taper section l1 is set to almost "0.47" and taper ratio of the second taper section l2 is set to almost "0.065".

The straight portion S is disposed from the lower portion 2E of the second taper section l2 to the straight portion bottom portion SE which is located above the branch section 502D, and has the length 1S. In the straight portion S, the widths W2E of the first fitting-in section 502T1 and the second fitting-in section 502T2 are manufactured so as to be constant.

Consequently, the respective widths of the first fitting-in section 502T1 and the second fitting-in section 502T2 gradually widens from the first taper section l1 formed at the tip portion T side of the first fitting-in section 502T1 and the second fitting-in section 502T2 to the lower portion 2E of the second taper section l2 formed at the branch section 502D side, and has a substantially constant value W2E in the straight portion S which is ranged from the lower portion 2E of the second taper section l2 to the straight portion bottom portion SE.

The length WT of the tip portion T in the first fitting-in section 502T1 and the second fitting-in section 502T2 of the press-fit terminal 502 is short than the length Hw of the short side of the hole part comprising the first hole part 611 and the second hole part 621 of the terminal metal-fitting 602. The first fitting-in section 502T1 and the second fitting-in section 502T2 have a wider shape toward the branch section 502D, and the length W2E at the straight portion S side is slightly longer than the length Hw of the short side of the hole part (611 and 621). Here, "slightly longer" means the dimension including the dimensional tolerance to the reference dimension of the respective parts. As described below, for example, the following results are obtained by applying the specific dimension in consideration with the dimensional tolerance. The widths of the straight portions S of the first fitting-in section and the second fitting-in section are 1.62 [mm] to 1.65 [mm], and the lengths of the short sides of the first hole part and the second hole part are 1.55 [mm] to 1.58 [mm].

In this connection, as described below, in a case that the first fitting-in section 502T1 and the second fitting-in section 502T2 of the press-fit terminal 502 are respectively and relatively inserted to and are respectively press-fitted to the first hole part 611 and the second hole part 621 of the terminal metal-fitting 602, the inserting and the press-fitting are smoothly performed by the guide sections G which comprises the first taper section 11 disposed at the tip portion T side of the press-fit terminal 502, and the second taper section 12. Here, "relatively inserted" means that one terminal of the press-fit terminal 500 and the terminal metal-fitting 602 is fixed and the other terminal is move to the one terminal, or both the press-fit terminal 500 and the terminal metal-fitting 602 are not fixed and are mutually moved so that the press-fit terminal 500 is press-fitted to the terminal metal-fitting 602.

Further, the inner space between the first fitting-in section 502T1 and the second fitting-in section 502T2 of the press-fit terminal 500 is W4 which is the same as the space between the inner side-surfaces of the first fitting-in section 502T1 and the second fitting-in section 502T2 at the straight portions S. The outer space between the first fitting-in section 502T1 and the second fitting-in section 502T2 of the press-fit terminal 500 is W1 which is the same as the space between the outer side-surfaces of the first fitting-in section 502T1 and the second fitting-in section 502T2 at the straight portions S (refer to FIG. 12).

Next, as shown in FIGS. 11A, 11B and 11C, in the press-fit terminal 502, the branch section 502D is a portion sandwiched between the first fitting-in section 502T1 or the second fitting-in section 502T2 and the extending section 500B. An embodiment of the branch section 502D is configured so that both ends in the width direction at the below of the first fitting-in section 502T1 and the second fitting-in section 502T2 are gradually and smoothly formed narrower.

In an embodiment of the extending section 500B extending from the branch section 502D to the below and the substrate connecting section 500C, which is disposed below the extending section 500B and is connected to the substrate 330, the extending section 500B is combined with at least the substrate connecting section 500C and the tip of the press-fit terminal 502 is upwardly extended along the side surface of the side wall portion of the casing 300 on which the substrate 330 is mounted. It is required that the combined length of the extending section 500B and the substrate connecting section 500C has an adequate length to fit to the terminal metal-fitting 602 from the motor 20.

Further, the substrate connecting section 500C comprises a forward bent section 500C1 to be disposed below the extending section 500B and be bent forwardly (in FIG. 11B, bending to left), a downward section 500C2 to be bent from one end of the forward bent section 500C1 to downward, and a substrate contacting section 500C3 to be bent from the downward section backwardly, be perpendicular to the extending section 500B, and be mounted on the substrate 330. Accordingly, the substrate connecting section 500C can be adopted the same configuration as that in the press-fit terminal 500 shown in FIG. 5B of the above first embodiment. FIG. 11B shows a configuration example that the jumping-up section 500C4 is not included, different from the case of FIG. 5B.

In a case of providing with such the substrate connecting section 500C, as well as the first embodiment, the substrate connecting section 500C has functions that the excessive stress is not added at the connecting portion where the substrate connecting section 500C is connected to the substrate 330 supported by the support body 1000 from the bottom when the press-fit terminal 502 is press-fitted to the terminal metal-fitting 602 of the motor 20, and the stress due to the deformation generated by an influence of the temperature variation in the vehicle in which the products according to the present invention is mounted is lessened.

Next, in the elements by which the terminal connection component and the terminal connection structure according to the second embodiment of the present invention are constituted, a configuration example of the terminal metal-fitting 602 of the motor 20 will be described.

As described in the first embodiment, the terminal metal-fittings 602 are electrically connected to the 3-phase (the U-phase, the V-phase and the W-phase) coils by which the motor 20 is constituted. The electrical connection embodiment between each of the terminal metal-fittings 602 and the motor 20 is not especially limited. For example, the input terminals, the bus bars or the like to the motor 20, which are disposed at the casing of the motor 20 or at the flange of the casing of the motor 20, may be connected to the motor-side connecting section (the fixing-side plate section) at one end of the terminal metal-fittings 602, and then the terminal metal-fittings 602 may be connected to the motor 20.

As shown in FIGS. 10A and 10B and FIGS. 13A, 13B and 13C, the terminal metal-fittings 602 according to the second embodiment of the present invention have a fitting section comprising the first hole part 611, the second hole part 621 and the bridge section 630 between the first hole part 611 and the second hole part 621. As shown in FIGS. 10A and 10B, in a case that the motor 20 is disposed on the side surface or the bottom surface of the control unit 30, the terminal metal-fittings 602 in the fitting section are formed from the exterior portion of the case 300 of the control unit 30 to the interior portion of the case 300 and are extended parallel to the substrate 330 so as to be disposed on the upper portion of the press-fit terminals 502.

The tip of the first fitting-in section 502T1 of the press-fit terminal 502 and the tip of the second fitting-in section 502T2 of the press-fit terminal 502 are respectively and relatively fitted to and are respectively press-fitted to the first hole part 611 of the terminal metal-fitting 602 and the second hole part 621 of the terminal metal-fitting 602. The terminal connection between the terminal metal-fitting 602 and the press-fit terminal 502 is performed.

That is, at first, in the beginning of the press-fitting, in the two side surfaces of the first contact regions A1 at the respective hole part sides of the first hole part 611 and the second hole part 621 of the bridge section 630, the pressing force that the space between the first fitting-in section 502T1 of the press-fit terminal 502 and the second fitting-in section 502T2 of the press-fit terminal 502 is widened, is operated (see, FIG. 14B). Subsequently, when the press-fitting is progressed, in the second contact regions A2, which are disposed at the inner side-surfaces in which a distance between the long side of the first hole part 611 of the terminal metal-fitting 602 and the long side of the second hole part 621 of the terminal metal-fitting 602 is farthest, the pressing force that the outer surface of the first fitting-in section 502T1 of the press-fit terminal 502 and the outer surface of the second fitting-in section 502T2 of the press-fit terminal 502 are pressed inward, is operated (see, FIG. 14C). Thus, the first hole part 611 of the terminal metal-fitting 602 and the second hole part 621 of the terminal metal-fitting 602 respectively and fixedly hold the first fitting-in section 502T1 of the press-fit terminal 502 and the second fitting-in section 502T2 of the press-fit terminal 502, and the terminal connection is surely performed.

Figure 13A:
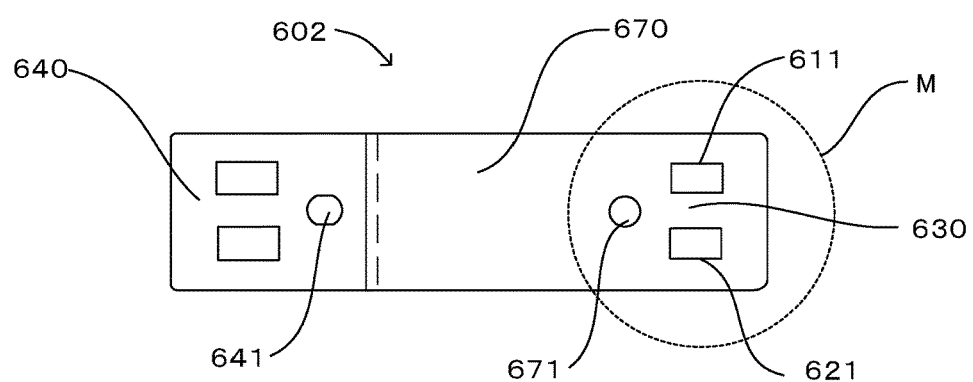
FIGS. 13A, 13B and 13C are diagrams showing an embodiment of the terminal metal-fitting of the motor according to the second embodiment.
Figure 13B:
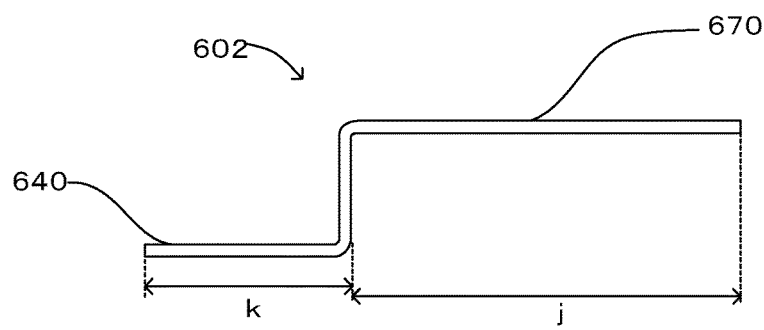
Figure 13C:
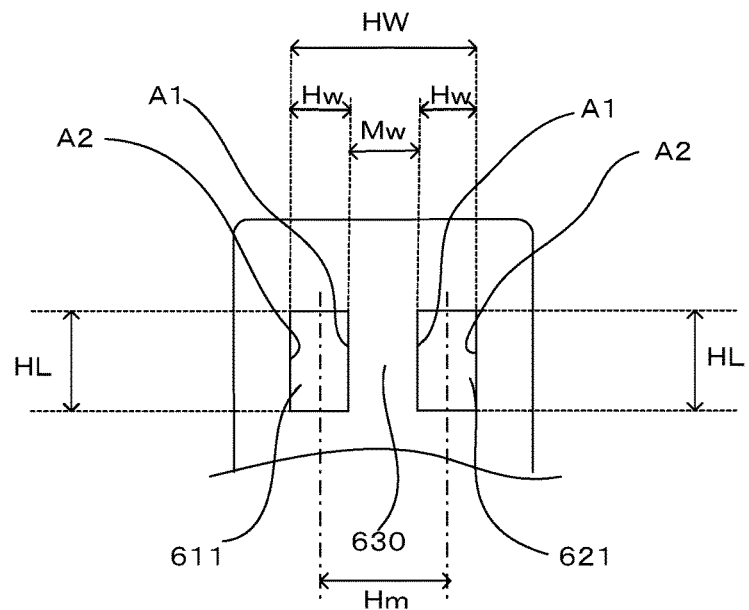

In this connection, in the second embodiment of the present invention, for example, as shown in FIGS. 13A, 13B and 13C, the terminal metal-fitting 602 has a configuration that a substantially rectangular metal conductor made of copper or the like is bent. The terminal metal-fitting 602 comprises a motor-side connecting section (a fixing-side plate section) 640 that forms one end portion of the terminal metal-fitting 602, and an elongating section 670 that elongates to the other portion of the terminal metal-fitting 602 as a parallel plane (a rectangular plane), has a length "j" (see, FIG. 13B), and forms by perpendicularly bending the plate in the vicinity of the other end side of the terminal metal-fitting 602 from the motor-side connecting section (the fixing-side plate section) 640, and further perpendicularly bending the plate (see also, FIG. 13B). The material of the terminal metal-fitting 602 is the same as that of the press-fit terminal 502 made of copper or the like. In a case that the heat generation is occurred in the portion between the press-fit terminal 502 and the terminal metal-fitting 602, since the coefficient of thermal expansion of the material of the terminal metal-fitting 602 is the same as that of the press-fit terminal 502, it is possible to establish the stable terminal connection between the press-fit terminal 502 and the terminal metal-fitting 602. This is the same for other embodiments.

The motor-side connecting section (the fixing-side plate section) 640 in the terminal metal-fitting 602 is electrically connected to the motor 20 at the motor 20 side.

In the terminal metal-fitting 602, the fitting section is formed at the end portion of the different side of the motor-side connecting section (the fixing-side plate section) 640 in the elongating section 670, and comprises the first rectangular hole part 611 and the second rectangular hole part 621, which are disposed in parallel in the width direction of the terminal metal-fitting 602 at the end portion, and the bridge section 630 formed between the first hole part 611 and the second hole part 621.

As well, as described below, the motor-side connecting section-side hole part (the fixing-side plate section hole part) 641 is disposed adjacent to the elongating section 670 side of the motor-side connecting section (the fixing-side plate section) 640. The elongating section-side hole part 671 is further disposed adjacent to the motor-side connecting section (the fixing-side plate section) 640 of the fitting section in the elongating section 670. The motor-side connecting section-side hole part (the fixing-side plate section hole part) 641 and the elongating section-side hole part 671 can be used for fixing the case 700 or the like.

Here, FIGS. 13A, 13B and 13C are diagrams showing an embodiment of the terminal metal-fitting 602, FIG. 13A is a top view, FIG. 13B is a side view, and FIG. 13C is an enlarged view of the region of "M" which is shown by a circle using a dashed line in FIG. 13A.

As described above, the fitting section of the terminal metal-fitting 602 comprises the first hole part 611, the second hole part 621 and the bridge section 630. In the press-fit terminal 502 stood on the upper surface of the substrate 330, the tip of the first fitting-in section 502T1 of the press-fit terminal 502 and the tip of the second fitting-in section 502T2 of the press-fit terminal 502 are respectively and relatively pushed into the first hole part 611 of the fitting section and the second hole part 621 of the fitting section from below of the terminal metal-fitting 602. Then, the tip of the first fitting-in section 502T1 and the tip of the second fitting-in section 502T2 are respectively and surely press-fitted to and are held by the first hole part 611 and the second hole part 621.

That is, the press-fit terminal 502 and the fitting section of the terminal metal-fitting 602 are manufactured in consideration with the dimensional tolerances which are considered in the fitting of both terminals. However, the above dimensional tolerances are the values assumed to be a constant variation width. Due to the variation in manufacturing and the like, the respective widths of the first fitting-in section 502T1 of the press-fit terminal 502 and the second fitting-in section 502T2 of the press-fit terminal 502 can be longer than expected, and the above widths can be longer than those of the first hole part 611 and the second hole part 621 of the fitting section of the corresponding terminal metal-fitting 602.

In the second embodiment according to the present invention, a first taper l1 and a second taper l2 are disposed at the respective tip portions T of the first fitting-in section 502T1 of the press-fit terminal 502 and the second fitting-in section 502T2 of the press-fit terminal 502. The width between the first taper l1 and the second taper l2 is longer than the width between the first hole part 611 of the terminal metal-fitting 602 and the second hole part 621 of the terminal metal-fitting 602 (see, FIG. 15A), and then the influence due to the slight dimension variation is reduced when inserting the press-fit terminal 502.

The first fitting-in section 502T1 of the press-fit terminal 502 and the second fitting-in section 502T2 of the press-fit terminal 502 are respectively inserted into and are respectively press-fitted to the first hole part 611 and the second hole part 621 in the fitting section of the terminal metal-fitting 602. That is, the fitting section of the above terminal metal-fitting 602 can be divided with the first hole part 611 and the second hole part 621. A space between the first fitting-in section 502T1 of the press-fit terminal 502 and the second fitting-in section 502T2 of the press-fit terminal 502 sandwiches two portions of the first contact regions A1 at both side surfaces of the bridge section 630 between the first hole part 611 of the terminal metal-fitting 602 and the second hole part 621 of the terminal metal-fitting 602 (refer to FIG. 15B). At the two portions of the second contact regions A2, the outer side-surfaces in the width direction of the first fitting-in section 502T1 of the press-fit terminal 502 and the second fitting-in section 502T2 of the press-fit terminal 502 are sandwiched by the inner side-surfaces of the first hole part 611 of the terminal metal-fitting 602 and the second hole part 621 of the terminal metal-fitting 602 (refer to FIG. 15C). Thereby, even when the slight dimension space is existed in the press-fit terminal 502 and the terminal metal-fitting 602, the press-fit terminal 502 can surely, electrically and mechanically be connected to the terminal metal-fitting 602.

Therefore, the first hole part 611 and the second hole part 621 in the above fitting section have a rectangular shape and are disposed at the end side of the terminal metal-fitting 602 in parallel in the width direction of the terminal metal-fitting 602, in alignment with the array of the first fitting-in section 502T1 of the press-fit terminal 502 and the second fitting-in section 502T2 of the press-fit terminal 502.

The short side and the long side of the rectangular shape in an embodiment of the first hole part 611 and the second hole part 621 are respectively corresponding to the width direction and the longitudinal direction of the terminal metal-fitting 602. The length Hw of the above short side is formed slightly longer than the respective widths WT of the tip portions T of the first fitting-in section 502T1 of the press-fit terminal 502 and the second fitting-in section 502T2 of the press-fit terminal 502 (here, the above difference is the same degree of the length of the dimensional tolerance, and for example, based on the dimension described below, "Hw=1.55" [mm] to "1.58" [mm], and "WT≈1" [mm]) (see, FIG. 15A). Even in a case that the error in the position where the press-fit terminal 502 is mounted on the substrate 330 is existed, and even in a case that the error in the dimension of the press-fit terminal 502 itself is existed, the tip portions of the first fitting-in section 502T1 and the second fitting-in section 502T2 are respectively and smoothly fitted to (are inserted into) the first hole part 611 and the second hole part 621, and then are respectively press-fitted to the first hole part 611 and the second hole part 621.

Figure 15A:
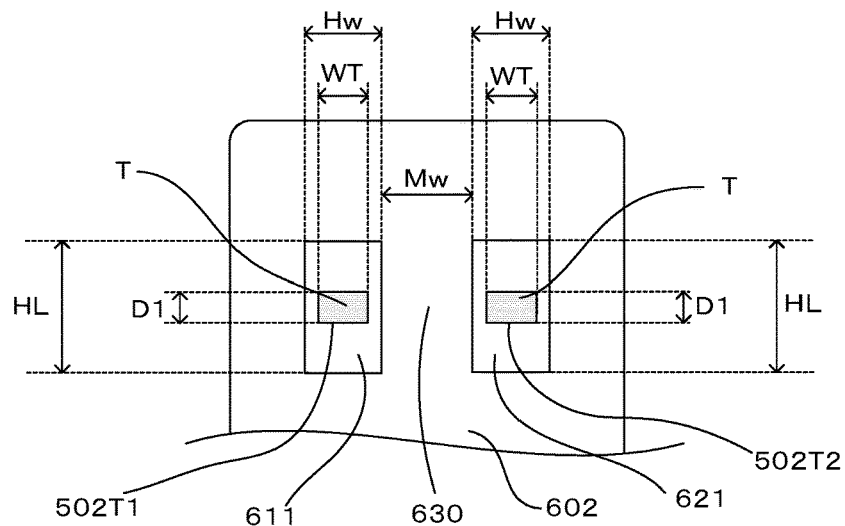
FIGS. 15A, 15B and 15C are top views showing a state when the fitting-in section of the press-fit terminal is press-fitted to the fitting section of the terminal metal-fitting in the second embodiment, viewed from the top side of the terminal metal-fitting, corresponding to FIGS. 14A, 14B and 14C, respectively.

For example, as shown in FIG. 15A, the lengths HL of the long sides of the first rectangular hole part 611 and the second rectangular hole part 621 are longer than the respective thicknesses D1 of the first fitting-in section 502T1 of the press-fit terminal 502 and the second fitting-in section 502T2 of the press-fit terminal 502.

Thus, by setting the length HL of the long side in this way, for example, as shown in FIG. 15A, in a case that the first fitting-in section 502T1 of the press-fit terminal 502 and the second fitting-in section 502T2 of the press-fit terminal 502 are respectively fitted to the substantially central portions of the first hole part 611 of the terminal metal-fitting 602 and the second hole part 621 of the terminal metal-fitting 602 so that the width direction of the press-fit terminal 502 is parallel to that of the terminal metal-fitting 602, the spaces forms in the direction perpendicular to the plate surface of the first fitting-in section 502T1 and the second fitting-in section 502T2 and a portion where the first fitting-in section 502T1 and the second fitting-in section 502T2 can be deformed is surely existed. As described above, even in a case that the error in the position where the press-fit terminal 502 is mounted on the substrate 330 is existed, and even in a case that the error in the dimension of the press-fit terminal 502 itself is existed, the first fitting-in section 502T1 of the press-fit terminal 502 and the second fitting-in section 502T2 of the press-fit terminal 502 can move in the above deformable portion so as to absorb the above errors.

Further, as shown in FIG. 13C, when both the first hole part 611 of the terminal metal-fitting 602 and the second hole part 621 of the terminal metal-fitting 602 are seen, the space between the farthest long sides in the long sides of the first rectangular hole part 611 of the terminal metal-fitting 602 and the second rectangular hole part 621 of the terminal metal-fitting 602 has a length HW. The inner side-surfaces of the farthest long sides are the second contact regions A2.

The above space HW is slightly shorter than the space W1 between the outer side-surface of the straight portion S of the first fitting-in section 502T1 in the press-fit terminal 502 and that of the second fitting-in section 502T2 in the press-fit terminal 502, as shown in FIG. 12 (here, the above difference is the same degree of the length of the dimensional tolerance, and for example, based on the dimension described below, "W1=5.02" [mm] to "5.05" [mm], and "WT=4.95" [mm] to "4.98" [mm]). Thereby, in a case that the press-fit terminal 502 is press-fitted to the first hole part 611 and the second hole part 621, when the press-fitting is progressed, the first fitting-in section 502T1 of the press-fit terminal 502 and the second fitting-in section 502T2 of the press-fit terminal 502 are pressed in the inward direction at the second contact regions A2.

Next, the bridge section 630 in the fitting section is formed between the first hole part 611 of the terminal metal-fitting 602 and the second hole part 621 of the terminal metal-fitting 602 and has a width Mw. Two side surfaces of the first hole part 611 of the bridge section 630 and the second hole part 621 of the bridge section 630 are the first contact regions A2.

The width Mw of the above bridge section 630 is slightly longer than the space W4 between the inner side-surface of the straight portion S of the first fitting-in section 502T1 in the press-fit terminal 502 and that of the second fitting-in section 502T2 in the press-fit terminal 502, as shown in FIG. 12 (here, the above difference is the same degree of the length of the dimensional tolerance, and for example, based on the dimension described below, "W4=1.75" [mm] to "1.78" [mm], and "Mw=1.82" [mm] to "1.85" [mm]). Thereby, in a case that the press-fit terminal 502 is press-fitted to the first hole part 611 and the second hole part 621, when the press-fitting is progressed, the space between the first fitting-in section 502T1 and the second fitting-in section 502T2 is pressed in a widening direction at the first contact regions A1.

Further, as shown in FIG. 13C, the space Hm between the midpoint of the short side of the first hole part 611 in the terminal metal-fitting 602 and that of the second hole part 621 in the terminal metal-fitting 602 (that is, the space between the center of the first hole part 611 in the terminal metal-fitting 602 and the center of the second hole part 621 in the terminal metal-fitting 602) is substantially the same as the space WTC between the center line of the first fitting-in section 502T1 in the press-fit terminal 502 shown in FIG. 12 and that of the second fitting-in section 502T2 in the press-fit terminal 502. The width Mw of the bridge section 630 in the terminal metal-fitting 602 is ranged from "1.82" [mm] to "1.88" [mm], and the space W4 of the straight portion S of the press-fit terminal 502 is ranged from "1.75" [mm] to "1.78" [mm]. Therefore, the width Mw is slightly longer than the space W4.

Since the width Mw of the bridge section 630 of the terminal metal-fitting 602 is slightly longer than the space W4, in a case that the first fitting-in section 502T1 of the press-fit terminal 502 and the second fitting-in section 502T2 of the press-fit terminal 502 are inserted into the first hole part 611 of the terminal metal-fitting 602 and the second hole part 621 of the terminal metal-fitting 602, at first, the press-fit terminal 502 is contacted with the terminal metal-fitting 602 at the first contact regions A1. Subsequently, the above contact is occurred at the second contact regions A2.

Figure 15B:
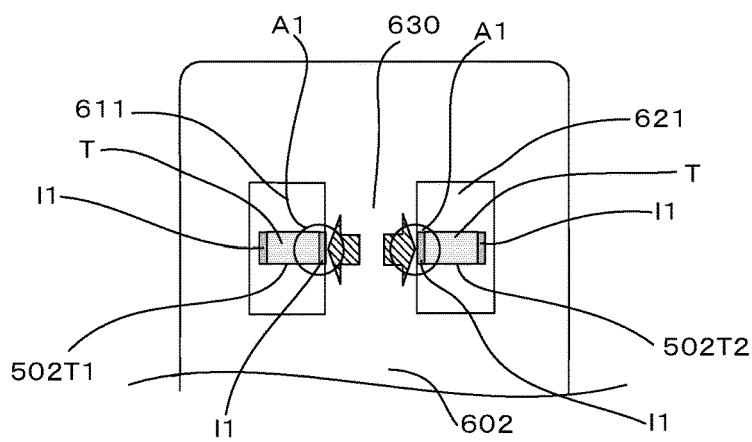
Figure 15C:
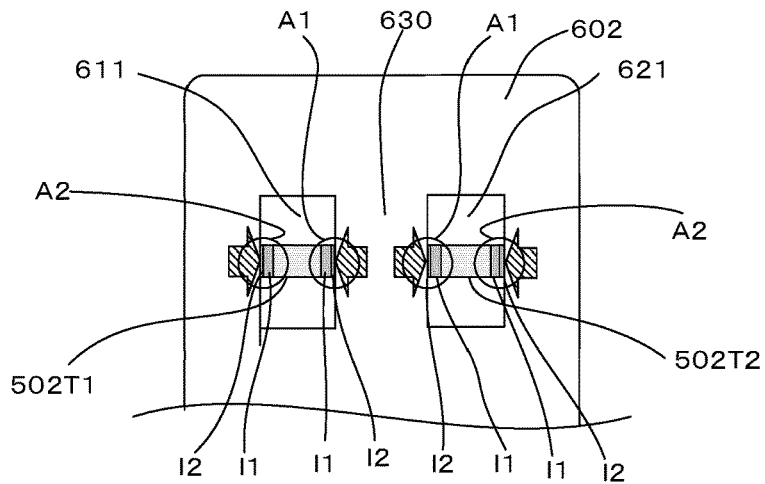

Thus, as shown in FIGS. 14A, 14B and 14C and FIGS. 15A, 15B and 15C, the first fitting-in section 502T1 of the press-fit terminal 502 and the second fitting-in section 502T2 of the press-fit terminal 502 are respectively press-fitted to the first hole part 611 and the second hole part 621 in the fitting section of the terminal metal-fitting 602. As well, FIGS. 14A, 14B and 14C are side cross-sectional views showing a state when the fitting-in section (502T1 and 502T2) of the press-fit terminal 502 is press-fitted to the fitting section of the terminal metal-fitting, viewed from a longitudinal direction of the terminal metal-fitting. FIG. 14A is a side cross-sectional view showing a state before performing the above press-fitting, FIG. 14B is a side cross-sectional view showing a state when the press-fitting is begun, and FIG. 14C is a side cross-sectional view showing a state when the press-fitting is completed. FIGS. 15A, 15B and 15C are top views showing a state when the fitting-in section of the press-fit terminal is press-fitted to the fitting section of the terminal metal-fitting, viewed from the top side of the terminal metal-fitting. FIG. 15A is a top view showing a state before performing the above press-fitting, FIG. 15B is a top view showing a state when the press-fitting is begun, and FIG. 15C is a top view showing a state when the press-fitting is completed.

As shown in FIGS. 14A and 15A, in a state before performing the press-fitting, since the tips having the width WT of the first fitting-in section 502T1 and the second fitting-in section 502T2 in the press-fit terminal 502 are shorter than the widths Hw of the short sides of the first rectangular hole part 611 and the second rectangular hole part 621 in the fitting section of the terminal metal-fitting 602, the positioning can be easily performed. As shown in FIG. 15A, since the widths HL of the long sides of the first rectangular hole part 611 and the second rectangular hole part 621 in the fitting section of the terminal metal-fitting 602 are longer than the thickness D1 of the press-fit terminal 502, the first fitting-in section 502T1 of the press-fit terminal 502 and the second fitting-in section 502T12 of the press-fit terminal 502 are respectively fitted to the first hole part 611 and the second hole part 621 at any position in a direction of the width HL of the long side in the rectangle. The fitting positions may be the substantially center positions.

Thus, as shown in FIGS. 14A and 15A, in a state before performing the press-fitting, the tip portions of the first fitting-in section 502T1 of the press-fit terminal 502 and the second fitting-in section 502T12 of the press-fit terminal 502 are respectively and relatively moved to the first hole part 611 and the second hole part 621 in the fitting section of the terminal metal-fitting 602 so that the width direction of the press-fit terminal 502 is parallel to that of the terminal metal-fitting 602. Thereby, the first fitting-in section 502T1 and the second fitting-in section 502T2 can easily be fitted to and be press-fitted to the first hole part 611 and the second hole part 621. In a case that the length "j" of the elongating section 670 of the terminal metal-fitting 602 is set to be longer, since the rigidity of the terminal metal-fitting 602 in the fitting is reduced, the resistance in the press-fitting can be suppressed. When the rigidity of the terminal metal-fitting 602 is reduced, the terminal metal-fitting 602 is easily deflected, and the plural press-fit terminals 502 can individually be press-fitted.

Figure 16A:
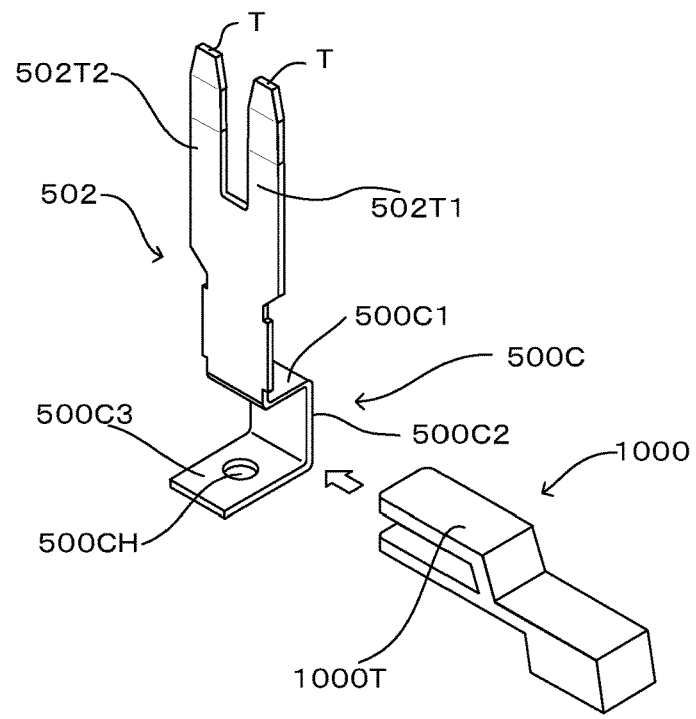
FIG. 16A is a perspective view showing a state before a support plane of a support body is abutted to a bottom surface of a forward bent section of the press-fit terminal.
Figure 16B:
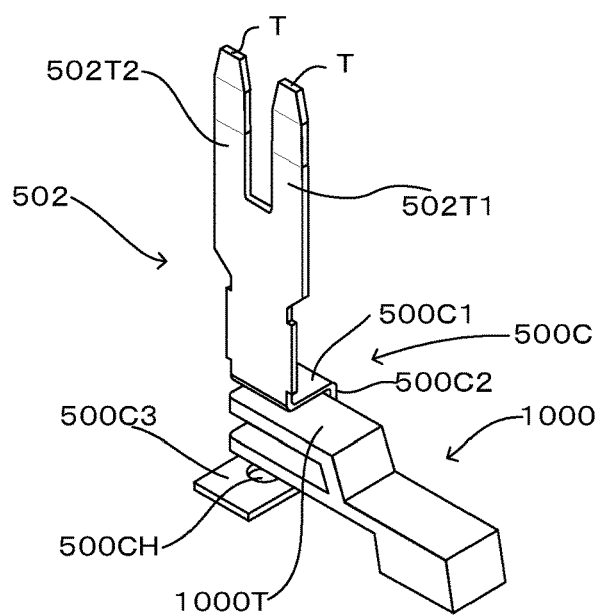
FIG. 16B is a perspective view showing a state after the support plane of the support body is abutted to the bottom surface of the forward bent section of the press-fit terminal.

Further, in a state before the press-fitting, as shown in FIG. 16B, a support surface 1000T of a support body 1000 abuts and supports the lower surface of the forward bent section 500C1 of the substrate connecting section 500C in the press-fit terminal 502, and then the press-fitting can be begun. Here, the configuration of the support body 1000 especially is not limited. In a case that the forward bent section 500C1 is supported by the support body 1000, when the terminal metal-fitting 602 is pushed down against the press-fit terminal 502 from above, and is connected to the press-fit terminal 502, the load to the joint portion where the press-fit terminal 502 is mounted on the substrate 330 using soldering can be prevented by pushing the press-fit terminal 502 to the support body 1000 in the substrate 330 direction. Thereby, the reliability of the connection section can further be improved.

As described above, when the positioning before the press-fitting, is completed, the first hole part 611 of the terminal metal-fitting 602 and the second hole part 621 of the terminal metal-fitting 602 are respectively inserted into the tip portions T of the first fitting-in section 502T1 of the press-fit terminal 502 and the second fitting-in section 502T2 of the press-fit terminal 502 in the white arrow direction shown in FIG. 14B. Then, the press-fitting is begun.

As well, as shown in FIGS. 10A and 10B, even when three press-fit terminals 502 arranged in a line are mounted on the substrate 330, the press-fitting from the press-fit terminals 502 to the terminal metal-fittings 602 may be individually performed in confirming that the connection structure is surely formed. As well as a case of the first embodiment, in performing the press-fitting, the stroke of the press-fitting (that is, how long does the press-fit terminal 502 press-fit to the terminal metal-fitting 602?) is checked, and the force used in the press-fitting (the press-fitting force) is also checked. At the same time, the press-fitting is performed by confirming that the terminal metal-fitting 602 reaches at least the straight portions S of the press-fit terminal 502 or enters into the straight portions S of the press-fit terminal 502.

In an initial state that the tip portions T of the first fitting-in section 502T1 of the press-fit terminal 502 and the second fitting-in section 502T2 of the press-fit terminal 502 respectively begin to insert into the first hole part 611 of the terminal metal-fitting 602 and the second hole part 621 of the terminal metal-fitting 602, the space between the first fitting-in section 502T1 and the first hole part 611 of the terminal metal-fitting 602 and the space between the second fitting-in section 502T2 and the second hole part 621 of the terminal metal-fitting 602 respectively decrease in the first taper section l1 formed at the tip portion T of the first fitting-in section 502T1 and the second taper section l2 formed at the tip portion T of the second fitting-in section 502T2. In this process, the influences by the attachment error of the press-fit terminal 502 and by the variations of the parts can be reduced.

When the inserting is progressed, at first, the first fitting-in section 502T1 and the second fitting-in section 502T2 respectively contacts the first hole part 611 of the terminal metal-fitting 602 and the second hole part 621 of the terminal metal-fitting 602 at two portions of the first contact regions A1 shown by the circles in FIGS. 14B and 15B.

As well, in the above inserting, as shown in FIG. 13B, the fitting section of the terminal metal-fitting 602 is formed at the end side of the elongating section 670 of the terminal metal-fitting 602. As described above, since the length "j" of the elongating section 670 is longer, the stress when the positional shift is occurred in the press-fitting can be lessened. FIG. 14B shows an example that the first contact is occurred at the upper portion of the second taper section l2. However, the first contact portion can be the first taper portion l1 or the second taper portion l2 due to the dimension variation of the parts.

In two portions of the first contact regions A1, when the press-fitting is progressed, the pressing force is operated in a direction that the portion between the first fitting-in section 502T1 of the press-fit terminal 502 and the second fitting-in section 502T2 of the press-fit terminal 502 is widened (in the hatched line arrow directions shown in FIG. 14B and FIG. 15B). Thereby, the first fitting-in section 502T1 of the press-fit terminal 502 and the second fitting-in section 502T2 of the press-fit terminal 502 are supported from the inner direction of the terminal metal-fitting 602.

Subsequently, when the press-fitting is progressed and the first hole part 611 of the terminal metal-fitting 602 and the second hole part 621 of the terminal metal-fitting 602 relatively move to downward position, the spaces between the outer side-surface of the first fitting-in section 502T1 and the first hole part 611 of the terminal metal-fitting 602 and between the outer side-surface of the second fitting-in section 502T2 and the second hole part 621 of the terminal metal-fitting 602 (the spaces between the outer side-surface of the first fitting-in section 502T1 and the opposite side of the bridge section 630 in the first hole part 611 and between the outer side-surface of the second fitting-in section 502T2 and the opposite side of the bridge section 630 in the second hole part 621) gradually decrease. As show in FIGS. 14C and 15C, in two portions of the second contact regions A2 which are shown by the circles, the second contact is occurred between the first fitting-in section 502T1 of the press-fit terminal 502 and the first hole part 611 of the terminal metal-fitting 602 and between the second fitting-in section 502T2 of the press-fit terminal 502 and the second hole part 621 of the terminal metal-fitting 602, subsequent to the contact at the first contact regions A1.

In two portions of the second contact regions A2, when the press-fitting is progressed, the pressing force is operated in a direction that the portion between the first fitting-in section 502T1 of the press-fit terminal 502 and the second fitting-in section 502T2 of the press-fit terminal 502 (in the hatched line directions shown in the circles A2 of FIGS. 14C and 15C) becomes narrower. Thereby, the first fitting-in section 502T1 of the press-fit terminal 502 and the second fitting-in section 502T2 of the press-fit terminal 502 are supported from the outer direction of the terminal metal-fitting 602.

Besides, in FIG. 14C, the example that the second contact is occurred at the below portion of the second taper section I2 is shown. However, the second contact portion can be the second taper portion I2 or the straight portion S, which is lower than the first contact portion, due to the dimension variation of the parts.

As described above, the respective inner side-surfaces of the first fitting-in section 502T1 of the press-fit terminal 502 and the second fitting-in section 502T2 of the press-fit terminal 502 are contacted to and are pressed to both side surfaces of the bridge section 630 of the terminal metal-fitting 602 at the first contact regions A1. The respective outer side-surfaces of the first fitting-in section 502T1 of the press-fit terminal 502 and the second fitting-in section 502T2 of the press-fit terminal 502 are contacted to and are pressed to the inner side-surfaces in which a distance between the long side of the first hole part 611 of the terminal metal-fitting 602 and the long side of the second hole part 621 of the terminal metal-fitting 602 is farthest, at the second contact regions A2. Thereby, the press-fit terminal 502 is fixedly supported by the four portions in the same plane of the terminal metal-fitting 602.

In this way, the next stage, the first hole part 611 of the terminal metal-fitting 602 and the second hole part 621 of the terminal metal-fitting 602 are press-fitted to and are moved to the direction of the straight portions S of the first fitting-in section 502T1 of the press-fit terminal 502 and the second fitting-in section 502T2 of the press-fit terminal 503 (the direction of the white arrows in FIG. 14C). The press-fitting is completed by confirming that the terminal metal-fitting 602 reaches at least the straight portions S of the press-fit terminal 502 or enters into the straight portions S of the press-fit terminal 502, and the terminal connection structure between the control unit such as the electric power steering apparatus and the motor, in accordance with the second embodiment, can be completed (can be assembled). The depth of the press-fitting of the terminal metal-fitting 602 to the straight portions S especially is not limited. From a point of view of improving the connection certainty and the connection stability, it is preferred that the depth be the portion where the straight portions S are the closest portion of the branch section D or be the substantially middle point of the straight portions S.

In the second embodiment according to the present invention, the terminal connection component according to the present invention and the connection structure using the same can be constituted by performing the above stages.

Next, in a case that the above terminal connection component according to the second embodiment of the present invention is constituted, the terminal metal-fitting 602 and the press-fit terminal 502 can be manufactured in the scope of the following standard, in consideration with the dimensional tolerance.

Figure 17A:
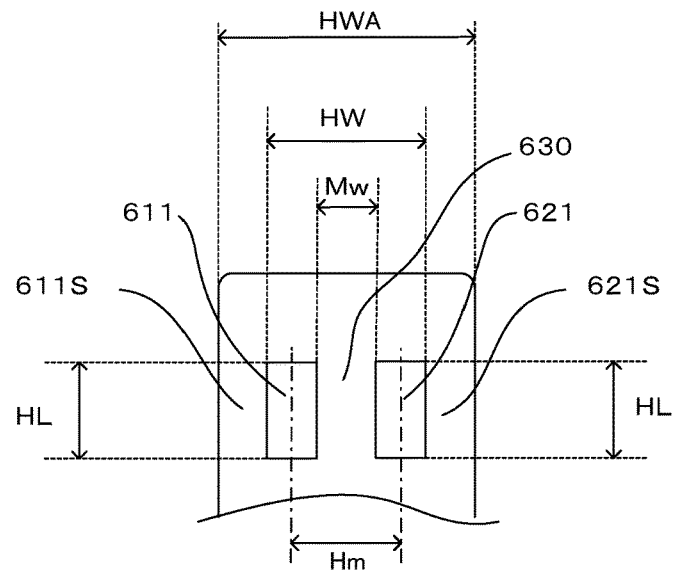
FIG. 17A is a plan view showing a dimension relationship near a fitting section of the terminal metal-fitting.

That is, as shown in FIG. 17A, for example, the terminal metal-fitting 602 can be manufactured by using the following dimensions. The reference dimension in the farthest space HW of the long side between the first hole part 611 of the terminal metal-fitting 602 and the second hole part 621 of the terminal metal-fitting 602 is set to "5.0" [mm] (the maximum tolerance dimension and the minimum tolerance dimension are respectively set to "−0.02" [mm] and "−0.05" [mm]), the reference dimension of the width Mw of the bridge section 630 is set to "1.8" [mm] (the maximum tolerance dimension and the minimum tolerance dimension are respectively set to "+0.05" [mm] and "+0.02" [mm]), the lateral width HWA of the terminal metal-fitting 602 is set to "6.0" [mm], the long side lengths HL of the first hole part 611 and the second hole part 621 is set to "2.6" [mm], as shown in FIG. 13B, the length "j" of the elongating section 670 is set to "20.0" [mm], and the length "k" of the motor-side connecting section (the fixing-side plate section) 640 is set to "10.0" [mm].

Thus, the farthest space HW of the long side between the first hole part 611 of the terminal metal-fitting 602 and the second hole part 621 of the terminal metal-fitting 602 is manufactured with the minus tolerance to the reference dimension, and the width Mw of the bridge section 630 is manufactured with the plus tolerance to the reference dimension.

Figure 17B:
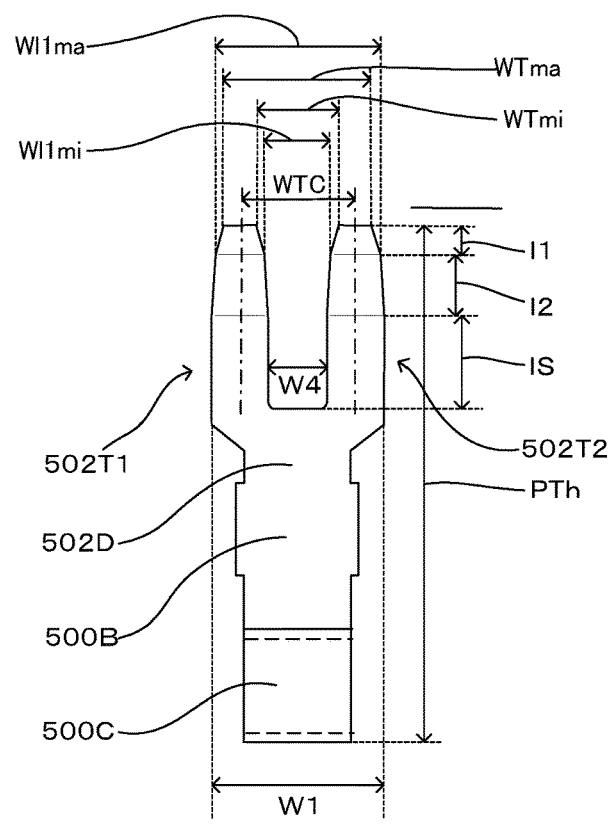
FIG. 17B is a front view showing a dimension relationship of respective sections of the press-fit terminal.

Furthermore, as shown in FIG. 17B, for example, the terminal metal-fitting 602 can similarly be manufactured by using the following dimensions. The reference dimension of the space W1 between the outer side-surface of the straight portion S of the first fitting-in section 502T1 and that of the second fitting-in section 502T2 is "5.0" [mm] (the maximum tolerance dimension and the minimum tolerance dimension are respectively set to "+0.05" [mm] and "+0.02" [mm]), the reference dimension of the space W4 between the inner side-surface of the straight portion S of the first fitting-in section 502T1 and that of the second fitting-in section 502T2 is "1.8" [mm] (the maximum tolerance dimension and the minimum tolerance dimension are respectively set to "−0.02" [mm] and "−0.05" [mm]), the maximum space WTma between the outer side-surface of the first fitting-in section 502T1 at the tip portion T and that of the second fitting-in section 502T2 at the tip portion T is set to "4.4" [mm], the minimum space WTmi between the inner side-surface of the first fitting-in section 502T1 at the tip portion T and that of the second fitting-in section 502T2 at the tip portion T is set to "2.4" [mm], the maximum space Wilma between the outer side-surface of the first fitting-in section 502T1 at the bottom portion of the first taper section and that of the second fitting-in section 502T2 at the bottom portion of the first taper section is set to "4.87" [mm], the minimum space Wl1mi between the inner side-surface of the of the first fitting-in section 502T1 at the bottom portion of the first taper section and that of the second fitting-in section 502T2 at the bottom portion of the first taper section is set to "1.93" [mm], the length l1 of the first taper section l1 is set to "1.0" [mm], the length l2 of the second taper section l2 is set to "2.0" [mm], the length lS of the straight portion S is set to "8.0" [mm], and the reference dimension of the length PTh from the tip portion T of the press-fit terminal 502 to the substrate contact section 500C3 is set to "17.0" [mm] (the maximum tolerance dimension and the minimum tolerance dimension are respectively set to "+0.15" [mm] and "−0.15" [mm]). In a case that the press-fit terminal 502 is manufactured based on these values, the taper ratio of the first taper section l1 is about "0.47" (the taper angle of the first taper section l1 is about 25 [degree]), and the taper ratio of the second taper section l2 is about "0.065" (the taper angle of the second taper section l2 is about 3.7 [degree]).

Thus, the space W1 between the outer side-surface of the straight portion S of the first fitting-in section 502T1 in the press-fit terminal 502 and that of the second fitting-in section 502T2 in the press-fit terminal 502 is manufactured with the plus tolerance to the reference dimension, and the space W4 between the inner side-surface of the straight portion S of the first fitting-in section 502T1 in the press-fit terminal 502 and that of the second fitting-in section 502T2 in the press-fit terminal 502 is manufactured with the minus tolerance to the reference dimension.

The reference dimension of the width Mw of the bridge section 630 in the terminal metal-fitting 602 is manufactured with the same length as the reference dimension of the space W4 between the inner side-surface of the straight portion S of the first fitting-in section 502T1 in the press-fit terminal 502 and that of the second fitting-in section in the press-fit terminal 502. Considering the tolerance, the width Mw of the bridge section 630 is manufactured with slightly longer than the space W4 between the inner side-surface of the straight portion S of the first fitting-in section 502T1 in the press-fit terminal 502 and that of the second fitting-in section 502T2 in the press-fit terminal 502. The reference dimension in the farthest space HW of the long side between the first hole part 611 of the terminal metal-fitting 602 and the second hole part 621 of the terminal metal-fitting 602 is manufactured with the same length as the reference dimension of the space W1 between the outer side-surface of the straight portion S of the first fitting-in section 502T1 in the terminal metal-fitting 602 and that of the second fitting-in section 502T2 in the terminal metal-fitting 602.

Accordingly, since the press-fit terminal 502 and the terminal metal-fitting 602 are manufactured in consideration with the tolerance to the reference dimension, when the terminal metal-fitting 602 is mutually press-fitted to the press-fit terminal 502, both side surfaces of the bridge section 630 of the terminal metal-fitting 602 press the inner side-surface of the first fitting-in section 502T1 of the press-fit terminal 502 and that of the second fitting-in section 502T2 of the press-fit terminal 502 at the first contact regions A1 so that the space between the first fitting-in section 502T1 of the press-fit terminal 502 and the second fitting-in section 502T2 of the press-fit terminal 502 is widened, and the first hole part 611 of the terminal metal-fitting 602 and the second hole part 621 of the terminal metal-fitting 602 press the outer side-surfaces of the first fitting-in section 502T1 of the press-fit terminal 502 and that of the second fitting-in section 502T2 of the press-fit terminal 502 at the second contact regions A2 so that the space between the first fitting-in section 502T1 of the press-fit terminal 502 and the second fitting-in section 502T2 of the press-fit terminal 502 becomes narrower.

Since the above tolerances are set in manufacturing, and the width Mw of the bridge section 630 of the terminal metal-fitting 602 is slightly longer than the space W4 between the inner side-surface of the straight portion S of the first fitting-in section 502T1 in the press-fit terminal 502 and that of the second fitting-in section 502T2 in the press-fit terminal 502, when the press-fitting is performed, at first, the connection between the press-fit terminal 502 and the terminal metal-fitting 602 is performed at the first contact regions A1, and subsequently the connection is performed at the second contact regions A2.

Further, in the above terminal connection structure according to the second embodiment of the present invention, as shown in FIG. 18B, a configuration that the cover 700 covers the press-fit terminals 502 and the terminal metal-fittings 602 can be adopted. FIGS. 18A and 18B are diagrams for explaining the cover which covers the press-fit terminals 502 and the terminal metal-fittings 602, which are connected by the present invention, FIG. 18A is a perspective view showing the terminal connection component and the terminal metal-fittings according to the present invention from the terminal metal-fitting 602 side of the motor 20, as well as FIG. 10B, and FIG. 18B is a perspective view showing an example that the cover 700 which covers the press-fit terminals 502 and the terminal metal-fittings 602, which are shown in FIG. 18A, is disposed.

Basically, the cover 700 according to the second embodiment of the present invention can be adopted to the same as that of the first embodiment, as shown in FIGS. 9A, 9B, 9C and 9D.

In the second embodiment of the present invention, as well as a case of the first embodiment, fixing the terminal metal-fittings 602 via the cover 700 by using the screws can not only fix the cover 700 and but also effectively prevent the positional shift due to the thermal variation of the terminal metal-fittings 602, the press-fit terminals 502 and the like, and the positional shift to the horizontal direction or to the vertical direction due to the vibration of the vehicle.

Consequently, in the second embodiment according to the present invention, the press-fit terminals 502 having the two fitting-in sections (502T1 and 502T2), which the press-fit technology is used, at the one end of the motor wiring in the control circuit 30 of the substrate 330 side in which the large current is flown, are used. The terminal connection structure between the control unit (ECU) of the electric power steering apparatus and the motor 20, in which the connection is performed by press-fitting the press-fit terminals 502 to the fitting-in sections of the terminal metal-fittings 602 of the motor 20, is adopted. Such the control unit can be used in, for example, the electric power steering apparatus and the like. Further, the cover 700 which covers the press-fit terminals 502 and the terminal metal-fittings 602 from above of the connection portion of the substrate 330 and the terminal metal-fittings 602 of the motor 20, and the connection portion of the control unit 30 and the terminal metal-fittings 602 of the motor 20, can also be used.

In this connection, the second embodiment of the present invention, the terminal connection component in which the press-fit technology is used, and the terminal connection structure using the same are adopted at the one end of the motor wiring of the substrate side in which the large current is flown. The second embodiment of the present invention enables to handle the slight variation in dimension of the above press-fit terminals, and provide, for example, the electric power steering apparatus which improves the durability and has a high reliability, by surely contacting the terminal metal-fitting from the motor to the press-fit terminal from the substrate of the control unit at the four points in the two contact regions. Further, the second embodiment of the present invention enables to improve the convenience of the assembling operation or the removing operation of the unit comprising the control unit and the motor, reduce the number of the components (for example, not using the terminal block nor the bolt), and realize the miniaturization of the ECU in which the environment impact (the use of the lead-free solder and the like) is considered.

As well, the second embodiment according to the present invention shows one example of the present invention, the above embodiment is not limited in the present invention, and various modification examples can be used. For example, in the above embodiment, the 3-phase motor is used as the motor 20. However, the kind of the motor 20 is not limited to the 3-phase motor. Three groups of the press-fit terminals 502 and the terminal metal-fittings 602 are used for handling the 3-phase motor. However, the number of the press-fit terminals 502 and the terminal metal-fittings 602 are not limited to the three groups. In a case that the control circuit 30, the motor 20 and the like are constituted by the redundant circuits, the press-fit terminals 502 and the terminal metal fittings 602 whose number are more than three can be used for handling the redundant circuits.

Further, the press-fit terminal according to the second embodiment of the present invention can form plural groups of the first and second fitting-in sections in parallel at the tip portion. In conjunction with the plural groups of the first and second fitting-in sections, plural groups of the first and second hole parts of the terminal metal-fitting can be formed in parallel in the longitudinal direction of the terminal metal-fitting. By respectively fitting the plural groups of the first and second fitting-in sections of the press-fit terminal to the plural groups of the first and second hole parts of the terminal metal-fitting, the connection between the press-fit terminal and the terminal metal-fitting can be performed.

Figure 19A:
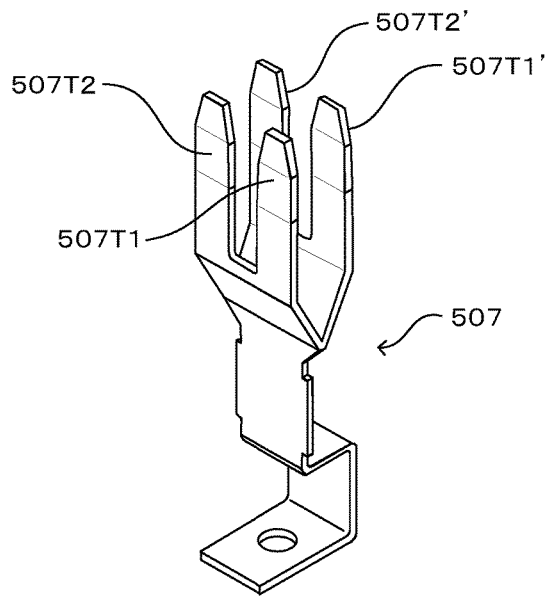
FIGS. 19A and 19B are perspective views showing two fitting-in-section-pairs that comprise the first fitting-in section and the second fitting-in section.
Figure 19B:
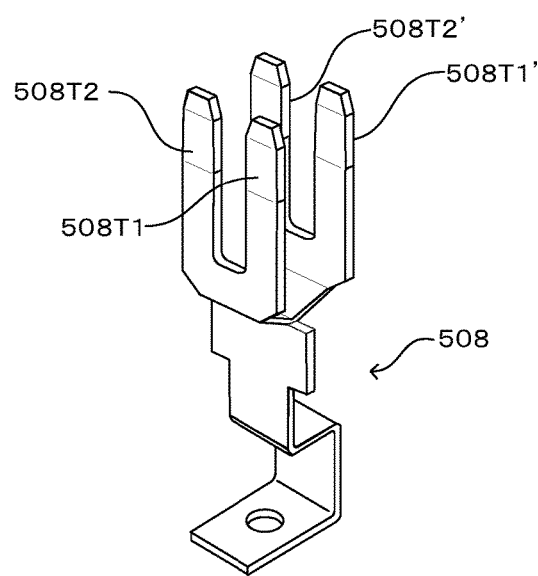

That is, the first and second fitting-in sections of the press-fit terminal is considered as one group, and for example, two groups are selected as the plural groups. The one group of the first fitting-in section 507T1 (or 508T1 in case of FIG. 19B (the same applies hereinafter)) and the second fitting-in section 507T2 (or 508T2) of the press-fit terminal 507 (or 508) is disposed shown in FIG. 19A (or FIG. 19B). The other group of the first fitting-in section 507T1' (or 508T1') and the second fitting-in section 507T2' (or 508T2') can be formed perpendicular to the disposed direction of the one group of the first fitting-in section 507T1 (or 508T1) and the second fitting-in section 507T2 (or 508T2) in parallel so that the first fitting-in section 507T1' (or 508T1') and the second fitting-in section 507T2' (or 508T2') are respectively opposed to the first fitting-in section 507T1 (or 508T1) and the second fitting-in section 507T2 (or 508T2).

Figure 19C:
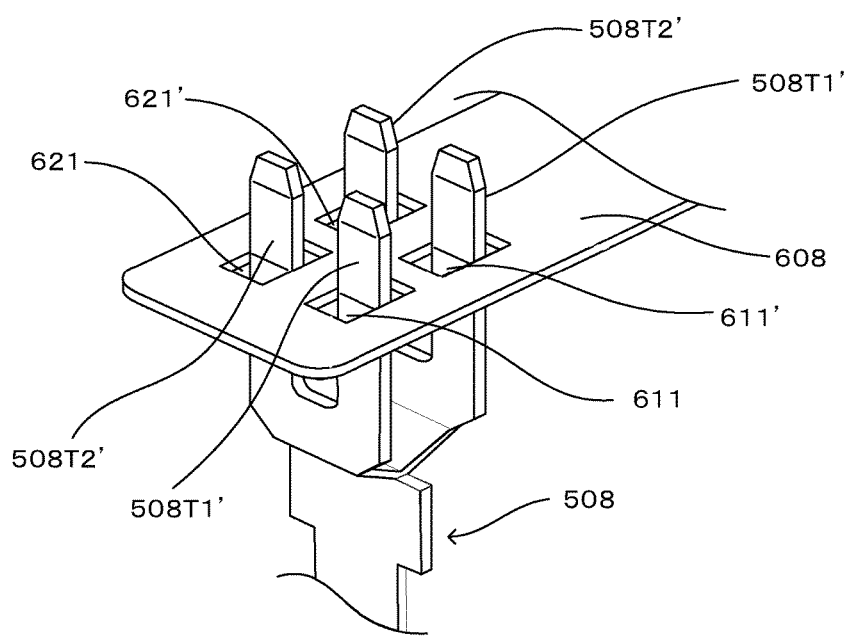
FIG. 19C is a perspective view showing a state that two hole part-pairs that comprise the first hole part and the second hole part are combined with the press-fit terminals depicted in FIG. 19B.

Corresponding to the two groups of the first and second fitting-in sections disposed at the tip portions of the press-fit terminal, for example, as shown in FIG. 19C, in addition to the one group of the first hole part (611) and the second hole part (621) of the terminal metal-fitting (608), the other group of the first hole part (611') and the second hole part (621') of the terminal metal-fitting (608) can be disposed in the longitudinal direction of the terminal metal-fitting (608) in parallel.

Thus, in a case that the above configuration is adopted, as shown in FIG. 19C, the electrical connection and the mechanical connection between the press-fit terminal 508 and the terminal metal-fitting 608 can be achieved by respectively press-fitting the two groups of the first and second fitting-in sections of the press-fit terminal 508 to the two groups of the first and second hole parts of the terminal metal-fitting 608.

Next, the third embodiment according to the present invention with respect to the terminal connection component and the terminal connection structure between the control unit using the same and the motor will be described.

Figure 20A:
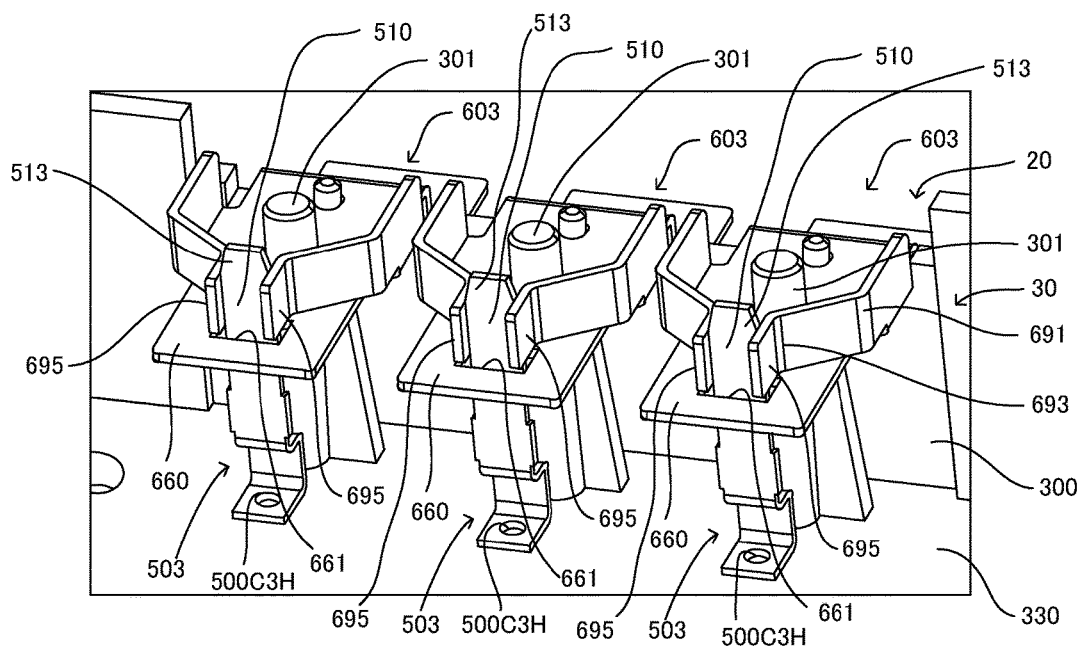
FIG. 20A is a perspective view showing the terminal connection structure according to the third embodiment of the present invention from the substrate side in an interior of the control unit.
Figure 20B:
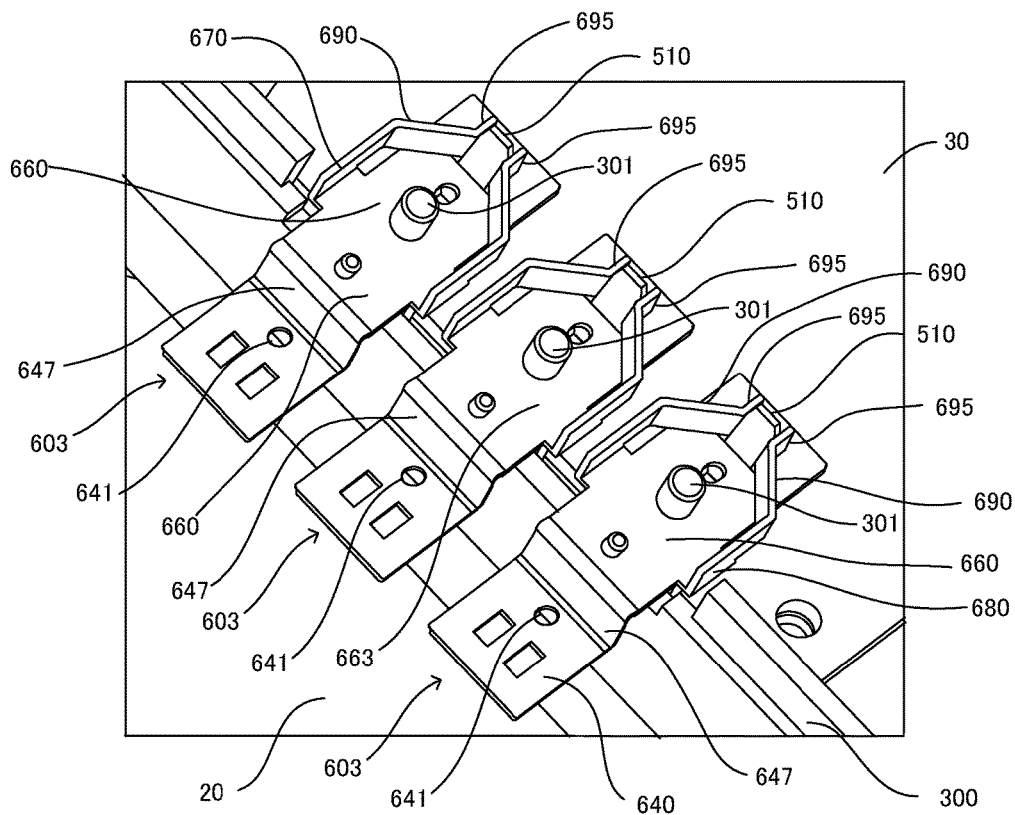
FIG. 20B is a perspective view showing the terminal connection structure from the terminal metal-fitting side of the motor.

For example, as shown in FIGS. 20A and 20B, the inserting sections 510 of the press-fit terminals 503, which are perpendicularly stood from the upper surface of the substrate 330 received in the case 300 (not shown) of the control unit 30, and are the plate-shape electrode, are press-fitted between the holding sections 695 of the plate-shape terminal metal-fittings 603 which are electrically connected to the respective phase coils by which the motor 20 is constituted.

That is, in the third embodiment according to the present invention, as described below in detail, the inserting section 510 of the press-fit terminal 503 is inserted from an interior of the through hole 661 formed at the holding-side plate section 660 of the terminal metal-fitting 603, and the taper section 513 disposed at the tip side of the inserting section 510 of the press-fit terminal 503 is press-fitted to the gap (the space or the interval) formed between the holding sections 695 of the terminal metal-fitting 603. Thereby, the press-fit terminal 503 is electrically connected to the terminal metal-fitting 603.

Hereinafter, the respective elements will be described in order. The above FIGS. 20A and 20B are perspective views showing an outline of the terminal connection structure (including the terminal connection component) according to the third embodiment of the present invention. FIG. 20A is a perspective view showing the terminal connection structure according to a third embodiment of the present invention from the substrate side in an interior of the control unit, and FIG. 20B is a perspective view showing the terminal connection structure from the terminal metal-fitting side of the motor.

As well, in FIGS. 20A and 20B, the circuit formed on the substrate 330 and the portion with respect to the terminal metal-fittings 603 of the motor 20 are omitted. Portions that the press-fit terminals 503 are stood from the substrate 330 are electrically connected to the 3-phase (the U-phase, the V-phase and the W-phase) output lines from the inverter 37 to the motor 20, as described in the first and second embodiments. The terminal metal-fittings 603 of the motor 20 are respectively and electrically connected to the 3-phase coils by which the motor 20 is constituted.

Similarly, in the terminal connection component according to the third embodiment of the present invention, the control unit 30 in which the above terminal connection component is used is, for example, that of the above-described electric power steering apparatus, and the control unit 30 comprises the substrate 330 on which the control circuit such as the inverter 37, which controls the motor current, is mounted. Here, the substrate 330 is assumed to the power substrate on which the inverter circuit is mounted. Even one substrate which integrates the power substrate with the control substrate which processes the signals from the CAN 50 in the low power system and the like, can be used.

The 3-phase output lines, which are the U-phase, the V-phase and the W-phase, are disposed on the substrate 330 on which the inverter 37 is formed, via the motor release switch 23. The three press-fit terminals 503 are stood from the substrate 330 and are connected to the 3-phase output lines along the side surface of the substrate 330 in parallel.

Figure 21A:
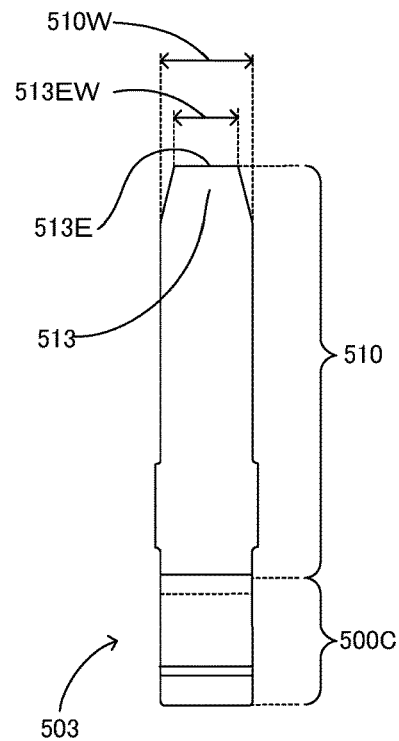
FIGS. 21A, 21B and 21C are diagrams showing an embodiment of the press-fit terminal stood from the substrate according to the third embodiment.
Figure 21B:
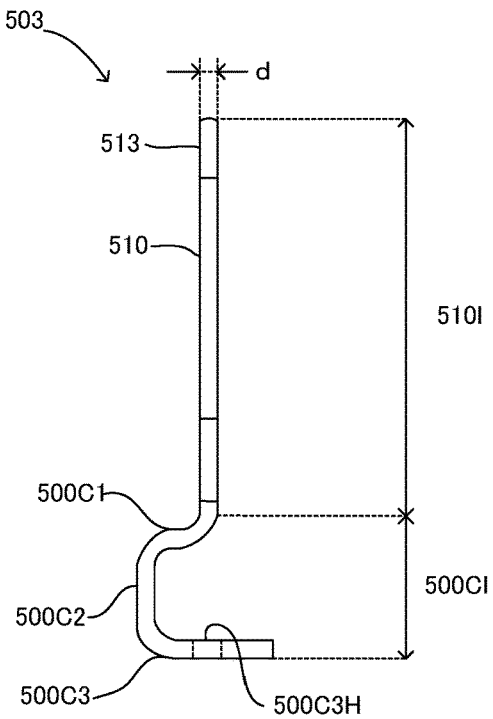
Figure 21C:
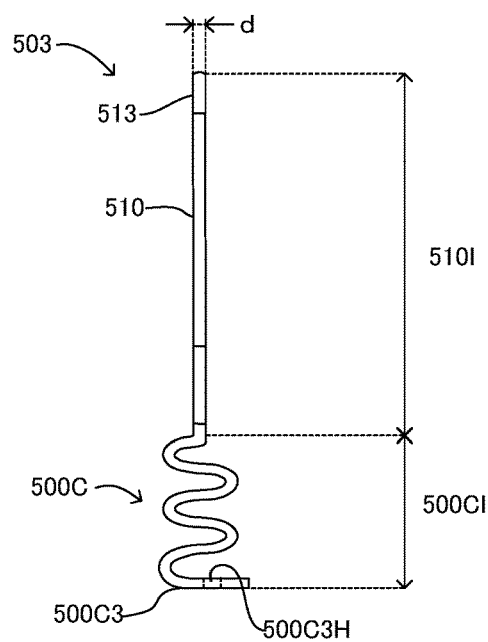

Next, the press-fit terminal 503, for example as shown in FIGS. 21A, 21B and 21C, by which the terminal connection component is constituted, basically has a similar configuration of the press-fit terminal 500 which are used in the terminal connection component according to the above first embodiment. Here, FIGS. 21A, 21B and 21C are diagrams showing an embodiment of the press-fit terminal 503 stood from the substrate 330 according to the third embodiment, FIG. 21A is a front view, FIG. 21B is a side view, and FIG. 21C is a side view of a different example.

The configuration of the press-fit terminal 503 is roughly divided into the following sections. As well as the press-fit terminal 500 according to the above first embodiment, the press-fit terminal 503 comprises the inserting section 510 by which one end side of the press-fit terminal 503 is constituted, and the substrate connecting section 500C by which the other end side of the press-fit terminal 503 is constituted. The substrate contacting section 500C3 by which the substrate connecting section 500C is constituted is connected to the substrate 330 of the control unit 30. The tip of the press-fit terminal 503 is upwardly extended along the side surface of the side wall portion of the casing 300 on which the substrate 330 is mounted. It is required that the combined length of the inserting section 510 and the substrate connecting section 500C has an adequate length to fit to the terminal metal-fitting 603 from the motor 20.

The inserting section 510 is a portion in which the press-fit terminal 503 is inserted into and is connected to the terminal metal-fitting 603. An embodiment of the inserting section 510 has a substantially rectangular-shape, and the taper section 513 is formed at the one end in the longitudinal direction of the rectangular-shape. The taper section 513 is a portion in which the width of the plate of the inserting section 510 becomes narrower (refer to FIG. 21A). The width 513EW of the end portion 513E is formed shorter than the width 695W formed between the holding sections 695 of the terminal metal-fitting 603, as described below.

Further, the substrate connecting section 500C is disposed at the other end of the above inserting section 510, and mainly absorbs the stress to the press-fit terminal 503 and the like. Therefore, such the substrate connecting section 500C can be considered as the elastic section. For example, as shown in FIG. 21B, the configuration of such the substrate connecting section 500C is basically the same as those of the first and second embodiments. The combined section of the forward bent section 50001 in the substrate connecting section 500C and the downward section 50002 is a portion in which the stress to the press-fit terminal 503 is lessened. In a case that the press-fit terminal 503 is press-fitted to the terminal metal-fitting 603 of the motor 20, the above combined section has a function that the excessive stress is not added at the connecting section where the substrate connecting section 500C is connected to the substrate 330, and the stress due to the deformation generated by an influence of the temperature variation in the vehicle in which the products according to the present invention is mounted is lessened or absorbed.

As well, as described above, since the object of forming the substrate connecting section 500C is to lessen the stress and the like, if the function can be achieved, the configuration of the substrate connecting section 500C is not limited to the above one. For example, as shown in FIG. 21C, at the other end of the inserting section 510, a portion having an elastic function and having a continuous meandering shape in a side surface view extending to the inserting section 510 is formed. The substrate contacting section 500C3 may be disposed at the end of the continuous meandering series in a perpendicular direction.

Next, in the elements by which the terminal connection component is constituted, the configuration example of the terminal metal-fitting 603 which is connected to, for example, the motor 20 will be described.

Even in an example of the third embodiment, as described in the first and second embodiments, the terminal metal-fittings 603 are electrically connected to the 3-phase (the U-phase, the V-phase and the W-phase) coils by which the motor 20 is constituted. The electrical connection embodiment between each of the terminal metal-fittings 603 and the motor 20 is not especially limited. For example, the input terminals, the bus bars or the like to the motor 20, which are disposed at the casing of the motor 20 or at the flange of the casing of the motor 20, may be connected to the fixing-side plate section (the motor-side connecting section) 640 at the one end of the terminal metal-fittings 603, and then the terminal metal-fittings 603 can be connected to the motor 20.

As shown in FIGS. 20A and 20B, FIGS. 22A, 22B and 22C, the terminal metal-fittings 603 according to the third embodiment of the present invention have the holding sections 695. As shown in FIGS. 20A and 20B, for example, in a case that the motor 20 is disposed on the side surface or the bottom surface of the control unit 30, the terminal metal-fittings 603 are formed from the exterior portion of the case 300 of the control unit 30 to the interior portion of the case 300 and are extended parallel to the substrate 330, and the holding sections 695 are disposed at the upper end of the press-fit terminals 503.

In the terminal metal-fittings 603 disposed in the above way, the inserting section 510 of the press-fit terminal 503 is inserted from the interior of the through hole 661 of the terminal metal-fitting 603 to the terminal metal-fitting 603 through the plate of the terminal metal-fitting 603. The taper section 513 at the tip side of the inserted press-fit terminal 503 is press-fitted to the space 695W between the holding sections 695 formed on the terminal metal-fitting 603. Thereby, the connection between the press-fit terminal 503 and the terminal metal-fitting 603 is performed.

Thus, in the third embodiment of the present invention, for example, as shown in FIGS. 22A, 22B and 22C, the terminal metal-fitting 603 has a configuration that a substantially rectangular metal conductor made of copper or the like bent. The terminal metal-fitting 603 comprises a fixing-side plate section (a motor-side connecting section) 640 that forms one end portion of the terminal metal-fitting 603, a step section 647 that forms by perpendicularly bending the plate in the vicinity of the other end side of the terminal metal-fitting 603 from the fixing-side plate section (the motor-side connecting section) 640, and a holding-side plate section 660 that forms at the opposite side to the fixing-side plate section (the motor-side connecting section) 640 in parallel and has a length "J".

Further, the holding-side plate section 660 comprises standing sections 680 and a through hole 661 disposed in a direction of the other end side of the holding-side plate section 660 from the standing sections 680. The standing sections 680, which are stood from both sides of the longitudinal direction of the holding-side plate section 660. A pair of extending sections 690 that are extended from the standing sections 680 to the other end of the holding-side plate section 660 are formed. The holding sections 695, which are perpendicular to the plate of the holding-side plate section 660, are formed at the end portions of the extending sections 690.

In this connection, the inserting section 510 of the press-fit terminal 503 is held by the holding sections 695 formed at the end portions of the extending sections 690, and the electrical connection between the press-fit terminal 503 and the terminal metal-fitting 603 is performed.

In the elements of the above terminal metal-fitting 603, the fixing-side plate section (the motor-side connecting section) 640 is electrically connected to the motor 20 at the motor 20 side. The above connection is performed at the openings 643 or the like formed at the fixing-side plate section (the motor-side connecting section) 640. Further, in the fixing-side plate section (the motor-side connecting section) 641, the fixing-side plate section hole part (the motor-side connecting section-side hole part) 641 may be provided for connecting to the casing of the motor 20. The overall embodiment of the fixing-side plate section (the motor-side connecting section) 640 has a quadrangular-shape such as a substantial rectangular-shape or a substantial square-shape. However, the above shape is not limited to the quadrangular-shape. If the fixing-side plate section (the motor-side connecting section) 640 can be fixed to the other member, any embodiment can be selected as the embodiment of the fixing-side plate section (the motor-side connecting section) 640.

The holding-side plate section 660 of the terminal metal-fitting 603, which is connected to the motor 20, is disposed over the press-fit terminal 503 provided in the control unit 30 (in a case that the longitudinal direction of the press-fit terminal 503 is set perpendicular to the horizontal plane, the holding-side plate section 660 is disposed in an extending direction in which the taper section 513 is provided). The step section 647 is a portion that the height for introducing beyond the wall of the case (the casing) 300 of the control unit 30 is ensured. Therefore, the step section 647 is formed by bending the short side in the one end side of the fixing-side plate section (the motor-side connecting section) 640. The height (the length) is determined by considering the dimensions of the motor 20, the case 300 of the connected control unit 30 and the like.

The holding-side plate section 660 is further bent from the step section 647, is extended to the opposite direction to the fixing-side plate section (the motor-side connecting section) 640 and the parallel direction to the fixing-side plate section 640, and arrives at the upper portion of the press-fit terminal 503 of the control unit 30 from the motor 20 side in a case that the control unit 30 and the motor 20 are assembled. In the holding-side plate section 660, the through hole for inserting the press-fit terminal 503 is provided. The press-fit terminal 503 is passed through the interior of the through hole 661 and the plate of the holding-side plate section 660 of the terminal metal-fitting 603, and is inserted into the space 695W formed at the holding section 695. Here, if the inserting section 510 of the press-fit terminal 503 can be inserted into the through hole 661, an embodiment of the through hole 661 is not especially limited, nor is limited to the quadrangular-shape, as shown in FIGS. 22A, 22B and 22C.

Further, the standing sections 680 are formed at both sides in the longitudinal direction of the holding-side plate section 660, and are stood perpendicular to the holding-side plate section 660. For example, such the standing sections 680 are formed by slitting the both side surfaces of the holding-side plate section 660 in the longitudinal direction and bending the slit portion. Further, the plate extending sections 690 that are extended from the standing sections 680 to the other end of the holding-side plate section 660 (the end portion of the opposite direction of the fixing-side plate section (the motor-side connecting section) 640) are formed. When the holding-side plate section 660 is formed, simultaneously, the standing sections 680 can be processed and be molded by the press molding or the like.

Further, a pair of the extending sections 690 that are extended from both standing sections 680 of the holding-side plate section 660 to the through hole 661 side, are formed as the plate-shape perpendicular to the plate of the holding-side plate section 660. The holding sections 695, which are extended from the end portions of the extending sections 690, are held by the extending sections 690. Entirely, the extending sections 690 comprise first bent sections 691 that are bent toward to the center line of the longitudinal direction of the holding-side plate section 660 (the center line KC of the holding-side plate section), and second bent sections 693 that are disposed in the tip direction of the holding-side plate section 660 from the first bent sections 691, and are bent in a direction parallel to the center line of the holding-side plate section 660 so that the holding sections 695 are disposed near the central portion of the through hole 661.

Therefore, in a case that the press-fit terminal 503 is press-fitted to the space (interval) 695W formed between the holding sections 695, entirely, the extending sections 690 have a plate-spring function. When the press-fit terminal 503 is press-fitted to the holding sections 695, in a case that the space 695W between the holding sections 695 is enlarged, the extending sections 690 operate so that the width of the enlarged space 695W becomes smaller.

The holding sections 695 are disposed at the tips of the extending sections 690. Two plates are bent at the first bent sections 691 from both side directions of the holding-side plate sections 660 so that the two plates become closer (see, FIG. 22A). The two plates are bent at the second bent sections 693 so that the two plates are directed parallel to the center line of the holding-side plate section 660. The tips of the two plates (the holding sections 695) are formed as a pair of plates which have a constant interval and are perpendicular to the plate surface of the holding-side plate section 660. The space 695W between the holding sections 695 is slightly longer than the width 513EW at the one plate end where the taper section 513 of the inserting section 510 of the press-fit terminal 503 is disposed, and is shorter than the plate width 510W of the inserting section 510 of the press-fit terminal 503. By forming the tip portion of the press-fit terminal 503 in the above-described way, the tip portion of the inserting section 510 of the press-fit terminal 503 can easily be inserted into the space 695W formed between the holding sections 695. When the press-fitting is progressed, both sides of the inserting section 510 of the press-fit terminal 503 (both side surfaces in the width 510W direction) are pressed by the holding section 695.

As well, the dimensions of the details of the press-fit terminal 503 and the terminal metal-fitting 603 are not limited. For example, the press-fit terminal 503 can be manufactured by using the following dimensions. The length 500C1 of the substrate connecting section is set to "4.5±0.15" [mm], the sum length of the length 5101 of the inserting section and the length 500C1 of the substrate connecting section is set to "19.0±0.15" [mm], the width 510W of the inserting section is set to "3.2±0.1" [mm], the width 513EW of the end portion of the taper section 513EW is set to "2.2" [mm], the thickness "d" of the press-fit terminal 503 is set to "0.6±0.015" [mm], and in a case that the taper section 513d is provided in the thickness direction of the press-fit terminal 504 as described below, the thickness 513dW of the end portion of the taper section 513EW is set to "0.2" [mm]. The terminal metal-fitting 603 can be manufactured by using the following dimensions. The length "J" of the holding-side plate section is set to "21.2" [mm], the width W1 of the terminal metal-fitting not including the standing section is set to "10.0" [mm], the width W2 of the terminal metal-fitting including the standing section is set to "13.0" [mm], the height 647h of the step section is set to "7.0±0.15" [mm], the height 680h of the standing section is set to "4.4" [mm], the space 690d between the extending section 690 and the holding-side plate section 660 in the vertical direction is set to "0.4" [mm] (see, FIG. 22C), the space 695W between the holding sections is set to "4.2" [mm] in a case of the terminal metal-fitting 603 in which the side surfaces of the press-fit terminal 503 are held, and the reference dimension of the space 695W between the holding sections is set to "0.4" [mm] (the maximum tolerance dimension and the minimum tolerance dimension are respectively set to "0.0" [mm] and "−0.2" [mm]) in a case of the terminal metal-fitting 604 in which the plate surfaces of the press-fit terminal 503 are held.

As shown in the above configuration example, in the third embodiment of the present invention, the through hole 661 is disposed in the holding-side plate section 660. The inserting section 510 of the press-fit terminal 503 is passed through an interior of the through hole 661 and the plate surface of the holding-side plate section 660 of the terminal metal-fitting 603 without contacting the above plate surface, and is inserted between the holding sections 695.

In this connection, in the third embodiment according to the present invention, the holding-side plate section 660 has a structure in the above-described way. When the inserting section 510 of the press-fit terminal 503 is inserted between the holding sections 695 from the below of the terminal metal-fitting 603, the holding-side plate section 660 is fixedly held by the support jig (not shown) or the like, and the inserting section 510 of the press-fit terminal 503 can be press-fitted to the holding section 695.

Next, with reference to FIGS. 23A, 23B, 23C and 23D, the terminal connection between the press-fit terminal 503 and the terminal metal-fitting 603, which are the terminal connection component according to the third embodiment of the present invention and have an above-described configuration, is performed as follows.

Figures 23A, 23B, 23C:
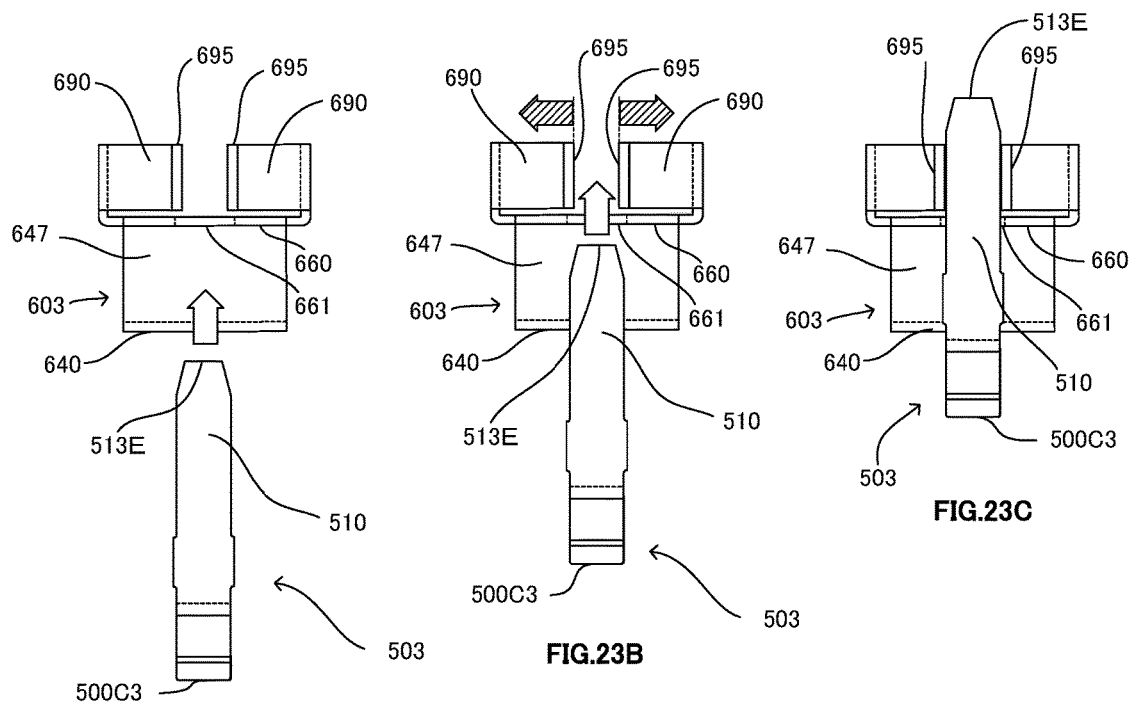
FIGS. 23A, 23B, 23C and 23D are diagrams viewed from a front direction of the terminal metal-fitting, showing an inserting section of the press-fit terminal is press-fitted to a holding section of the terminal metal-fitting.

That is, as shown in FIG. 23A, when the terminal connection is performed, the press-fit terminal 503 is arranged at the below of the terminal metal-fitting 603 and is moved close to the terminal metal-fitting 603 shown by the white arrow. Here, in FIG. 23A, the press-fit terminal 503 is moved to the upward direction. However, the press-fit terminal 503 is relatively close to the terminal metal-fitting 603, and the terminal metal-fitting 603 may be moved to the downward direction from above of the press-fit terminal 503. When the terminal connection is performed, it is preferred that the holding-side plate section 660 be preliminarily fixed by the support jig (not shown) so that the press-fitting is surely performed. As well as the cases of the first and second embodiments, in performing the press-fitting, the stroke of the press-fitting (that is, how long does the press-fit terminal 503 press-fit to the terminal metal-fitting 603?) is checked, and the force used in the press-fitting (the press-fitting force) is also checked. At the same time, the press-fitting is performed by confirming that the portion where the taper of the inserting section 510 is not provided in the press-fit terminal 503 arrives at or enters into the terminal metal-fitting 603.

Figure 23D:
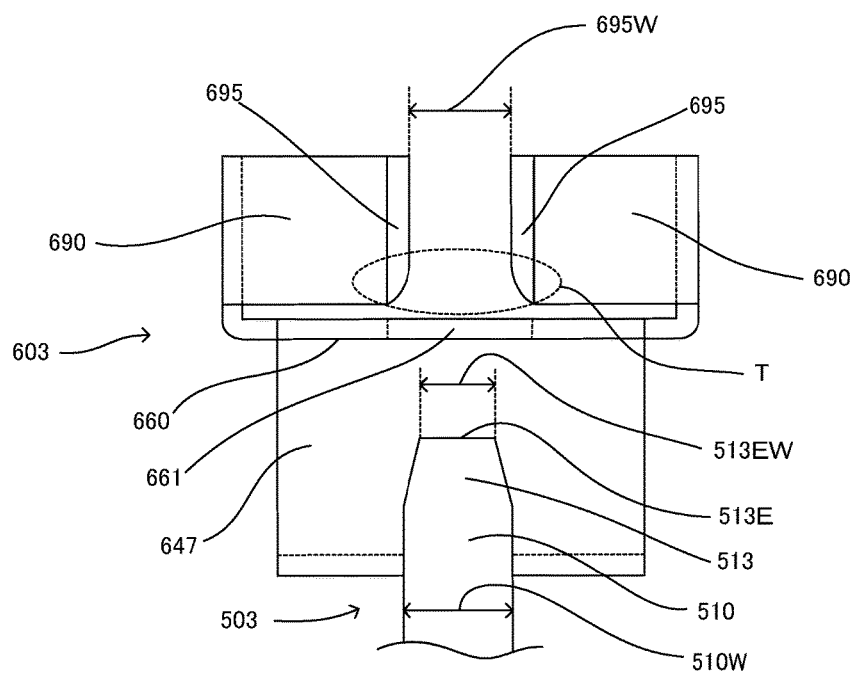

Next, as shown in FIG. 23B, the end portion 513E of the taper section at the tip of the inserting section 510 of the press-fit terminal 503 is press-fitted to the space between the holding sections 695 of the terminal metal-fitting 603. As shown in FIG. 23D, since the space 695W formed between the holding sections 695 of the terminal metal-fitting 603 is slightly longer than the width 513EW of the one end portion at which the taper section 513 of the inserting section 510 of the press-fit terminal 503 is disposed, the press-fitting is smoothly performed. When the press-fitting is progressed in the white arrow direction as shown in FIG. 23B, since the space 695W formed between the holding sections 695 of the terminal metal-fitting 603 is shorter than the plate width 510W of the inserting section 510 of the press-fit terminal 503, the space 695W formed between the holding sections 695 is widened, as shown in the hatched line arrows of FIG. 23B, and the holding sections 695 receive the reaction force from the extending section 690 having the plate-spring function. As shown in FIG. 23C, in a case that the press-fit terminal 503 is press-fitted to the terminal metal-fitting 603 and the press-fitting is completed, the stable terminal connection can be achieved.

As well, in FIG. 23C (as well as FIG. 27C as described below), the substrate contacting section 500C3 of the press-fit terminal 503 and the fixing-side plate section (the motor-side connecting section) 640 of the terminal metal-fitting 603 after the terminal connection is completed, are not apparently disposed on the same plane. FIGS. 23A, 23B, 23C and 23D (or FIGS. 27A, 27B, 27C and 27D) exemplify the concept of the connection. The connection configuration is not limited to the above configuration, the substrate contacting section 500C3 and the fixing-side plate section (the motor-side connecting section) 640 may be disposed on the same plane. Whether the substrate contacting section 500C3 and the fixing-side plate section (the motor-side connecting section) 640 of the terminal metal-fitting 603 are apparently disposed on the same plane is dependent on the dimensions of the press-fit terminal 503 and the terminal metal-fitting 603, and the structure around the terminal connection portions of the control unit 30, which is connected to the press-fit terminal 503, and the casing of the motor 20. For example, as shown in the perspective views of FIGS. 8A and 8B of the first embodiment, and FIGS. 10A and 10B of the second embodiment, in a case that the substrate contacting section 500C3 and the fixing-side plate section (the motor-side connecting section) 640 are disposed on the same plane, the dimensions of the press-fit terminal 503 and the terminal metal-fitting 603, and the structure around the terminal connection portions can be appropriately adjusted.

Further, in the examples of FIGS. 23A to 23C, the tapers are not provided on the lower surfaces of a pair of the plates by which the holding sections 695 are constituted (the surfaces facing to the holding-side plate section 660). As shown in FIG. 23D, the tapers T (the portion surrounded by an chain-line ellipse in FIG. 23D) extending from the lower surfaces of the holding section 695 where the press-fit terminal 503 is firstly inserted, to the upward can be provided in the holding sections 695. By disposing such the tapers T, the space 695W formed between the holding sections 695 is widened on the lower surfaces of the holding sections 695, and then the press-fitting of the press-fit terminal 503 can more easily be performed.

Next, the fourth embodiment in which the third embodiment according to the present invention is modified will be described.

Figure 24A:
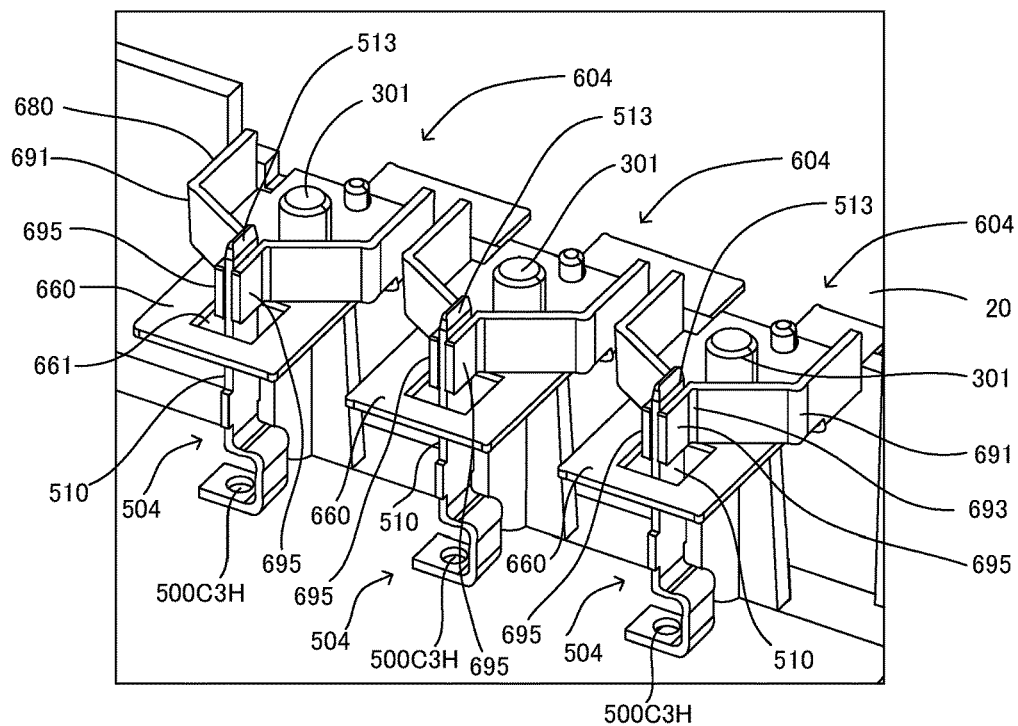
FIG. 24A is a perspective view showing the terminal connection component and the terminal connection structure according to the fourth embodiment of the present invention from the substrate side in an interior of the control unit.
Figure 24B:
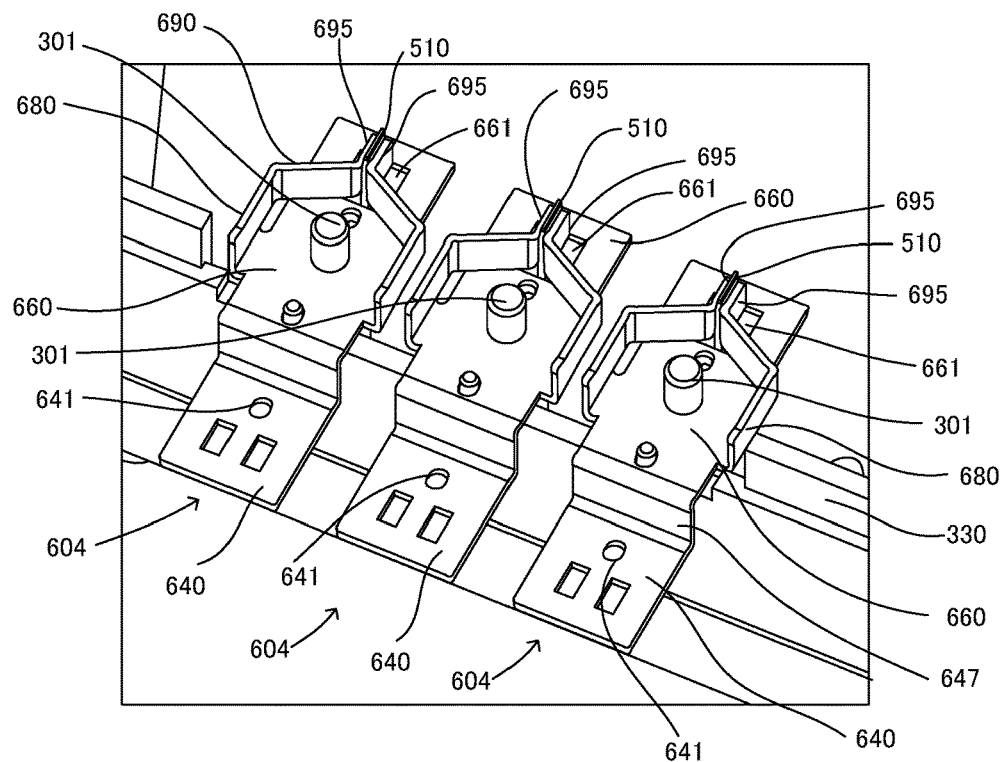
FIG. 24B is a perspective view showing the terminal connection component and the terminal connection structure from the terminal metal-fitting side of the motor.

In the third embodiment according to the present invention, the configuration that the holding sections 695 of the terminal metal-fitting 603 do not hold the plate surface of the inserting section 510 of the press-fit terminal 503 but hold the side surfaces to the width direction of the plate, is adopted. This can be called a side surface holding type. Meanwhile, as shown in FIGS. 24A and 24B, the fourth embodiment adopts the configuration that the holding sections 695 of the terminal metal-fitting 604 hold the plate surfaces of the inserting section 510 of the press-fit terminal 504 to the thickness direction. This can be called a plate surface holding type.

Thus, the basic configuration of the fourth embodiment is similar to that of the third embodiment. The configuration of the press-fit terminal 504 and the terminal metal-fitting 604 is different from that of the press-fit terminal 503 and the terminal metal-fitting 603.

Figure 25A:
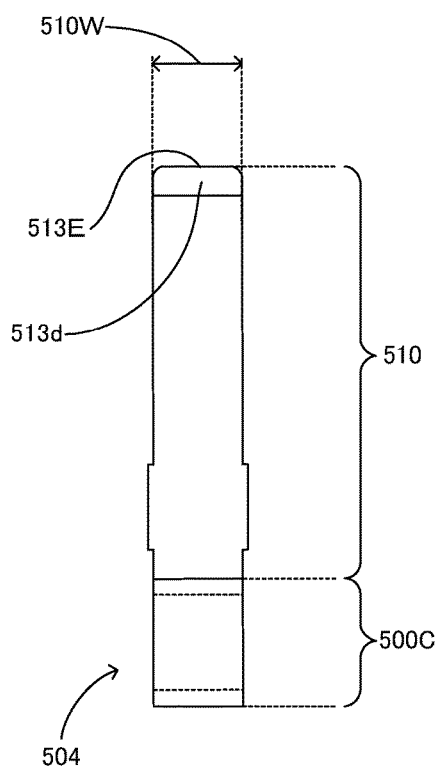
FIGS. 25A and 25B are diagrams showing an embodiment of the press-fit terminal stood from the substrate in the terminal connection component according to the fourth embodiment.
Figure 25B:
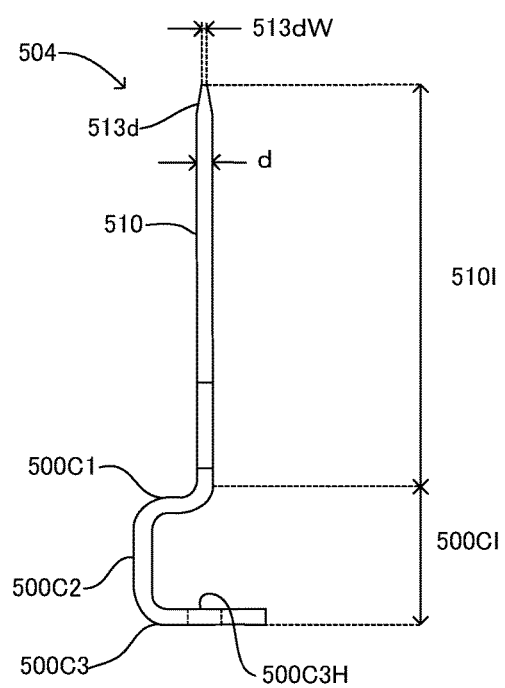
Figure 26A:
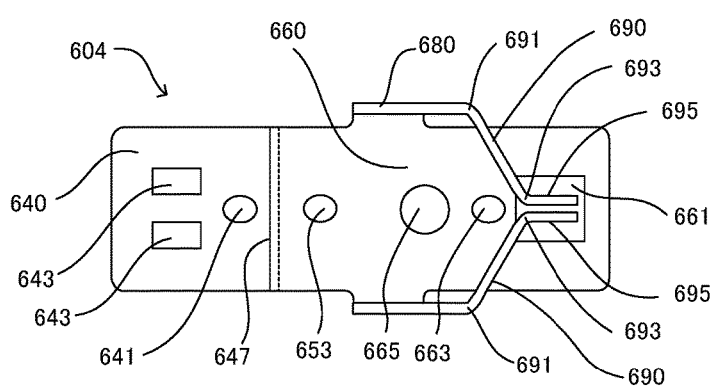
FIGS. 26A, 26B and 26C are diagrams showing an embodiment of the terminal metal-fitting of the motor according to the fourth embodiment.
Figure 26B:
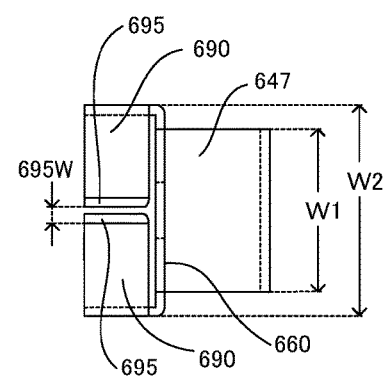
Figure 26C:
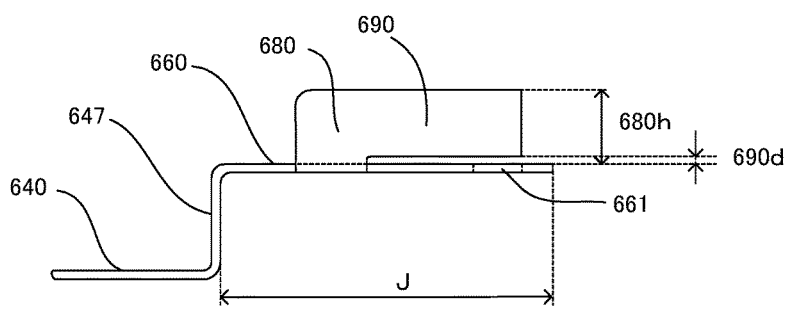

FIGS. 25A and 25B show a configuration example of the press-fit terminal 504 which is used in the fourth embodiment of the present invention. The configuration of the press-fit terminal 504 is basically the same as that of the press-fit terminal 503 of the third embodiment. The difference between the press-fit terminal 504 and the press-fit terminal 503 is described as follows. As shown in FIG. 25B, the taper section 513 is formed in the thickness direction of the plate surface of the inserting section 510. The above taper section is called the taper section 513*d* (although the taper is also provided in the width direction in FIG. 25A, this taper is not indispensable and whether the taper is provided is arbitrary.). FIGS. 26A, 26B and 26C show a configuration example of the terminal metal-fitting 604 which is used in the fourth embodiment of the present invention. The configuration of the terminal metal-fitting 604 is basically the same as that of the terminal metal-fitting 603 of the third embodiment. The difference between the terminal metal-fitting 604 and the terminal metal-fitting 603 is described as follows. As shown in FIGS. 26A, 26B and 27D, the space 695W formed between the holding sections 695 is slightly longer than the thickness 513*d*W of the one end of the plate surface in which the taper section 513*d* of the inserting section of the press-fit terminal 504 is disposed, and the space 695W is shorter than the thickness d of the plate surface.

Accordingly, with reference to FIGS. 27A, 27B, 27C and 27D, the terminal connection according to the fourth embodiment between the press-fit terminal 504 and the terminal metal-fitting 604 is performed in the following way.

Figures 27A, 27B, 27C:
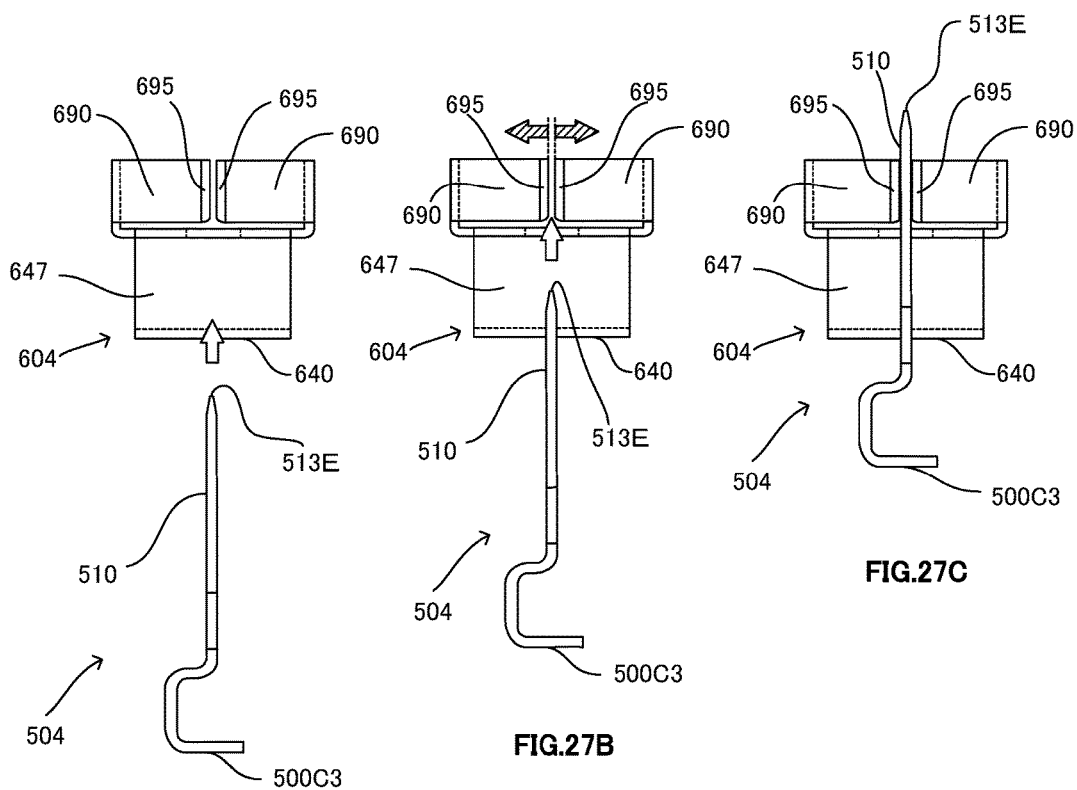
FIGS. 27A, 27B, 27C and 27D are diagrams viewed from a front direction of the terminal metal-fitting, showing the inserting section of the press-fit terminal is press-fitted to the holding section of the terminal metal-fitting.
Figure 27D:
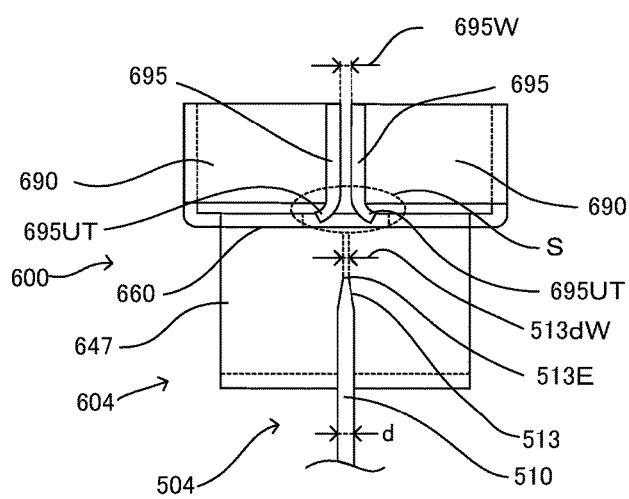

That is, as shown in FIG. 27A, when the terminal connection is performed, the press-fit terminal 504 is arranged at the below of the terminal metal-fitting 604 and is moved close to the terminal metal-fitting 604 shown by the white arrow, as well as FIG. 23A.

Next, as shown in the white arrow of FIG. 27B, the end portion 513E of the taper section at the tip of the inserting section 510 of the press-fit terminal 504 is press-fitted to the space between the holding sections 695 of the terminal metal-fitting 604. As shown in FIG. 27D, since the space 695W formed between the holding sections 695 of the terminal metal-fitting 604 is slightly longer than the thickness 513*d*W of the one end portion at which the taper section 513*d* of the inserting section 510 of the press-fit terminal 504 is disposed, the press-fitting is smoothly performed.

When the press-fitting is progressed in the white arrow direction as shown in FIG. 27B, since the space 695W formed between the holding sections 695 of the terminal metal-fitting 604 is shorter than the plate thickness "d" of the inserting section 510 of the press-fit terminal 504, the space 695W formed between the holding sections 695 is widened, as shown in the hatched line arrows of FIG. 27B, and the holding sections 695 receive the reaction force from the extending section 690 having the plate-spring function. As shown in FIG. 27C, in a case that the press-fit terminal 504 is press-fitted to the terminal metal-fitting 604 is completed, the stable terminal connection can be achieved.

As well, in a case of the fourth embodiment, since the widened width of the space formed between the holding sections 695 by which the press-fit terminal 504 is press-fitted to the terminal metal-fitting 604, is narrow, the reaction force from the holding sections 695 to the inserting section 510 of the press-fit terminal 504 is smaller than that of the side surface holding type shown in the third embodiment. However, it has an advantage that a surface contact between the press-fit terminal 504 and the terminal metal-fitting 604 is performed.

In the below of the holding section 695, that is, a side of the holding-side plate section 660 of the holding section 695, for example as shown by the chain-line ellipse S in FIG. 27D, the holding section lower taper sections UT which have a wide width in the outer side of the lower surface of the holding sections 695 (the side toward the through hole 661), and have a narrow width toward the toward the space 695 (the interval 695) between the holding sections 695, are disposed from the lower surfaces of the holding sections 695 to the holding-side plate section 660. Thereby, the press-fitting of the press-fit terminal 504 can more easily be performed. By disposing such the tapers T, the space 695W formed between the holding sections 695 is widened on the lower surfaces of the holding sections 695, and then the press-fitting of the press-fit terminal 503 can more easily be performed.

Figure 28A:
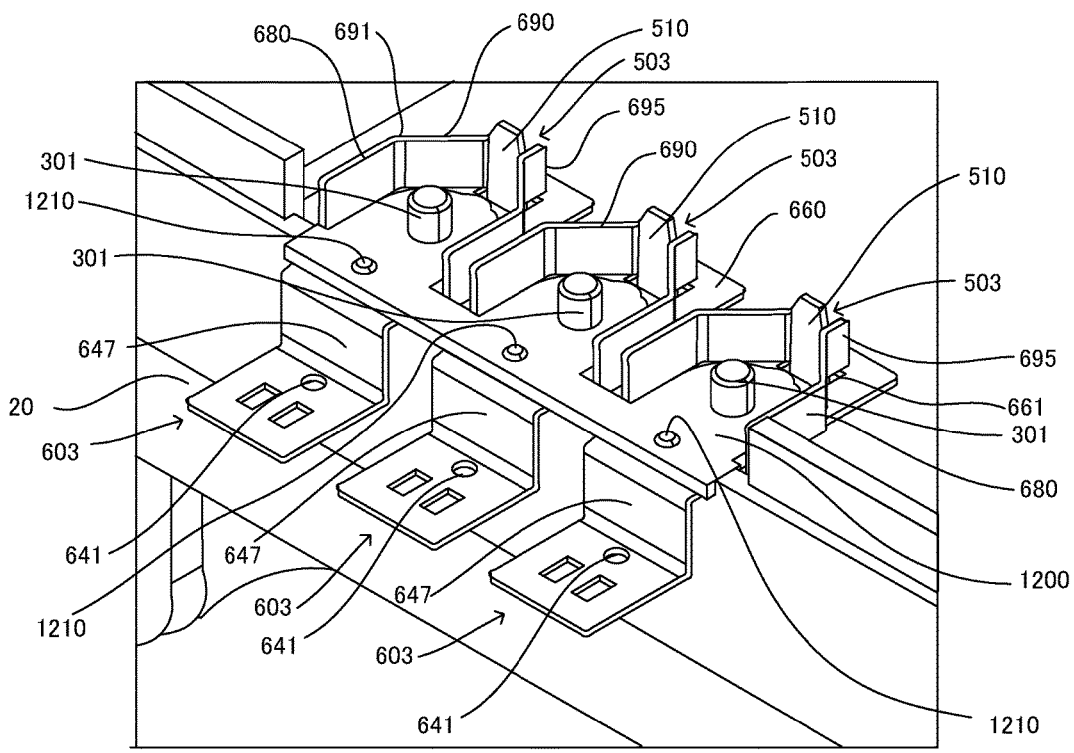
FIGS. 28A and 28B are perspective views showing a configuration of a fixing plate in the terminal connection structure according to the third and fourth embodiments.
Figure 28B:
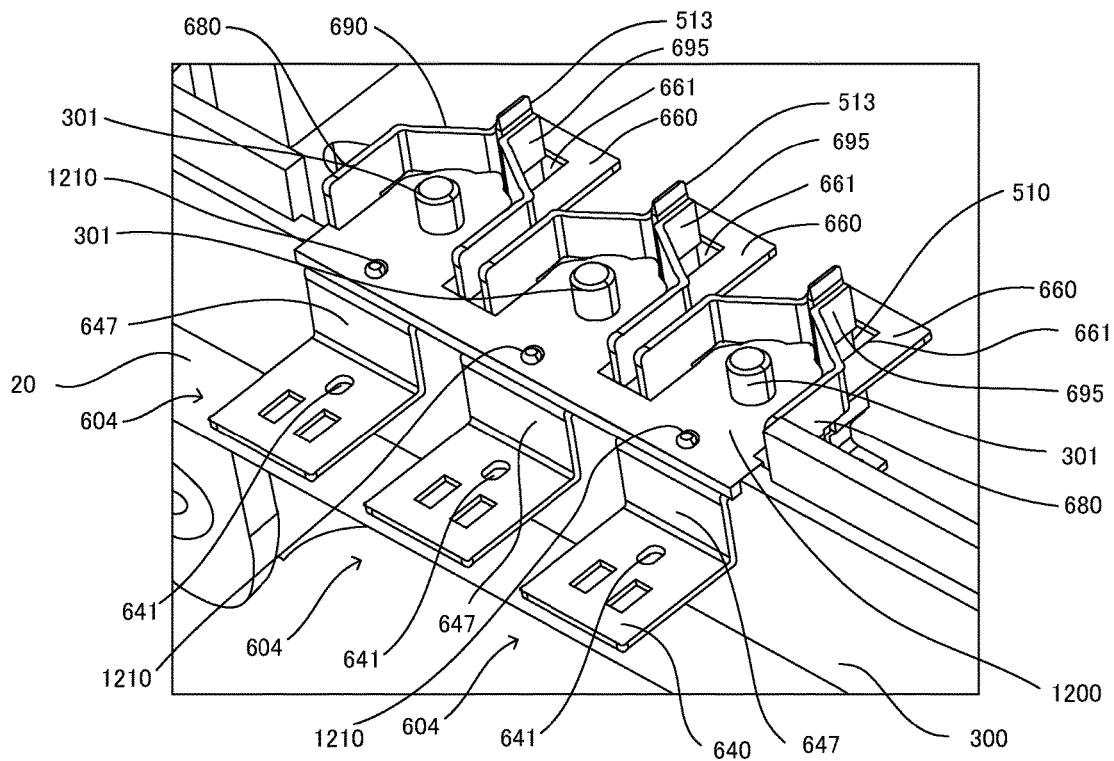

Next, in the terminal connection structure between the control unit and the motor according to the third and fourth embodiments of the present invention, as shown in FIGS. 28A and 28B, in the upper surface of the terminal metal-fitting 603 (or 604), that is, in the side that the standing sections 680 of the terminal metal-fitting 603 (or 604) are disposed, a fixing plate 1200 which covers from the step section 647 side of the holding-side plate section 660 of the terminal metal-fitting 603 (or 604) around the through hole 661 excluding the standing sections 680 and the extending sections 690, can be disposed.

Here, FIGS. 28A and 28B are perspective views showing a configuration of the fixing plate in the terminal connection structure according to the present invention, FIG. 28A is a perspective view showing the configuration of the fixing plate according to the third embodiment from the terminal metal-fitting 603 side of the motor 20, and FIG. 28B is a perspective view showing the configuration of the fixing plate according to the fourth embodiment from the terminal metal-fitting 604 side of the motor 20.

As shown in FIGS. 28A and 28B, the fixing plate 1200 is fixed to the upper surface of the holding-side plate section 660. As a fixing method of the fixing plate 1200, the screws 1210 are inserted into the holding-side plate section-side hole parts 653, and the fixing plate 1200 are fixed to the casing of the motor 20 or the like via the screws 1210.

With respect to the material of the fixing plate 1210, the material having the insulating characteristic and the heat dissipation is preferred. The material having an adequate strength to the mechanical vibration is also preferred. For example, the ABS resin, the high heat conductive resin having the insulating characteristic, the engineering plastic and the like are preferred.

In a case that such the fixing plate 1200 is disposed and the press-fit terminal 503 (or 504) is press-fitted to the terminal metal-fitting 603 (or 604) in the third and fourth embodiments of the present invention, the push-up force is exerted to the terminal metal-fitting 603 (or 604). The fixing plate 1200 and the above-described support jig (not shown) or only the fixing plate 1200 can prevent from deforming the terminal metal-fitting 603 (or 604) upwardly by the above force. Not limiting in a case of press-fitting the terminal, even after the press-fit terminal 503 (or 504) is press-fitted to the terminal metal-fitting 603 (or 604), the holding-side plate section 660 is fixedly held by the fixing plate 1200. Thereby, the vibration of the holding-side plate section 660 and the like are prevented, and the connection section between the press-fit terminal 503 (or 504) and the terminal metal-fitting 603 (or 604) can be more stably be held.

Figure 29:
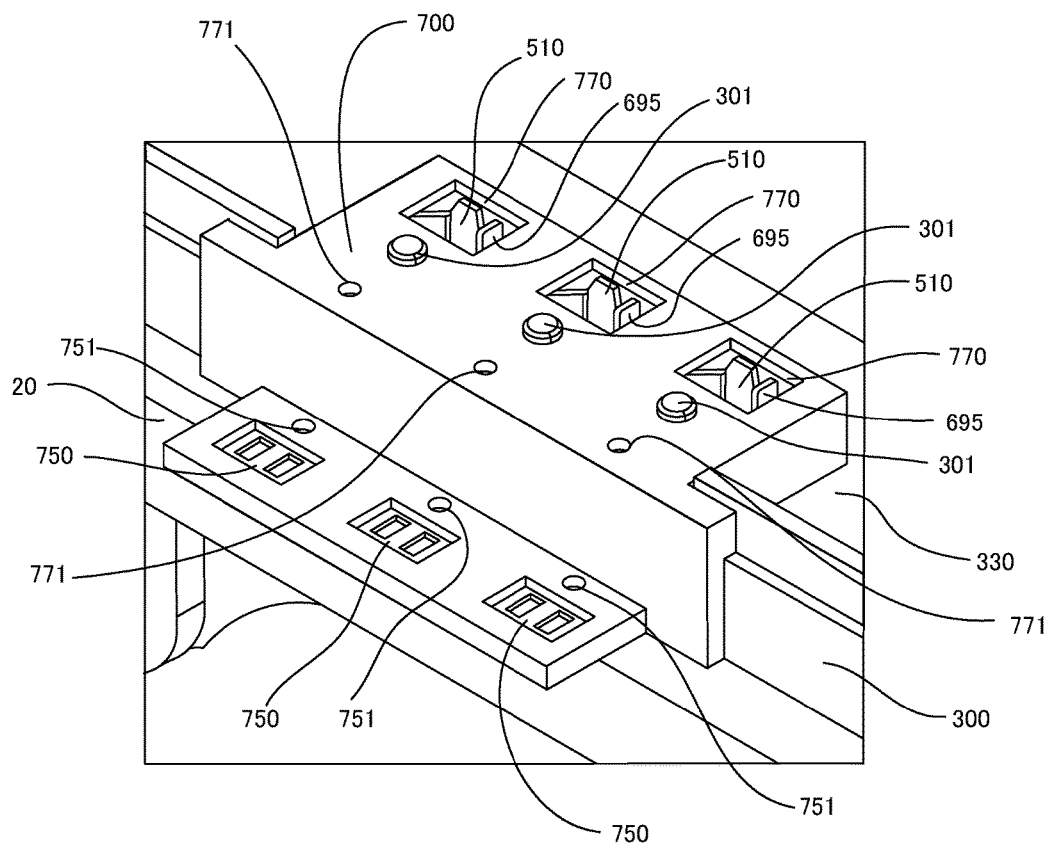
FIG. 29 is a perspective view showing a state that the cover which covers the press-fit terminals and the terminal metal-fittings according to the third and fourth embodiments covers the terminal connection structure depicted in FIG. 28A.

In the terminal connection structure between the control unit and the motor according to the third and fourth embodiments of the present invention, as shown in FIG. 29 and FIGS. 30A, 30B, 30C and 30D, the configuration that the cover 700N covers the press-fit terminal 503 (or 504) and the terminal metal-fitting 603 (or 604), which are connected with the above method, can be adopted. FIG. 29 is a perspective view showing an example that the cover 700N, which covers the press-fit terminal 503 and the terminal metal-fitting 603 connected by a method of the present invention, is disposed. FIG. 30A is a top view of the cover 700N, FIG. 30B is a side view of the cover 700N, FIG. 30C is a bottom view of the cover 700N, and FIG. 3 OD is an enlarged cross-sectional view, taken along line X-X in FIG. 30C.

The cover 700N according to the present invention is disposed in order to protect the press-fit terminal 503 (or 504), the terminal metal-fitting 603 (or 604) and the terminal connection structure. The basic configuration of the cover 700N is almost the same as those of the first and second embodiments. As described below, the portions of the insulating walls 790 become higher, corresponding to the height of the standing section 680 of the terminal metal-fitting 603 (or 604).

More concretely, as shown in FIG. 29 and FIGS. 30A, 30B, 30C and 30D, the cover 700N is formed from the upper surface of the fixing-side plate section (the motor-side connecting section) 640 in the motor 20 side of the terminal metal-fittings 603 (or 604), is bent upwardly so as to cover the surfaces of the terminal metal-fittings 603 (or 604) toward the holding-side plate section 660 side of the terminal metal-fittings 603 (or 604), is formed parallel to the upper surface side of the holding-side plate section 660 beyond the outer edge of the case 300 of the control unit 30 from the motor 20 side, and is configured to cover the end side of the holding-side plate section 660 of the terminal metal-fittings 603 (or 604) beyond the through hole 661.

In a case that the cover 700N covers the press-fit terminals 503 (or 504) and the terminal metal-fittings 603 (or 604) from above, the fixing-side plate section opening windows (the motor-side connecting section opening windows) 750 are formed at the corresponding upper surface portions where the fixing-side plate sections (the motor-side connecting sections) 640 are electrically connected to the motor 20, and the fixing section openings 770 are formed at the upper surface portions of the through holes 661 in the holding-side plate sections 660, that is, are formed at the upper portions where the press-fit terminals 503 (or 504) is held by the holding sections 695 (see, FIG. 30A). These opening windows (750 and 770) are formed by punching between the top surface (the upper surface) of the cover 700N and the bottom surface (the back surface) of the cover 700N. The shape of these opening windows (750 and 770) are formed as, for example, the quadrangular openings.

Thus, in a case of adopting such a configuration, by using these opening windows (750 and 770), the connection state between the terminal metal-fittings 603 (or 604) and the motor 20, and the connection state between the terminal metal-fitting 603 (or 604) and the press-fit terminal 503 (or 504) can be visually confirmed from the external even after the cover 700N is attached.

As shown in FIGS. 30C and 30D, the insulating walls 790 are disposed on the bottom surface side (the back surface side) of the cover 700N.

The insulating walls 790 insulate between the terminal metal-fittings 603 (or 604) and between the terminal metal-fitting 603 (or 604) and the external environment, prevent from the positional shift and the like of the terminal metal-fitting 603 (or 604) due to the vibration, and stand from the back surface of the cover 700N so as to surround the circumference of the terminal metal-fittings 603 (or 604).

Consequently, considering the height of the standing section 680, in a case that the cover 700N is covered from above of the terminal metal-fittings 603 (or 604), the height "t" of the insulating walls 790 is formed so as to extend to the below in the position of the plates of the terminal metal-fittings 603 (or 604). Even in a case that the terminal metal-fittings 603 (or 604) is slightly vibrated in the upward and downward directions, the cover 700N is formed so that the plate surfaces of the holding-side plate sections 660 are not protruded from the beneath of the side surface of the insulating walls 790.

The fixing method of the cover 700N is not especially limited. The appropriate fitting structure may be disposed between the cover 700N and the press-fit terminal 503 (or 504) or between the cover 700N and the terminal metal-fitting 603 (or 604). Or the structure that the case 300 is fixed by providing a control unit-side engaging section 301 in apart of the case 300 of the control unit 30, providing a cover-side engaging section 701 in the cover 700N, which is fitted to the control unit-side engaging section 301, providing the engagement holes (holes for engagement section) 665 and 663 in the terminal metal-fittings 603 (or 604), and fitting and engaging the cover-side engaging section 701 to the control unit-side engaging section 301 in an one-touch operation can be adopted, as shown in FIG. 29.

Further, in a case that the cover 700N is used, the fixing-side plate section hole parts (the motor-side connecting section-side hole parts) 641 on the fixing-side plate sections (the motor-side connecting sections) 640 of the terminal metal-fittings 603 (or 604) or/and the plural holding-side plate section-side hole parts 653 adjacent to the through holes 661 of the holding-side plate sections 660 of the terminal metal-fittings 603 (or 604), are disposed. Cover-side hole parts 751 and 771 are respectively disposed so as to be communicated with these hole parts (641 and 653). The cover 700N can be fixed to the motor 20 and the casing of the control unit 30, or can prevent the positional shift of the terminal metal fittings 603 (or 604) by using the screws via the above hole parts.

That is, the cover 700N covers the terminal metal-fittings 603 (or 604) from above at the predetermined position. Thereby, the fixing-side plate section hole parts (the motor-side connecting section-side hole parts) 641 are communicated with the cover-side hole parts 751 of the cover 700N, and the holding-side plate section-side hole parts 653 of the terminal metal-fittings 603 (or 604) are communicated with the cover-side hole parts 771 of the cover 700. The screws are inserted into the cover-side hole parts 751 and the fixing-side plate section hole parts (the motor-side connecting section-side hole parts) 641 from above of the cover 700N, and can be connected to the screw holes (not shown) or the like of the motor 20 side. Similarly, the screws are inserted into the cover-side hole parts 771 and the holding-side plate section-side hole parts 653, and can be connected to the screw holes (not shown) or the like, which are stood from the control unit 30 side.

Fixing the terminal metal-fittings 603 (or 604) via the cover 700N by using the screws can fix the cover 700N and can effectively prevent the positional shift of the terminal metal-fittings 603 (or 604), the press-fit terminals 503 (or 504) and the like due to the thermal variation and the positional shift to the horizontal direction or to the vertical direction of the terminal metal-fittings 603 (or 604), the press-fit terminals 503 (or 504) and the like due to the vibration of the vehicle.

Figure 31A:
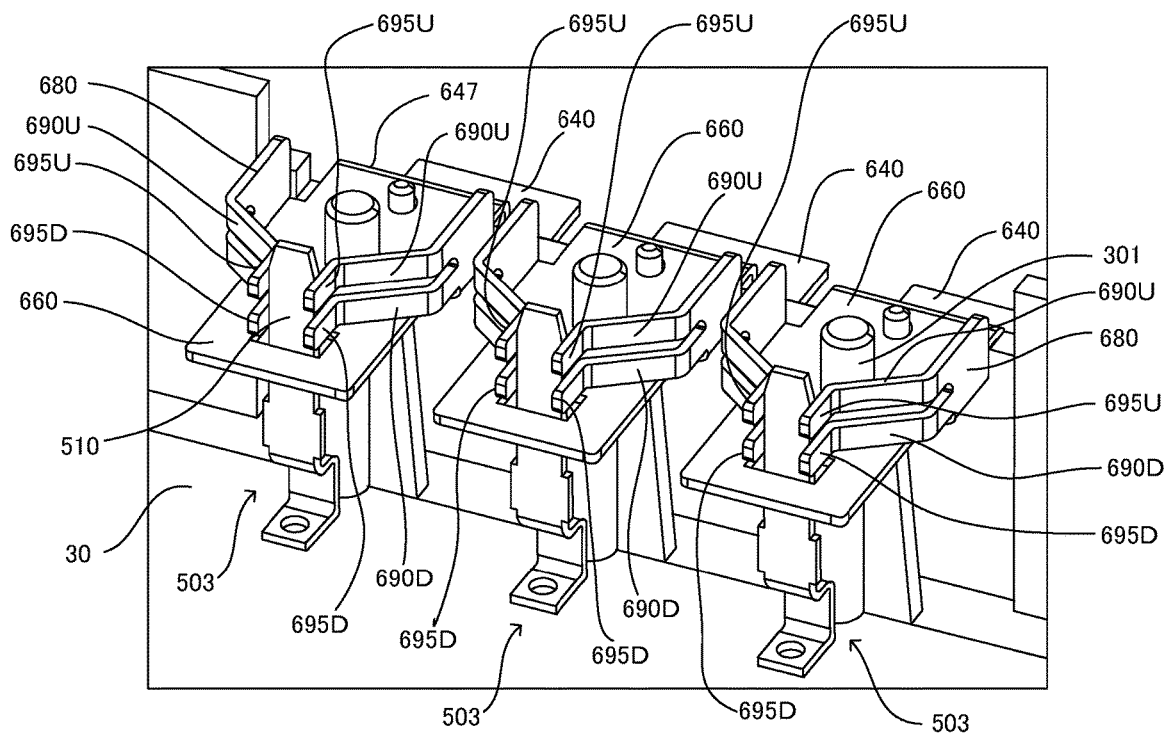
FIG. 31A is a perspective view showing an example that an extending section is formed in two stages, in the configuration example of FIGS. 20A and 20B.
Figure 31B:
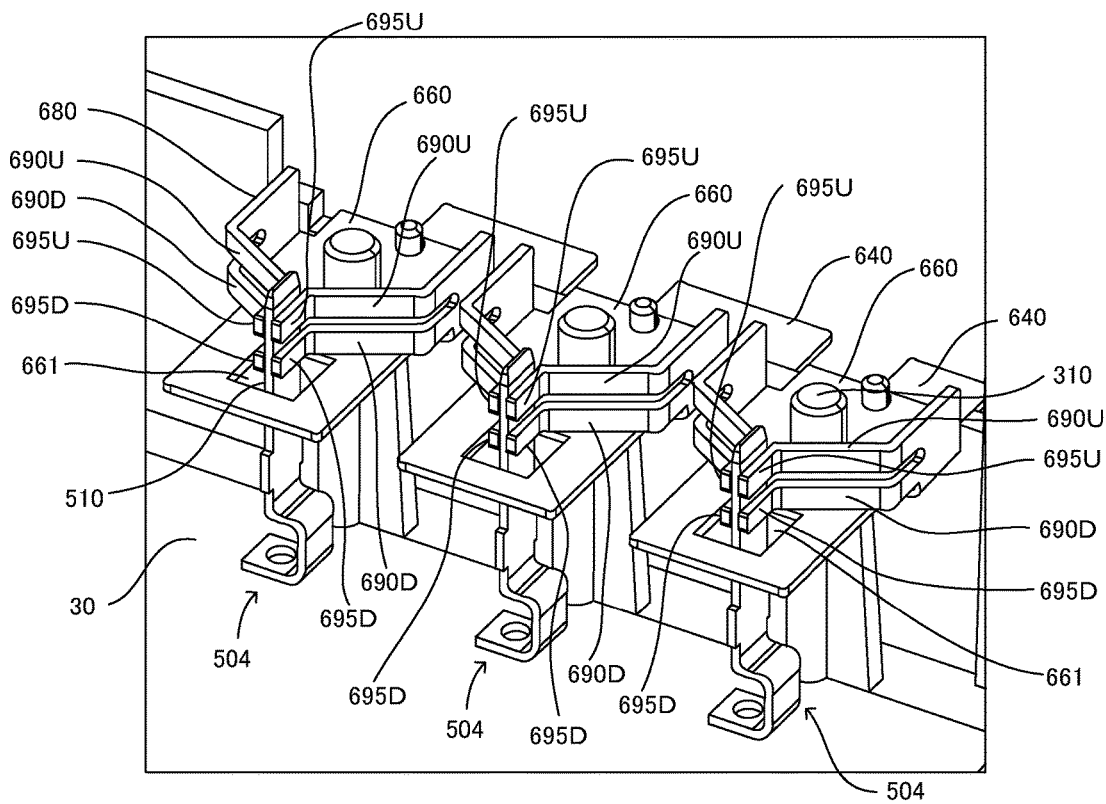
FIG. 31B is a perspective view showing an example that an extending section is formed in two stages, in the configuration example of FIGS. 24A and 24B.

In the terminal connection component and the terminal connection structure according to the third and fourth embodiments of the present invention, further different structures can be adopted, as shown in FIGS. 31A and 31B.

Here, FIG. 31A is a perspective view showing an example that the extending section is formed in the two stages, in a case that the side surface holding type connection terminals as shown in the configuration example of FIGS. 20A and 20B, and the connection structure using the same are adopted. FIG. 31B is a perspective view showing an example that the extending section is formed in the two stages, in a case that the plate surface holding type connection terminals as shown in the configuration example of FIGS. 24A and 24B, and the connection structure using the same are adopted.

In the present invention, as shown in FIGS. 31A and 31B, the extending sections 690 extended from the standing sections 680 by which the terminal metal-fitting 603 (or 604) is constituted can comprise upper-side extending sections 690U and lower-side extending sections 690D with an appropriate space along the direction that the standing sections 680 stand from the holding-side plate section 660, that is, along the direction parallel to the holding-side plate section 660. The extending sections 690 can divide into three or more sub-sections.

Figure 32A:
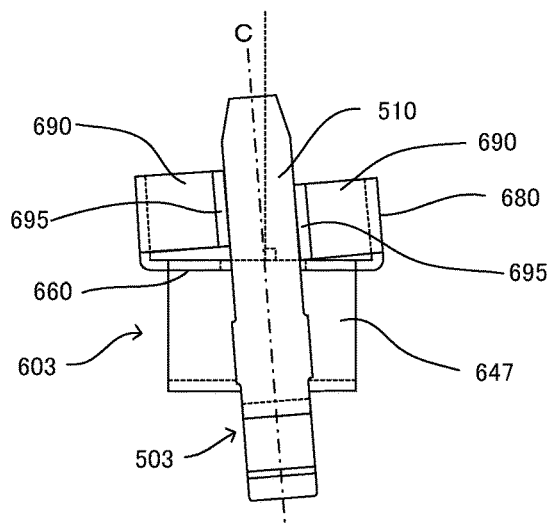
FIGS. 32A, 32B and 32C are front views showing a contact state between the press-fit terminal and the terminal metal-fitting in the third embodiment as an example.
Figure 32B:
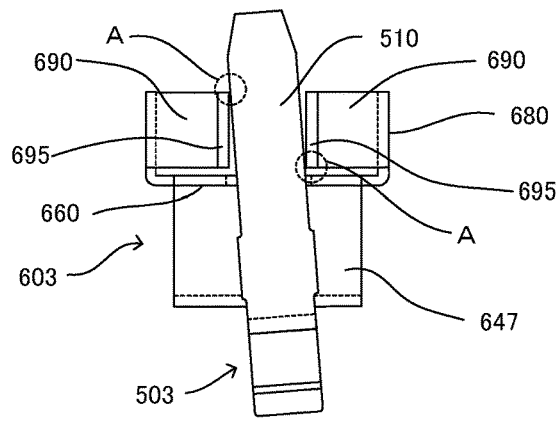
Figure 32C:
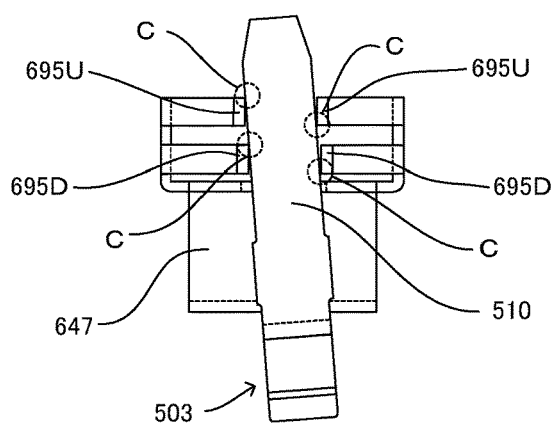

By adopting such a configuration, since the holding sections 695 comprise upper-side holding sections 695U and lower-side holding sections 695D, as shown in FIG. 32C, when the press-fit terminal 503 is inserted into the terminal metal fitting 603, the twist of the press-fit terminal 503 can be handled to some extent.

That is, as shown in FIG. 32A, in a case that the press-fit terminal 503 is inserted into the space between the holding section 695 from the below of the terminal metal-fitting 603, the center line "C" of the longitudinal direction of the press-fit terminal 503 is not perpendicular to the holding-side plate section, and the length "J" of the longitudinal direction of the holding-side plate section 660 is adequately long, the plate surface of the holding section 695 is twisted along the direction that the press-fit terminal 503 is twisted, and the holding sections 695 can hold the press-fit terminal 503 along the side surface of the press-fit terminal 503 (or along the plate surface of the press-fit terminal 504 in a case of the plate surface holding type).

However, in a case that the press-fit terminal 503 is inserted into the terminal metal-fitting 603 with the angle that the above twist cannot be handled, the holding sections 695 can hold the side surface of the press-fit terminal 503 only at the regions which is surrounded by the chain-line circles "A" shown in the depth direction of FIG. 32B.

Then, in a case that the above connection state is assumed, for example, as shown in the chain-line circles "C" of FIG. 32C, the plate surfaces of the holding sections 695 are suitably twisted by forming the extending sections 690 in the two stages. Thereby, the contact regions between the holding sections 695 and the press-fit terminal 503 can increase. In the above case, since the widths of the holding sections 695 toward the vertical direction from the holding-side plate section 660 become smaller, the twist is further progressed and the contact regions between the holding sections 695 of the terminal metal-fitting 603 (or 604) and the press-fit terminal 503 (or 504) can increase.

As well, even in a case that the press-fit terminal 503 (or 504) is obliquely inserted into the space between the holding sections 695 from the beneath of the terminal metal-fitting 603 (or 604), in the extending sections 690 of the terminal metal-fitting 603 (or 604), the shock absorbing sections 900, which are bent in an S-shape as shown in FIG. 33A or are bent in an M-shape as shown in FIG. 34A, are disposed in the extending directions of the extending sections 690 as a configuration in which the contact regions between the holding sections 695 of the terminal metal-fitting 603 (or 604) and the press-fit terminal 503 (or 504) increase.

For example, such the shock absorbing sections 900 are disposed in the first bent section 691 side between the first bent sections 691 of the extending section 690 and the second bent sections 693 of the extending section 690. In a case of seeing from above, the shock absorbing sections 900 is a meandering portion whose shape is the S-shape (three folding points are existed between the first bent section 691 and the second bent section 693) to the longitudinal direction of the holding section 695, or is the M-shape (four folding points are existed between the first bent section 691 and the second bent section 693) to the longitudinal direction of the holding section 695.

Figure 35:
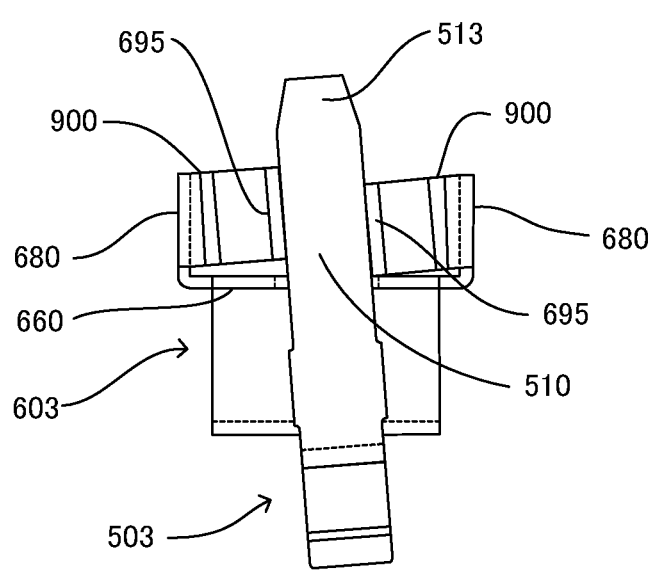
FIG. 35 is a front view showing a contact example between the press-fit terminal and the terminal metal-fitting in a case that the shock absorbing section is disposed at the extending section of the terminal metal-fitting.

In a case that such the shock absorbing sections 900 are disposed, for example, as shown in FIG. 35, even when the press-fit terminal 503 is obliquely press-fitted to the space between the holding sections 695 from the beneath of the terminal metal-fitting 603, since the length "J" of the holding-side plate section 660 is short, the twistable amount of the extending section 690 is small and expansion and contraction are occurred in both end portions of the shock absorbing section 900 (the distal side and the proximal side from the holding-side plate section 660). Thereby, the holding sections 695 of the terminal metal-fitting 603 can be abutted to the inserting section of the press-fit terminal 503.

In the above third and fourth embodiments, the holding sections 695 of the terminal metal-fitting 603 (or 604) hold the plate shape press-fit terminal 503 (or 504). Instead of such the plate shape press-fit terminal 503 (or 504), for example as shown in FIGS. 36A and 37A, the press-fit terminal 505 whose tip is a round bar shape can be used.

Figure 36A:
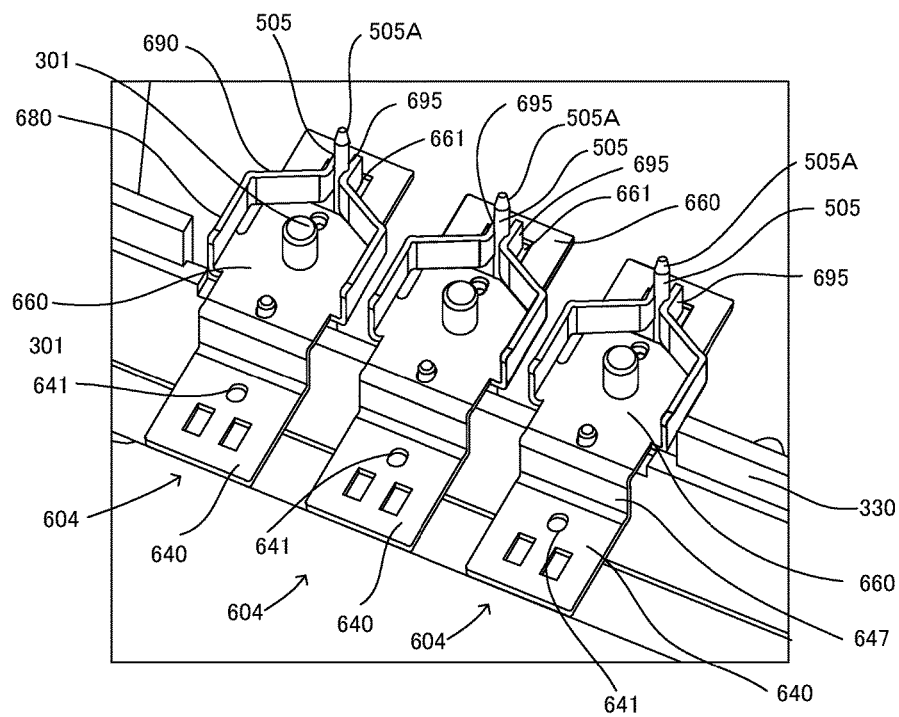
FIGS. 36A and 36B are perspective views in a case that round bars are used in the press-fit terminals.
Figure 36B:
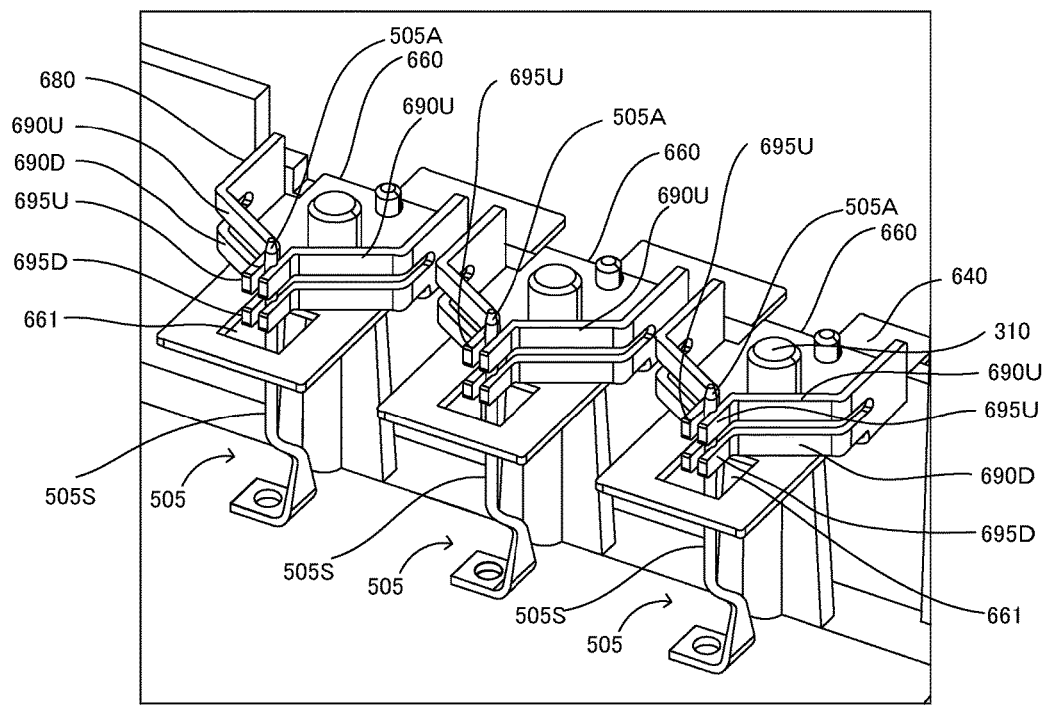

Here, FIGS. 36A and 36B are perspective views in a case that the press-fit terminals whose tips are the round bar shape are used. FIG. 36A is similar to FIG. 24B, and is a perspective view showing an example that the press-fit terminals 505 whose tip is a round bar shape are used, viewed from the terminal metal-fitting side of the motor. FIG. 36B is a similar example of FIG. 31B that the extending sections are formed in two stages, and is a perspective view showing an example that the press-fit terminals 505 whose tip is a round bar shape are used.

In the third and fourth embodiments of the present invention, the terminal connection component and the terminal connection structure in which the terminal connection is performed by holding the press-fit terminals using the holding sections 695 are adopted. Therefore, if the press-fit terminal can be held, the press-fit terminals whose tips are the round bar shape can be used in order to achieve the above connection object.

If the tip is the round bar shape, the round bar is formed by performing the method that the end portion of the motor wiring can be connected to the round bar, and can be connected to the terminal metal-fitting.

If the press-fit terminals whose tips are the round bar shape are used, the embodiment of the press-fit terminals is not especially limited. For example, as shown in the perspective view of FIG. 37A, the press-fit terminal 505 whose tip is the round bar shape can be adopted.

FIG. 37A exemplifies the press-fit terminal 505 whose tip is the round bar shape. The press-fit terminal 505 generally has the round bar shape. The taper section 505A is disposed at the one end of the round bar, and the substrate connecting section 500C is formed at the bottom of the round bar.

When the press-fit terminal 505 whose tip is the round bar shape is press-fitted to the space between the holding sections 695 of the terminal metal-fitting shown in the third and fourth embodiments, the press-fitting is performed from the tip of the round bar. In this case, the space between the holding sections 695 is formed larger than the diameter of the tip of the taper section 505A in the press-fit terminal 505, and is formed smaller than the maximum diameter of the axis section 505S of the round bar, which is corresponding to the elongating section.

Figure 37B:
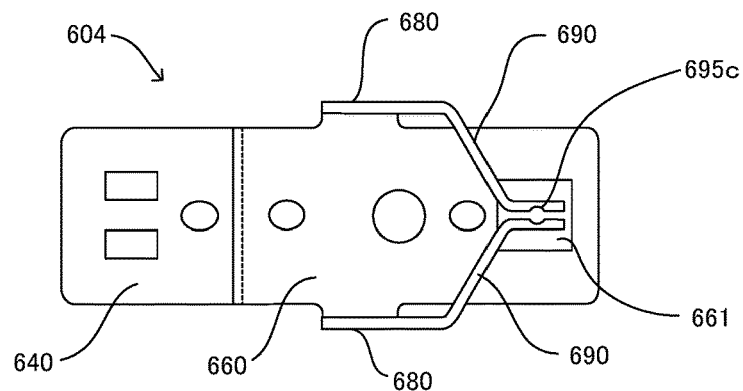
Figure 37C:
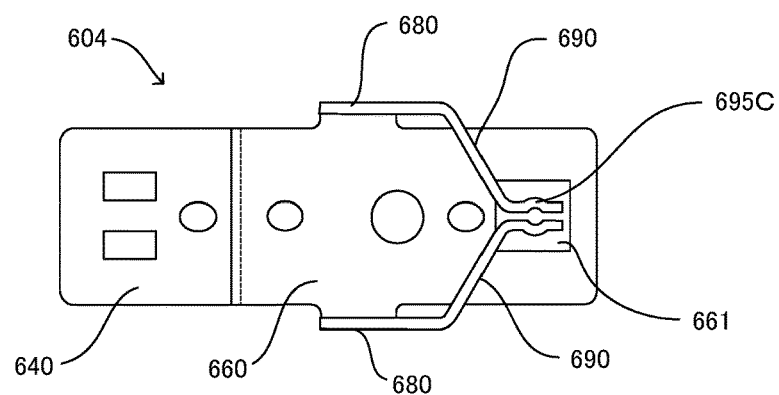

In a case that the press-fit terminal 505 having the round bar embodiment is press-fitted to the space between the holding sections 695, in order to increase the contact area between the terminal metal-fitting and the round bar, as shown in FIGS. 37B and 37C, the recesses 695c, which are conjunction with the diameter of the press-fitted round bar, can be formed (in a case of FIG. 37B), and the structure 695C in which a part of or all of the holding sections 695 are bent recessively can be adopted (in a case of FIG. 37C). In some situations, the connection portion can be welded by the gas tungsten arc welding (the TIG welding) or the like.

By using the terminal connection component according to the present invention and the terminal connection structure between the control unit using the same and the motor, the terminal connection component that can handle a situation that the slight error when the press-fit terminals and the like are assembled with the substrate is occurred and the slight variation in dimension of the press-fit terminals and the like is occurred, and can handle the large current, can be obtained. By using such the terminal connection component and the terminal connection structure between the control unit using the same and the motor, the durability and the reliability in the electrical connecting section of the unit in which the terminal connection component is used, and the electrical connecting section between the control unit and the motor, can be improved. Further, the convenience of the assembling operation or the removing operation of the unit comprising the control unit, the motor and the like can be improved. The structure in which the number of the components is reduced and the environment impact is considered can be obtained. Further miniaturization of the unit comprising the control unit and the motor can be realized.

In a case that such the terminal connection component and the terminal connection structure between the control unit using the same and the motor are used in the electric power steering apparatus, the manufacturing cost can be reduced and the miniaturization of the unit can be realized. Thus, the electric power steering apparatus that improves the durability and has the high reliability can be obtained.

The respective embodiments of the present invention exemplify the configuration of the present invention. The present invention is not limited to the above embodiments. Various modification examples can be used within the scope of the gist of the present invention.

For example, if the substrate connecting section of the press-fit terminal has elasticity, the substrate connecting section may be formed in a spring. The embodiment of the through hole formed in the holding-side plate section of the terminal metal-fitting may be a similar shape of the cross-section of the press-fit terminal and be slightly smaller than the region of the cross-section of the press-fit terminal.

EXPLANATION OF REFERENCE NUMERALS 1 handle (steering wheel)
2 column shaft (steering shaft, handle shaft)
3 reduction mechanism
4a, 4b universal joint
5 rack-and-pinion mechanism
6a, 6b tie rod
7a, 7b hub unit
8L, 8R steered wheel
10 torque sensor
11 ignition key
12 vehicle speed sensor
13 battery
14 steering angle sensor
20 motor
30 control unit (ECU)
300 case of control unit (casing of control unit)
301 control unit-side engaging section
330 substrate
500, 502, 503, 504, 505, 507, 508 press-fit terminal
502T1, 507T1, 507T1', 508T1, 508T1' first fitting-in section
502T2, 507T2, 507T2', 508T2, 508T2' second fitting-in section
500A tip portion
500B extending section
500C substrate connecting section
500C1 forward bent section
500C2 downward section
500C3 substrate contacting section
500C3H screw hole
500C4 jumping-up section
502D branch section
505S axis section of round bar
510 inserting section
505A, 513 taper section
513d taper section (thickness direction)
513dW thickness of end portion of taper section (thickness direction)
513E end portion of taper section
513EW width of end portion of taper section
600, 602, 603, 604 terminal metal-fitting 665, 663 engagement hole (hole for engagement section)
610 first hole part
611, 611' first hole part
620 second hole part
621, 621' second hole part
630 bridge section
640 fixing-side plate section (motor-side connecting section)
641 fixing-side plate section hole part (motor-side connecting section-side hole part)
643 opening
647 step section
660 holding-side plate section
661 through hole
653 holding-side plate section-side hole part
670 elongating section
680 standing section
671 elongating section-side hole part
690 extending section
690U upper-side extending section
690D lower-side extending section
691 first bent section
693 second bent section
695, 696 holding section
695C, 695c holding-section recess (recess structure)
695W space (gap) formed between holding sections
695UT holding section lower-taper section
700, 700N cover
701 cover-side engaging section
750 fixing-side plate section (motor-side connecting section) opening window
751 cover-side hole part
770 fixing section opening window
771 cover-side hole part
790 insulating wall
900 shock absorbing section
1000 support body
1000T support plane
1200 fixing plate
1210 fixing-plate fixing screw
Z elastic deforming section
dz width of elastic deforming section
d, D1 thickness of press-fit terminal
D2 thickness of end portion of terminal
WP lateral width of press-fit terminal
h distance from end portion of terminal to region where thickness begins to decrease
R curvature radius of round section
H1 width of short side of first hole part
W lengths of long sides of first hole part and second hole part
H2 width of short side of second hole part
ΔH width that short side of second hole part is shifted
S2 length of central portion that second hole part is shifted
P region of central portion where second hole part is shifted
S3 length of region of central portion where shift of second hole part begins
j length of elongating section
J length of holding-side plate section
t height of insulating wall
A1 first contact regions
A2 second contact regions
W1 space between outer side-surface of first fitting-in section in straight portion and that of second fitting-in section in straight portion
W1E width of lower portion "1E" of first taper section "l1"
W2E width of lower portion "2E" of second taper section "l2"
W4 space between inner side-surface of first fitting-in section in straight portion and that of second fitting-in section in straight portion
WT widths of tips T of first fitting-in section and second fitting-in section
WTC space between center line of first fitting-in section and that of second fitting-in section
Wl1ma maximum space between outer side-surfaces at bottom portion of first taper section
Wl1mi minimum space between inner side-surfaces at bottom portion of first taper section
WTma maximum space between outer side-surface of first fitting-in section at tip and that of second fitting-in section at tip
WTmi minimum space between inner side-surface of first fitting-in section at tip and that of second fitting-in section at tip
Hw widths of short sides of first hole part and second hole part
HW farthest space of long side between first hole part and second hole part
HL lengths of long sides of first hole part and second hole part
Hm space between center line of first hole part of terminal metal-fitting and that of second hole part of terminal metal-fitting
HWA lateral width of terminal metal-fitting
Mw width of bridge section
l1 first taper section (and length of first taper section in vertical direction)
l2 second taper section (and length of second taper section in vertical direction)
k length of fixing-side plate section (motor-side connecting section)
PTh length from tip T of press-fit terminal to substrate contact section

The invention claimed is:
1. A terminal connection component, comprising:
press-fit terminals; and
terminal metal-fittings,
wherein said press-fit terminals have a plate shape in which a taper is disposed at one tip, and said terminal metal-fittings have a plate shape and have a fitting section at one end,
wherein said fitting sections of said terminal metal-fittings have a first hole part and a second hole part from said one end in parallel,
wherein said first hole part is a rectangular shape,
wherein said second hole part is a rectangular shape, and a central portion of one long side near said first hole part is shifted to an interior of said second hole part so that a length of a central portion of said second hole part is slightly shorter than a thickness of said press-fit terminals, and
wherein said tips of said press-fit terminals are press-fitted to and are connected to said fitting sections of said terminal metal-fittings, and a portion between said first hole part and said second hole part of said fitting section, which serves as an elastic deformation section, is elastically deformed in a thickness direction of said press-fit terminals and biases said press-fit terminal so that said press-fit terminals are surely press-fitted to said fitting sections of said terminal metal-fittings.

2. The terminal connection component according to claim 1,
wherein said taper, which is disposed at one tip of said press-fit terminal, has round sections having a curvature at both corner portions in said end portion of said plate, and has a portion that a thickness of side surface portions of said plate decreases toward said end portion.

3. A terminal connection structure between a control unit using said terminal connection component according to claim 1 and a motor,
wherein said control unit comprises a substrate on which at least a control circuit is mounted, and said press-fit terminals stood from said substrate,
wherein said terminal metal-fittings are disposed on said motor, and said motor is connected to one end of said terminal metal-fittings, and
wherein a connection between said control unit and said motor is performed by press-fitting said tips of said press-fit terminals to said fitting-in sections of said terminal metal-fittings.

4. A terminal connection component, comprising:
press-fit terminals, and
terminal metal-fittings,
wherein said press-fit terminals have a first fitting-in section and a second fitting-in section, a tip of said first fitting-in section and a tip of said second fitting-in section are branched from a branch section, said first fitting-in section and said second fitting-in section from said tip to said branch section comprise a guide section and a straight portion, said guide section comprises a first taper section and a second taper section, and a taper ratio of said first taper section is smaller than that of said second taper section,
wherein said terminal metal-fittings have a plate shape, and comprise a fitting section to which said first fitting-in section and said second fitting-in section of said press-fit terminal are press-fitted, at one end,
wherein said fitting section comprises first and second rectangular hole parts which are in parallel disposed in a width direction of said terminal metal-fitting at one end of said terminal metal-fitting, and a bridge section formed between said first and second hole parts, and said first and second hole parts have a short side in a width direction of said terminal metal-fitting and have a long side in a longitudinal direction of said terminal metal-fitting,
wherein a length of said short side of said first and second hole parts is longer than respective widths of said tips of said first and second fitting-in sections in said press-fit terminal, and is shorter than respective widths in said straight portion side of said first and second fitting-in sections,
wherein a length of said long side of said first and second hole parts is longer than respective thicknesses of said first and second fitting-in sections in said press-fit terminal,
wherein a width of said bridge section of said terminal metal-fitting is longer than a space between an inner surface of said first fitting-in section of said press-fit terminal and an inner surface of said second fitting-in section of said press-fit terminal,
wherein a farthest space of said long side between said first hole part and said second hole part is formed shorter than a space between an outer surface in said straight portion of said first fitting-in section of said press-fit terminal and an outer surface in said straight portion of said second fitting-in section of said press-fit terminal,
wherein a connection between said press-fit terminal and said terminal metal-fitting is performed by inserting said tips of said first and second fitting-in sections of said press-fit terminal into said first and second hole parts of said fitting-in section of said terminal metal-fitting, and press-fitting said tips of said first and second fitting-in sections of said press-fit terminal to said first and second hole parts of said fitting-in section of said terminal metal-fitting, and
wherein said press-fitting is achieved by disposing said width direction of said press-fit terminal parallel to said width direction of said terminal metal-fitting at a substantially central portion of said first and second rectangular hole parts of said fitting section, and by pressing said press-fit terminal to said terminal metal-fitting at two portions in first contact regions of both side surfaces of said bridge section and two portions in second contact regions where an inner side-surface of said long side of said first hole part is farthest to that of said second hole part.

5. The terminal connection component according to claim 4,
wherein a reference dimension in a width of said bridge section of said terminal metal-fitting is the same as that of a space between an inner surface in said straight portion of said first fitting-in section of said press-fit terminal and an inner surface in said straight portion of said second fitting-in section of said press-fit terminal,
wherein a reference dimension in a farthest space of said long side between said first hole part of said terminal metal-fitting and said second hole part of said terminal metal-fitting is the same as that of a space between an outer surface in said straight portion of said first fitting-in section of said press-fit terminal and an outer surface in said straight portion of said second fitting-in section of said press-fit terminal,
wherein said width of said bridge section of said terminal metal-fitting is manufactured with a positive tolerance to said reference dimension, and said space between said inner surface in said straight portion of said first fitting-in section of said press-fit terminal and said inner surface in said straight portion of said second fitting-in section of said press-fit terminal is manufactured with a negative tolerance to said reference dimension, and
wherein said space where said long side of said first hole part of said terminal metal fitting is farthest to that of said second hole part of said terminal metal fitting is manufactured with a negative tolerance to said reference dimension and said space between said outer side-surface in said straight portion of said first fitting-in section of said press-fit terminal and said outer side-surface in said straight portion of said second fitting-in section of said press-fit terminal is manufactured with a positive tolerance.

6. The terminal connection component according to claim 4,
wherein plural combinations of said first and second fitting-in sections of said press-fit terminal are formed in parallel at tips of said press-fit terminal, and plural combinations of said first and second hole parts are formed in said longitudinal direction of said terminal metal-fitting, corresponding to said plural combinations of said first and second fitting-in sections of said press-fit terminal.

7. The terminal connection component according to claim 4,
wherein said press-fit terminal comprises an extending section to extend from said branch section to a downward side, and a substrate connecting section to be disposed below said extending section and connect to said substrate, and
wherein said substrate connecting section comprises a forward bent section to be disposed below said extending section and be bent forwardly, a downward section to be bent from one end of said forward bent section to downward, and a substrate contacting section to be bent from said downward section backwardly, be perpendicular to said extending section, and be mounted on said substrate.

8. A terminal connection method between a control unit and a motor to make a terminal connection structure between a control unit using said terminal connection component according to claim 7 and a motor, comprising of:
abutting and supporting a lower surface of said forward bent section of said press-fit terminal stood from an upper surface of said substrate of said control unit to a support surface of a support body from a bottom,
inserting and press-fitting said tips of said first and second fitting-in sections of said press-fit terminal to said first and second hole parts of said fitting-in section of said terminal metal-fitting,
pressing a portion between said first and second fitting-in sections in a widening direction in first contact regions of both side surfaces of said bridge section of said terminal metal-fitting by said press-fitting, and
pressing outer surfaces of said first and second fitting-in sections in an inward direction at second contact regions where an inner side-surface of said long side of said first hole part is farthest to that of said second hole part by a progress of said press-fitting,
wherein said press-fitting is completed in a stage that said straight portions of said first and second fitting-in sections of said press-fit terminal arrive at said first and second hole parts of said terminal metal-fitting.

9. A terminal connection structure between a control unit using said terminal connection component according to claim 4 and a motor,
wherein said control unit comprises a substrate on which at least a control circuit is mounted, and said press-fit terminals stood from said substrate,
wherein said terminal metal-fittings are disposed on said motor, and said motor is connected to one end of said terminal metal-fittings,
wherein a connection between said control unit and said motor is performed by inserting said tips of said first and second fitting-in sections of said press-fit terminal into said first and second hole parts of said fitting-in section of said terminal metal-fitting, and press-fitting said tips of said first and second fitting-in sections of said press-fit terminal to said first and second hole parts of said fitting-in section of said terminal metal-fitting, and
wherein said press-fitting is achieved by disposing said width direction of said press-fit terminal parallel to said width direction of said terminal metal-fitting at a substantially central portion of said first and second rectangular hole parts of said fitting section, and by pressing said press-fit terminal to said terminal metal-fitting at two portions in first contact regions of both side surfaces of said bridge section and two portions in second contact regions where an inner side-surface of said long side of said first hole part is farthest to that of said second hole part.

10. A terminal connection component, comprising:
press-fit terminals, and
terminal metal-fittings,
wherein said press-fit terminals have at least an inserting section,
wherein said inserting section is formed in a substantially rectangular plate-shape and has a taper whose thickness of a plate decreases toward one end side of a longitudinal direction,
wherein said terminal metal-fittings comprise a fixing-side plate section, a step section, a holding-side plate section and standing sections,
wherein said fixing-side plate section forms substantially quadrangular plate, said plate-shape step section is formed at one side of said substantially quadrangular plate and is perpendicular to said substantially quadrangular plate, and said holding-side plate section is formed at an opposite side of said fixing-side plate section side of said step section, is extended to said opposite direction of said fixing-side plate section side, and is positioned parallel to said fixing-side plate section,
wherein said holding-side plate section comprises said standing sections and a through hole which is disposed from said standing positions toward said end portion of said holding-side plate section,
wherein said standing sections stand at both sides in a longitudinal direction of said holding-side plate section, and each of said standing sections comprises an extending section which is disposed at a side and is extended toward said holding-side plate section, and a holding section which is disposed at a side and is extended toward said end portion of said extending section,
wherein each of said extending sections comprises a first bent section bending toward a center line direction of said holding-side plate section, and a second bent section which is disposed from said first extending section toward said end portion of said holding-side plate section and is parallel to said center line direction of said holding-side plate section,
wherein a space between said holding sections formed at said end portions of said extending sections is slightly longer than a thickness of one end portion of said plate where said taper in said inserting section of said press-fit terminal is provided, and is slightly shorter than said thickness of said plate, and
wherein said inserting section of each of said press-fit terminals is passed through an interior of said through hole and is held by said holding sections, and said press-fit terminals are connected to said terminal metal fittings.

11. A terminal connection component, comprising:
press-fit terminals, and
terminal metal-fittings,
wherein said press-fit terminals have at least an inserting section,
wherein said inserting section is formed in a substantially rectangular plate-shape and has a taper whose width of a plate decreases toward one end side of a longitudinal direction, wherein said terminal metal-fittings comprise a fixing-side plate section, a step section, a holding-side plate section and standing sections, wherein said fixing-side plate section forms substantially quadrangular plate, said plate-shape step section is formed at one side of said substantially quadrangular plate and is perpendicular to said substantially quadrangular plate, and said holding-side plate section is formed at an opposite side of said fixing-side plate section side of said step section, is extended to said opposite direction of said fixing-side plate section side, and is positioned parallel to said fixing-side plate section, wherein said holding-side plate section comprises said standing sections and a through hole which is disposed from said standing positions toward said end portion of said holding-side plate section, wherein said standing sections stand at both sides in a longitudinal direction of said holding-side plate section, and each of said standing sections comprises an extending section which is disposed at a side and is extended toward said holding-side plate section, and a holding section which is disposed at a side and is extended toward said end portion of said extending section, wherein each of said extending sections comprises a first bent section bending toward a center line direction of said holding-side plate section, and a second bent section which is disposed from said first extending section toward said end portion of said holding-side plate section and is parallel to said center line direction of said holding-side plate section, wherein a space between said holding sections formed at said end portions of said extending sections is slightly longer than a width of one end portion of said plate where said taper in said inserting section of said press-fit terminal is provided, and is slightly shorter than said width of said plate, and wherein said inserting section of each of said press-fit terminals is passed through an interior of said through hole and is held by said holding sections, and said press-fit terminals are connected to said terminal metal fittings.

12. The terminal connection component according to claim 11,
wherein said extending sections are formed in two or more stages in a standing direction from said holding-side plate section.

13. The terminal connection component according to claim 11,
wherein taper sections which widen said holding sections toward said holding-side plate section side are provided at said holding-side plate section side of said holding sections.

14. The terminal connection component according to claim 11,
wherein said extending sections comprise an S-shape bent shock absorbing section or an M-shape bent shock absorbing section in an extending direction of said extending sections.

15. A terminal connection structure between a control unit using said terminal connection component according to claim 11 and a motor,
wherein said control unit comprises a substrate having at least a control circuit, and said press-fit terminals vertically stood from an upper surface of said substrate,
wherein said terminal metal-fittings are disposed on said motor, and windings of said motor are connected to one end of said terminal metal-fittings,
wherein said connection between said control unit and said motor is performed by passing said tips of inserting sections of said press-fitting terminals through interiors of said respective through holes of said terminal metal-fittings, and press-fitting said inserting sections of said press-fitting terminals to respective spaces formed between said holding sections, and
wherein said inserting sections of said press-fit terminals are sandwiched between said holding sections of said terminal metal-fittings.

16. The terminal connection structure between a control unit and a motor, according to claim 15,
further comprising fixing plates which cover from said step section sides of holding-side plate sections of said terminal metal-fittings to portions in front of said through holes.

17. The terminal connection structure between a control unit and a motor, according to claim 15,
further comprising a cover which covers said press-fit terminals and said terminal metal-fittings from a direction of a standing section of said terminal metal-fittings,
wherein said cover comprises insulating walls to insulate between said terminal metal-fittings which are formed below of a back surface of said cover, and openings formed portions corresponding to upper surfaces of said fitting sections of said terminal metal-fittings or portions corresponding to upper surfaces of said holding sections of said terminal metal-fittings in a case that said cover covers said press-fit terminals and said terminal metal-fittings from a direction of a standing section of said terminal metal-fittings.

18. An electric power steering apparatus, comprising:
said terminal connection component according to claim 11.

19. An electric power steering apparatus, comprising:
said terminal connection structure between a control unit and a motor, according to claim 15.

* * * * *